(12) United States Patent
Gage

(10) Patent No.: US 10,778,449 B2
(45) Date of Patent: Sep. 15, 2020

(54) SYSTEM AND METHOD FOR SHARED SESSIONS IN COMMUNICATION NETWORKS

(71) Applicant: William Anthony Gage, Stittsville (CA)

(72) Inventor: William Anthony Gage, Stittsville (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 15/881,113

(22) Filed: Jan. 26, 2018

(65) Prior Publication Data

US 2019/0238345 A1 Aug. 1, 2019

(51) Int. Cl.
| | |
|---|---|
| H04L 29/06 | (2006.01) |
| H04L 9/32 | (2006.01) |
| H04L 9/14 | (2006.01) |
| H04W 24/10 | (2009.01) |
| H04W 72/14 | (2009.01) |
| H04W 74/08 | (2009.01) |
| H04W 16/32 | (2009.01) |
| H04W 68/02 | (2009.01) |
| H04W 88/02 | (2009.01) |

(52) U.S. Cl.
CPC .............. *H04L 9/3271* (2013.01); *H04L 9/14* (2013.01); *H04W 24/10* (2013.01); *H04W 72/14* (2013.01); *H04W 74/0833* (2013.01); *H04L 2209/80* (2013.01); *H04W 16/32* (2013.01); *H04W 68/02* (2013.01); *H04W 88/02* (2013.01)

(58) Field of Classification Search
CPC ......... H04L 9/3271; H04L 9/14; H04L 63/08; H04W 12/06
See application file for complete search history.

(56) References Cited

U.S. PATENT DOCUMENTS

| | | | |
|---|---|---|---|
| 2005/0078824 A1* | 4/2005 | Malinen | H04L 63/08 380/247 |
| 2012/0027211 A1 | 2/2012 | Lehtovirta et al. | |
| 2015/0012749 A1* | 1/2015 | Huang | H04W 12/06 713/168 |
| 2016/0286600 A1 | 9/2016 | Faccin et al. | |

(Continued)

FOREIGN PATENT DOCUMENTS

CN 107432052 A 12/2017

OTHER PUBLICATIONS

3GPP TS 38.300 V15.0.0 (Dec. 2017) "NR and NG-RAN Overall Description; Stage 2".

(Continued)

*Primary Examiner* — Dao Q Ho

(57) ABSTRACT

A system, apparatus and method are provided for supporting shared sessions in communication networks. The system, apparatus and method include interoperation between a User Equipment and serving nodes of a communication network. The serving nodes communicate with at least one anchor node of the communication network. In some implementations a shared session identifier and User Equipment identifying component are used to identify a User Equipment within a shared session. In some implementations, a paging notification is used to inform one or more target User Equipment that of a downlink message relating to the shared session.

13 Claims, 27 Drawing Sheets

(56) References Cited

U.S. PATENT DOCUMENTS

2018/0115539 A1* 4/2018 Muhanna .............. H04L 63/061
2018/0234839 A1 8/2018 Tenny et al.
2018/0332467 A1 11/2018 Tenny et al.

OTHER PUBLICATIONS

3GPP TS 38.321 V15.0.0 (Dec. 2017) "NR; Medium Access Control (MAC) protocol specification".
3GPP TS 38.322 V15.0.0 (Dec. 2017) "NR; Radio Link Control (RLC) protocol specification".
3GPP TS 38.323 V15.0.0 (Dec. 2017) "NR; Packet Data Convergence Protocol (PDCP) specification".
3GPP TS 38.413 V0.5.0 (Dec. 2017) "NG Radio Access Network (NG-RAN); NG Application Protocol (NGAP)".
3GPP TS 38.423 V0.5.0 (Dec. 2017) "NG Radio Access Network (NG-RAN); Xn application protocol (XnAP)".
3GPP TS 36.331 V14.5.0 (Dec. 2017) "E-UTRA; Radio Resource Control (RRC); Protocol specification".
3GPP TS 37.340 V15.0.0 (Dec. 2017) "E-UTRA and NR; Multi-connectivity; Stage 2".
Unpublished U.S. Appl. No. 15/986,070, filed May 22, 2018.
U.S. Appl. No. 62/520,899, filed Jun. 16, 2017.

* cited by examiner

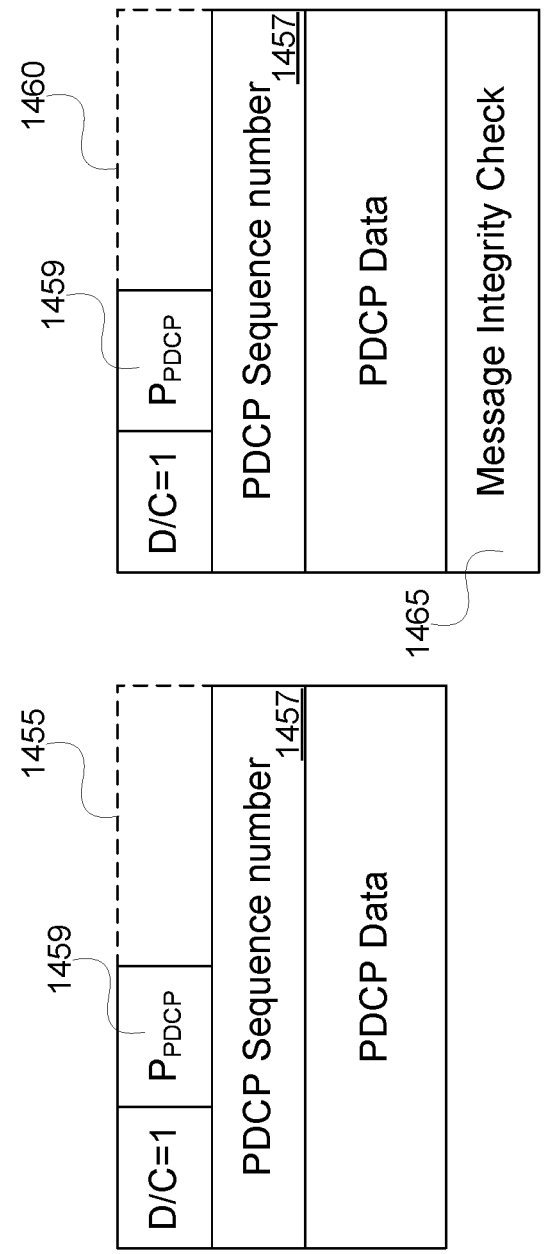

SYSTEM AND METHOD FOR SHARED SESSIONS IN COMMUNICATION NETWORKS

FIELD OF THE INVENTION

The present invention generally pertains to the field of shared sessions in communication networks, and particular embodiments or aspects relate to sharing sessions of different devices in communication networks.

BACKGROUND

Next generation wireless communication networks, such as so-called fifth generation (5G) communication networks are being developed to support a large number of connected electronic devices such as a User Equipment (UE). The large number of connected devices, even if they each only generate small amounts of data, are anticipated to result in more data transmitted over the networks. In particular, next generation communication networks seek to include functionality to accommodate the deployment of electronic devices that have been described as machine-type communication (MTC) devices (sometimes referred to as "MTC-type UE"). It will be understood that some such devices may be referred to as Machine-to-Machine (M2M) devices. MTC devices, such as sensors, utility meters, and other automated measurement and reporting devices may generate a large number of sessions on a communication network, for example each MTC device may generate one or more sessions, though the bandwidth required for each MTC-type UE may be small. The large number of MTC devices, even if each only generates a small amount of traffic, is considered to be a potential problem for deployments.

Other characteristics of MTC-type communications may include intermittent, and sometimes unpredictable transmission times, and often predominantly more uplink communications, i.e. transmissions from the electronic device to the network, than downlink communications, i.e. from the network to the electronic device.

Conventionally, the core network (CN) and, optionally, the radio access network (RAN) maintain at least one session for each wireless device that has attached to, and has been authenticated by, the network. Accommodating at least one separate session for each MTC-type device using current communication methods can lead to higher administrative and signalling costs that may reduce network availability and add to network congestion. Furthermore, MTC-type device may have additional constraints that are not considered to be a problem for a conventional UE including limited battery power.

FIG. 1A is a simplified network diagram illustrating a prior art embodiment of small cell deployment for dual connectivity. FIG. 1B illustrates a prior art embodiment of a protocol stack.

The present application relates to the use of shared sessions to minimise network overhead and improve network responsiveness.

This background information is intended to provide information that may be of possible relevance to the present invention. No admission is necessarily intended, nor should be construed, that any of the preceding information constitutes prior art against the present invention.

SUMMARY

It is an object of the present invention to obviate or mitigate at least one disadvantage of the prior art.

In some embodiments, a User Equipment (UE) is provided. The UE including a radio interface for receiving data from and transmitting data to a communication network; a processor; and; a non-transient memory for storing instructions that when executed by the processor cause the UE to be configured to: receive, from a serving node: a paging notification that identifies one or more UEs from a group of UEs that comprise a shared session, and a security challenge; transmit, to the serving node: a responding UE identifier (RID), and a challenge response based at least on the security challenge, and cryptographic keying material associated with the shared session; and, receive, from the serving node, downlink data.

In some embodiments a method for a user equipment (UE) of a communication network is provided. The method comprising the UE receiving, from a serving node: a paging notification that identifies one or more UEs from a group of UEs that comprise a shared session, and a security challenge; transmitting, to the serving node: a responding UE identifier (RID), and a challenge response based at least on the security challenge, and cryptographic keying material associated with the shared session; and, receiving, from the serving node, downlink data.

In some embodiments a network function is provided. The network function executing on a network node of a communication network to act as a serving node, and the network node including: a network interface for receiving data from and transmitting data to network functions connected to a network; a processor; and a non-transient memory for storing instructions that when executed by the processor cause the network function to be configured to: receive, from an anchor node: a shared session identifier that identifies a shared session for a group of one or more UEs; an intended recipient that includes: a target UE identifier (TID) that identifies one or more UEs from the group of UEs that comprise the shared session, a security challenge, an expected challenge response derived from at least the security challenge and cryptographic keying material associated with the shared session; and, downlink data; transmit the security challenge and a paging notification associated with the TID; receive, from a responding UE, a challenge response and a responding UE identifier (RID); and, if the challenge response matches the expected challenge response; and if the RID received from the responding UE corresponds to the TID received from the anchor node, transmit, to the responding UE, the downlink data.

In some embodiments a method is provided for execution by a serving node of a communication network. The method comprising the serving node: receiving, from an anchor node: a shared session identifier that identifies a shared session for a group of one or more UEs; an intended recipient that includes: a target UE identifier (TID) that identifies one or more UEs from the group of UEs that comprise the shared session; a security challenge, and an expected challenge response derived from at least the security challenge and cryptographic keying material associated with the shared session; and, downlink data; transmitting the security challenge and a paging notification associated with the TID; receiving, from a responding UE, a challenge response and a responding UE identifier (RID); and, if the challenge response matches the expected challenge response, and if the RID received from the responding UE corresponds to the TID received from the anchor node, transmitting, to the responding UE, the downlink data.

Some embodiments of the present invention may provide for reduced network signalling and overhead while supporting UE including MTC-type UE. Some embodiments of the present invention may provide for improved network responsiveness to UE including MTC-type UE.

Some embodiments of the present invention may provide for improved network service to UE, including MTC-type UE, that may be operative to switch between an inactive power-saving state and an active connected state in order to reduce power consumption by the UE.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIGS. 14B & 14C illustrate embodiments of a PDCP data PDU without and with a message integrity check;

DETAILED DESCRIPTION

Figure 1A:
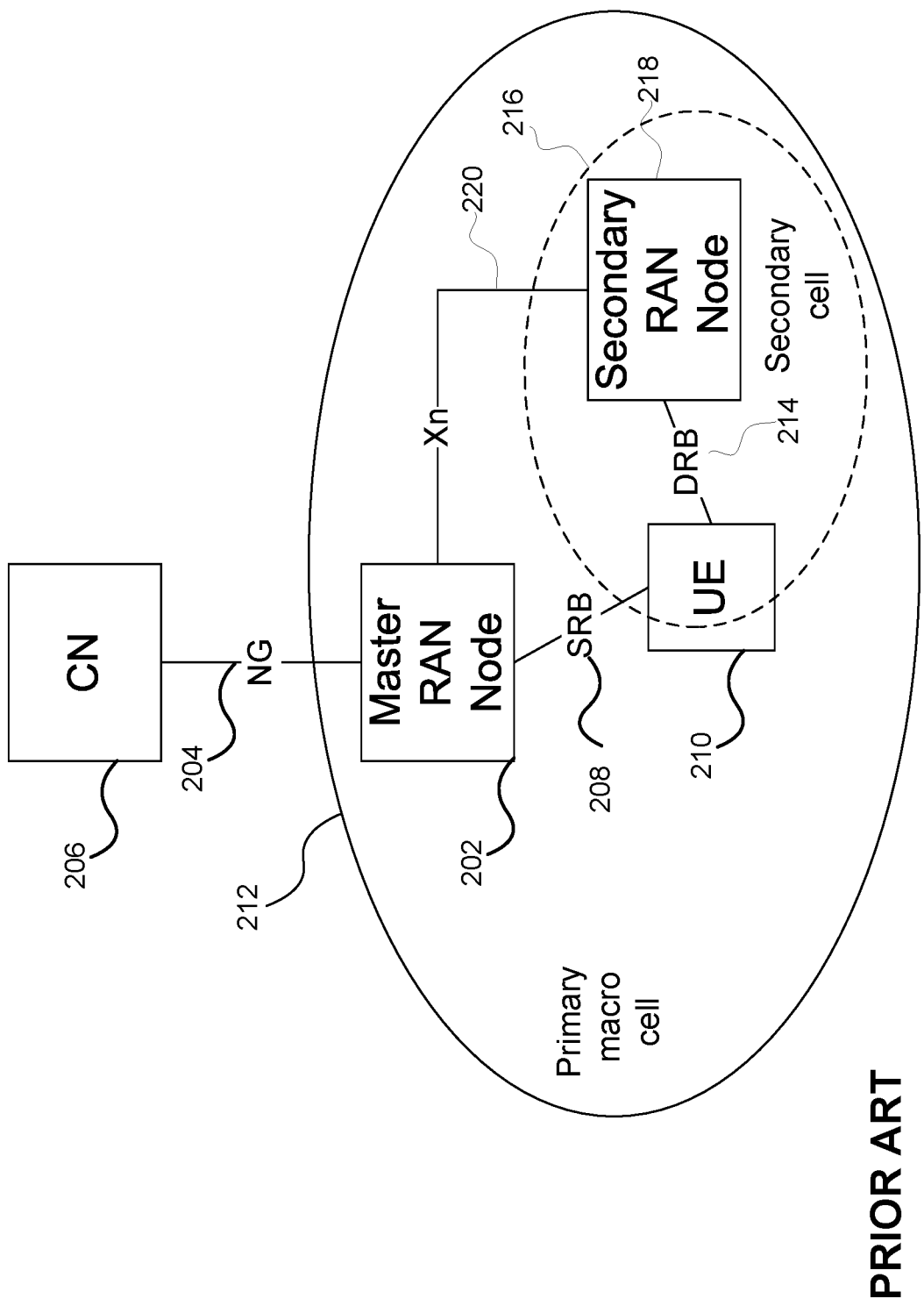
FIG. 1A, is a simplified network diagram illustrating a prior art embodiment of small cell deployment for dual connectivity.

The present application describes embodiments for using shared sessions to minimise network overhead and improve responsiveness to UEs, and in particular be capable of extending support to a massive deployment of electronic devices such as machine-type communications (MTC) UEs. In some embodiments, a shared session may be pre-established by the core network allowing individual electronic devices to be subsequently associated with that shared session. In conventional network scenarios, each individual electronic device would be associated with its own session. By having a plurality of electronic devices to be associated with a single shared session a reduction in the overhead that would otherwise have been associated with each of the individual sessions.

An issue for supporting electronic devices, such as UEs and in particular mobile UEs or power-constrained UEs, is the need for the network to support the UEs when they transition to a low power or "idle" state when their radio functions are inoperative. In order to conserve battery power, UEs may adopt the low power idle state between transmissions to minimize power consumption that arises due to radio operation. In conventional wireless networks, such as those supporting Fourth Generation (4G) networks such as Long Term Evolution (LTE) networks or even earlier generations of wireless networks, in the idle state the no RAN resources associated with the UE are released. As a result, the UE cannot transmit or receive information while in the idle state. The UE may transition from idle to a connected state in which the radio connection to the access is re-established. This allows the UE to access the network as necessary to exchange information. An issue for 3G/4G wireless networks is the associated network signalling that arises when a UE "wakes" from the idle state and returns to the connected state. This can be compounded if there are a large number of devices waking up at the same time or within a short time window. The network signalling arises in order to establish a new session with the network, and to re-establish the current UE context after the UE wakes and connects to the network and identifies itself. Returning to a connected mode of operation may result in additional latency and extended periods of time when the UE is active and not able to re-enter a low energy mode of operation due to the required interactions with the network to establish and maintain the new session. If there is only a small amount of data to be exchanged with the network, such as a single IP packet, the signalling overhead associated with re-connecting to the network and changing states may be much larger than the amount of data being exchanged with the UE. This situation may be accentuated for MTC UEs which may need to periodically connect for short data transfers. In addition to the network overhead associated with this signalling, when an MTC device has limited battery power available, the increased signalling can have a negative effect on the life of the MTC device.

In some embodiments a UE operating in a shared session is operative to enter an inactive mode of operation while the network is operative to maintain the context of the established shared session. When the UE has information to transmit to the network, an uplink packet can be transmitted from within the inactive mode, i.e. without the UE returning to an active connected mode and requesting a new device session. By obviating the need to enter the active connected mode, signalling overheads that would normally be incurred by a transition from an idle mode to a connected mode of operation are avoided. Embodiments support similar operations for managing delivery of downlink data while the UE is in the inactive mode.

In some embodiments, support is provided for mobile UEs and other electronic devices, which may connect to the network from anywhere within a service area, without conducting conventional signalling operations with each of the RAN nodes within the service area. For instance, a UE may be operative to identify itself to a local serving RAN node within the service area using a shared session identifier. Each of the serving RAN nodes operative to obtain relevant context from an anchor node associated with that service area. At least one of the anchor node, and the service area, are identifiable from the group identifier received from the UE.

In some embodiments, the shared session identifier may further comprise a group identifier to distinguish between common sessions of a group of one or more UEs. In some embodiments, such as for MTC-type communications, a group of UEs may only have a single associated shared session, and the group identifier may also serve as a unique shared session identifier for that group. In some embodiments, each shared session may be assigned a separate identifier, and accordingly a group of UEs may have one or more shared session identifiers corresponding to the session(s) associated with the group. This application uses the term "shared session identifier" to refer to an identifier that at least distinguishes between sessions of a particular group of UEs. In some embodiments, the shared session identifier may include a static group identifying component and a variable session identifying component to distinguish between sessions of one or more groups of UEs. In these embodiments, the group identifying component may be exchanged without the session identifying component where it is only necessary to identify the group and not a particular session of the group.

In some embodiments, the network may be operative to support data transmissions in both uplink and downlink that are cryptographically protected to validate a connecting UE and to protect against replay attacks. In some embodiments, challenge/response procedures based on group keys associated with a group of UEs, provided to each of the connecting UEs within the group, may be used by all UEs of the group to avoid the establishment of individual security associations for each UE. In some embodiments, the group keys may be provided per shared session. In some embodiments, the group keys may be provided on a per group basis. In some embodiments, a plurality of group keys may be provided on a per group or per session basis. In some embodiments, the group keys may be provided on a per-UE and per-group/session basis. Accordingly, the provision of keys may be aligned with the level of security required for the group.

The present application describes the network and UE functionality using the terminology of a currently proposed 3GPP 5G (NR) Radio Access Network, and in particular uses the example of UEs, and other electronic devices, operating in the 3GPP-defined RRC_INACTIVE state. This description is intended to be explanatory and non-limiting, and apply to any UE mode where it is desirable to at least one of reduce network signalling overhead and to maintain UE context at one or more network nodes whether or not the associated UE is connected to a particular network node. The systems and methods described herein may be applied to at least one of similar and equivalent modes of operation in other states (e.g. RRC_CONNECTED) and in other radio access technologies (e.g. suspended mode in LTE). Collectively, these modes are referred to as an inactive mode within this disclosure for convenience, but it is not intended to limit application of the invention to a particular definition such as RRC_INACTIVE state.

Embodiments of the present invention will be described based on an example network reference architecture. For the sake of explanatory purposes, a 5G network is used for explanation, while other network architectures are contemplated. In this example, a radio access network (RAN) node in a 5G system is connected to a core network (CN) control plane (CP) entity through an interface dubbed NG-C (or N2) and to a CN user plane (UP) entity through an interface dubbed NG-U (or N3). Throughout this application the terms "network node" and simply "node" are used interchangeably. It should be understood that a network node can be a physical node, a network function instantiated on a physical node, or a network function instantiated upon computing resources such as those provided in a data center. In some embodiments, including those in which the network node or function is within a UP, the node may be a virtualized representation of dedicated hardware (effectively a slice of a dedicated resource) within a network slice. The CN control plane entity is also connected to UEs through an interface referred to as N1. The N1 control plane messages are conveyed through the RAN node as non-access stratum (NAS) signalling. A RAN node can also connected be to UEs via a radio link (Uu) and to other RAN nodes via an interface referred to as Xn that can include both a control plane component (Xn-C) and a user plane component (Xn-U).

A UE, or other such electronic device, may establish multiple PDU sessions with the CN where different sessions may correspond to different instances of the NG-U user plane interface. Each instance of the NG-U interface may terminate on a different CN user plane entity.

In other network systems, similar interfaces exist. For example, in an LTE system, a RAN node is connected to a CN through an S1 interface and to other RAN nodes through an X2 interface.

The Uu interface between a UE and a RAN node may comprises several entities within the protocol stack including physical layer (PHY), medium access control (MAC), radio link control (RLC), packet data convergence protocol (PDCP), service data adaptation protocol (SDAP) and radio resource control (RRC) as described, for example, in 3GPP TS 38.300 V1.1.0 (2017-10) "NR and NG-RAN Overall Description; Stage 2".

Control plane information such as RRC and NAS signalling is carried over a signalling radio bearer (SRB) while user plane data is carried over a data radio bearer (DRB).

In some networks, a number of smaller RAN nodes, often referred to as small cells, picocells or femtocells, may be deployed within the coverage area of a macro cell to allow for at least one of offloading traffic from the macro cell and providing improved service or signal quality to UEs. FIG. 1A, is a simplified network diagram illustrating a prior art embodiment of small cell deployment for dual connectivity. A master RAN node 202 provides the NG (or S1) connections 204 to the core network (CN) 206 and maintains a signalling radio bearer (SRB) 208 to a 210 through a primary macro cell 212. The 210 may use a data radio bearer (DRB) 214 to convey user plane traffic through a secondary cell 216 to a secondary RAN node 218. This traffic is relayed between the master RAN node 202 and the secondary RAN node 218 over an Xn (or X2) interface 220.

Figure 1B:
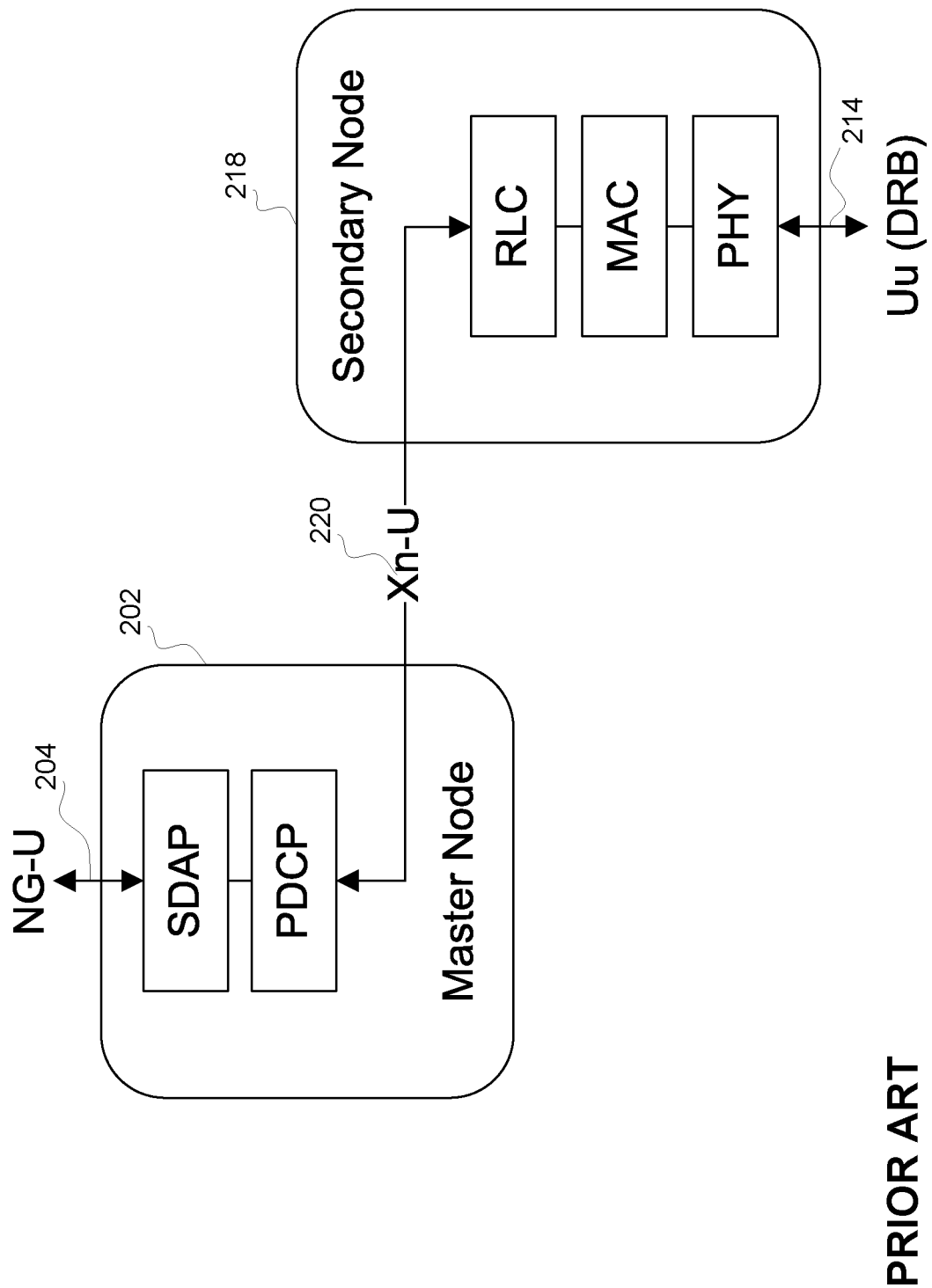
FIG. 1B is illustrates a prior art embodiment of a protocol stack.

Referring to FIG. 1B, a prior art embodiment of a protocol stack is illustrated. On the network side, the user plane protocol stack in a dual connectivity deployment is split between the master RAN node 202 and the secondary RAN node 218. The master RAN node 202 houses the upper layer protocol stack entities (including SDAP and PDCP) while the secondary RAN node 218 houses the lower layer protocol stack entities (RLC, MAC and PHY).

While a UE is registered with the network, it may transition between several modes of operation, including connected mode (e.g. RRC_CONNECTED), idle mode (e.g. RRC_IDLE) and inactive mode (e.g. RRC_INACTIVE) as described, for example, in 3GPP TS 38.300 V1.1.0 (2017-10) "NR and NG-RAN Overall Description; Stage 2".

The UE context is typically stored at an anchor node while the UE is operating in the inactive mode. The UE may transition from the inactive mode to the connected mode in a cell that is associated with a different RAN node, dubbed the new serving node. When this occurs, the UE context must be transferred from the anchor node to the new serving RAN node. In conventional systems, the new serving RAN node then assumes the role of anchor node for this UE.

Embodiments described within this application provide for a network operative to support shared sessions where a plurality of UEs, including MTC-type UEs, may connect to the network using a common shared session that supports a group of UEs, and for network nodes that support such functionality. The use of such shared, or group, sessions may reduce network overhead and improve network responsiveness to UEs transitioning between active and inactive modes.

In some embodiments, the anchor node comprises an anchor RAN node. In some embodiments, the anchor node comprises an anchor network function (anchor NF) executing on a network node. For instance, the anchor NF may comprise an anchor core network function (CNF) executing on a network node of the RAN or the core network. In some embodiments, the anchor NF may comprise a virtualised network function (VNF) executing on a network node of the RAN or the core network. Operation of the anchor node will initially be described in the context of an anchor RAN node, which is generally applicable to the operation of an anchor NF. Differences in operation for the anchor NF will be described in more detail in reference to FIG. 20 below.

In some embodiments, the serving node comprises a serving RAN node. In some embodiments, the serving node comprises a serving network function (serving NF) executing on a network node. For instance, the serving NF may be executed on a network node of at least one of the RAN and the core network. In some embodiments, the serving NF may comprise a virtualised network function (VNF) executing on a network node of the RAN or the core network. Operation of the serving node will initially be described in the context of a serving RAN node, which is generally applicable to the operation of a serving NF.

Figure 2:
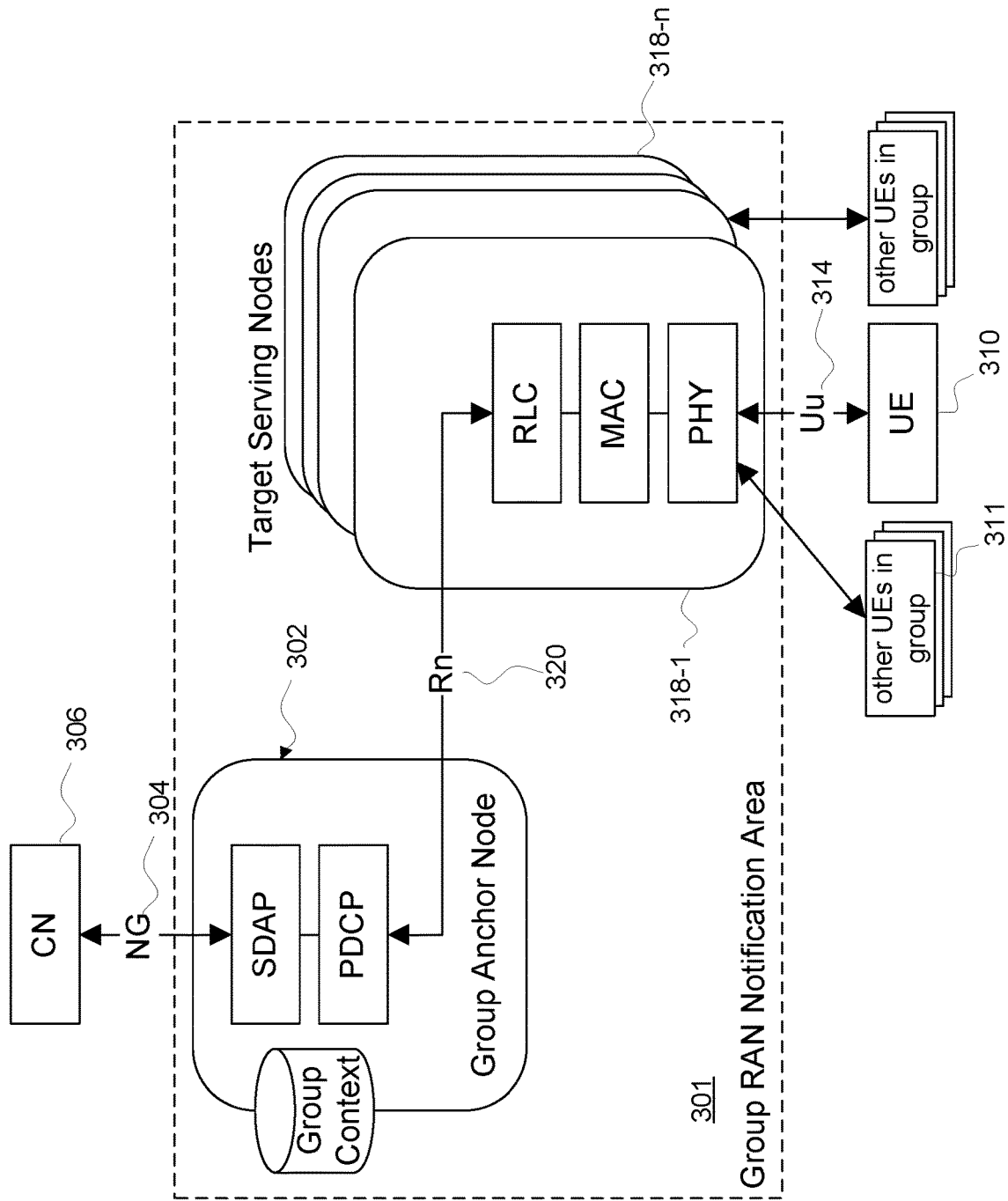
FIG. 2 illustrates an embodiment of a network model operative to support shared sessions.

FIG. 2 illustrates an embodiment of a network model operative to support shared sessions. In the embodiment, an anchor node 302 maintains the NG connections 304 to the core network (CN) 306 for the shared session (e.g. via a 5G NG interface as illustrated, a 4G S1 interface, or other equivalent interface). The anchor node 302 also maintains, or has access to, the current configuration and other contextual information associated with the shared session.

Referring to FIG. 2, a group RAN notification area (RNA) 301 denotes the cells where UEs 310 311 within the shared session can receive service while roaming within coverage of the network. The scope of the group RNA 301 may, for instance, be as small as a single cell or cover as much as the entire network. If a UE 310 roams outside the designated RNA 301, it must notify the RAN and may be assigned to at least one of a different shared session and a different anchor node 302.

The anchor node 302 may be connected via an intra-RAN backhaul network (Rn) 320 to one or more available RAN group target serving nodes 318-1, ..., 318-n (also referred to as "target serving nodes" or "target nodes") within the group. Each of the target nodes 318-1, ..., 318-n may control one or more cells associated with the RNA 301 of the shared session. The interface 320 between the group anchor node 302 and the target nodes 318-1, ..., 318-n, dubbed Rn 320 in FIG. 2, may be similar, for instance, to an X2 interface, an Xn interface, a Central Unit-Distributed Unit (CU-DU) interface, or other similar interface. A target node 318-1, ..., 318-2 is a member of the RAN nodes that are available to serve a group member UE. A target node 318-1, ..., 318-2 that is actively serving a UE may be referred to as a "serving node". Different UEs 310 311 associated with the shared session may be concurrently served by different target nodes 318-1, ..., 318-n, i.e. different "serving nodes" of the group of target nodes 318-1, ..., 318-n, within the group RNA 301. In addition, multiple UEs 310 311 associated with the shared session may be concurrently served by the same target node, e.g. 318-1 as illustrated in FIG. 2.

Based on the embodiment of a RAN architecture of FIG. 2, a UE 310 may connect to any of the target nodes 318-1, ..., 318-n, and be directly served as its context is available as being retained as part of the shared session context in the data store accessible to the group anchor node 302, and to the target nodes 318-1, ..., 318-n, through the Rn 320 interface.

The embodiment of FIG. 2 is illustrated using the protocol stack for shared session procedures based on the 3GPP dual-connectivity model for explanatory purposes. The upper layer SDAP and PDCP protocol entities and state machines are located in the anchor node 302. The lower layer RLC, MAC and PHY protocol entities and state machines are located in at least one of the target nodes 318-1, ..., 318-n. In this embodiment, and in contrast to the 3GPP dual-connectivity model, the target nodes 318-1, ..., 318-n do not have access to the shared session context for managing transmissions over the radio link (Uu) 314. In particular, the target nodes 318-1, ..., 318-n do not have at least one of (but in some embodiments all of):

configurations for radio bearers currently established for this shared session (i.e. RLC configuration, PDCP configuration);

radio bearer state information (e.g. received PDU sequence numbers, transmitted PDU sequence numbers);

cryptographic keying material (e.g. keys, counters) associated with this shared session;

QoS information (e.g. authorised QoS profiles, SDAP QoS flow to DRB mappings);

PDU session information (e.g. identity of CN user plane and control plane functions).

The target nodes 318-1, . . . , 318-n in the embodiment of FIG. 2 lack shared session context, which may allow for reduction or minimization of the retention and maintenance of session context information in the network. By reducing retention of session context information, the embodiment reduces network memory requirements, and reduces signalling overhead that would otherwise be required to maintain the session context whether or not a particular node of the target nodes 318-1, . . . , 318-n actually provided connectivity to a UE 310 311. Because the target nodes 318-1, . . . , 318-n do not maintain radio link protocol information, the target nodes 318-1, . . . , 318-n are each operative to employ shared session procedures to support group sessions.

Figure 3:
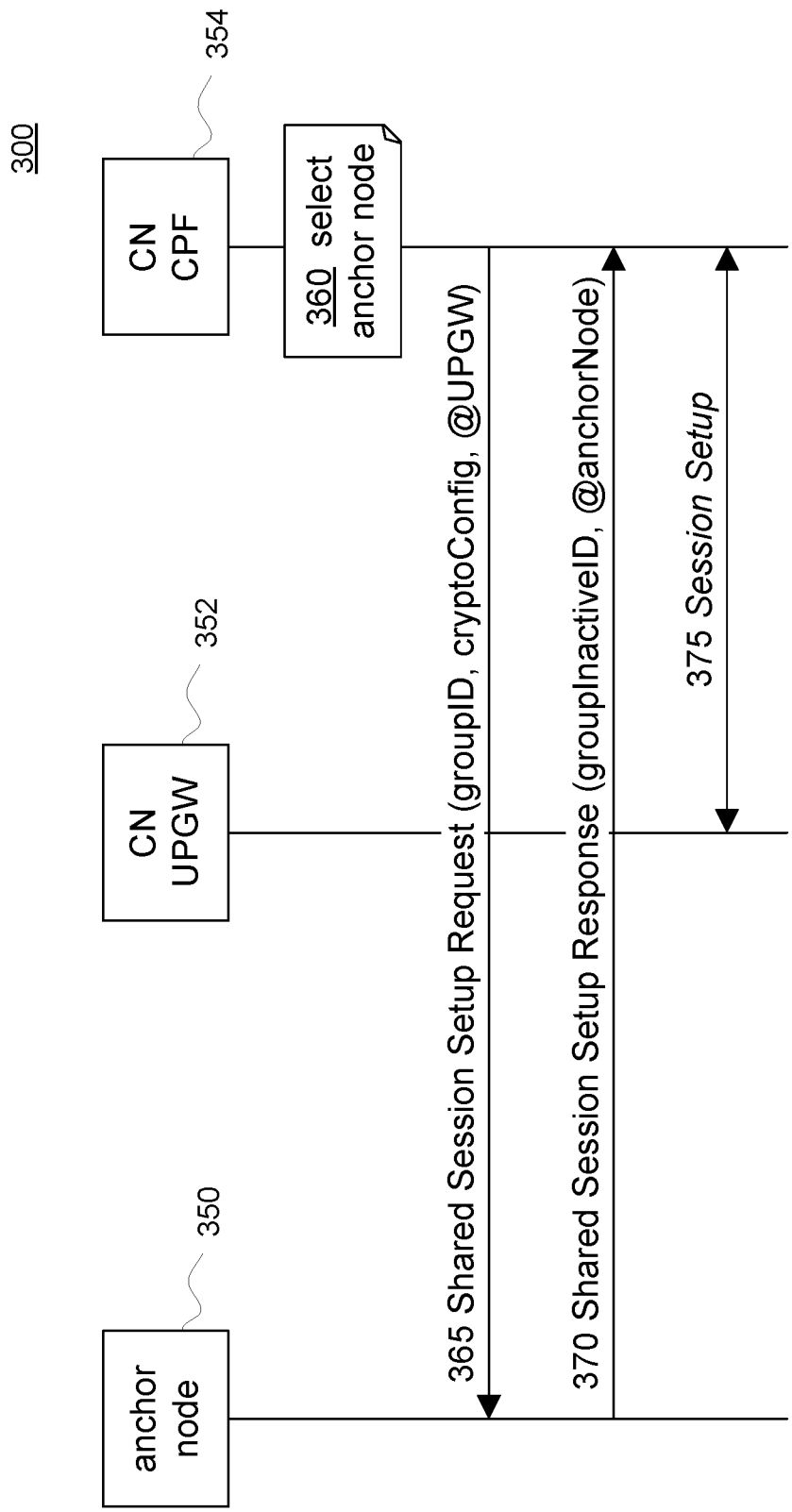
FIG. 3 is a signalling diagram illustrating an embodiment for shared session establishment.

FIG. 3 is a signalling diagram illustrating an embodiment method 300 of shared session establishment. In conventional PDU sessions, the CN (or one or more CN functions) establishes a session context within the RAN in response to a service request from a UE. By contrast, a shared session context may be established by the CN in response to a network management action and without a UE trigger. For instance, the shared session context may be established in advance, of a group of one or more UEs that are deployed as members of a defined group and are intended to operate within a shared session. In other embodiments, UEs may be added or removed from a group after UE deployment, depending upon requirements.

Referring to FIG. 3, based on a network management action, a CN control plane function (CPF) 354, executing on a network node of the communication network, in step 360, selects a network node to act as the anchor node 350 for this shared session. As discussed above, the anchor node 350 may comprise an anchor RAN node, or may comprise an anchor NF executed on a network node of the RAN or the core network. The selection of the anchor node 350 may, for example, be based on one or more factors including, for example at least one of:

a configuration provided by the network management system;

location of UEs within the target shared session; and load balancing across available anchor nodes.

An anchor node 350 may, for instance, be a selected anchor RAN node that comprises a conventional base station (e.g. a gNB or eNB) with subtending cells. Alternatively, an anchor node 350 may comprise a specialised mobility anchor network node without subtending cells located either in the RAN or CN and serving one or more base stations. The anchor network node may also comprise an anchor network function (e.g. a CNF, VNF, etc.) executing on a network node of the RAN or the core network. Regardless, this entity is referred to as an anchor node 350 within this document.

In step 365 a shared session setup request is transmitted from the CN CPF 354 to the selected anchor node 350. The shared session setup request is defined on a group basis, rather than an individual UE basis, and may include, for instance:

a group identifier (e.g. groupID) that identifies the group of UEs;

at least one of a corresponding network slice identifier (e.g. a service/slice type, SST) and RAN slice configuration identifier;

QoS profiles authorised for this shared session;

QoS flow markings associated with the authorised QoS profiles;

CN interface configuration for this shared session, including the transport network layer (TNL) address (@UPGW) used by the CN user plane gateway (UPGW) 352 for forwarding traffic related to this shared session;

cryptographic keying material associated with the group or with the shared session.

After receiving the shared session setup request, the selected anchor node 350 generates and in step 370 transmits a shared session setup response to the CN CPF 354. The shared session setup response from the selected anchor node 350 may include, for instance:

a shared session identifier (e.g. groupInactiveID) assigned by the selected anchor node 350 that references the shared session context maintained by the anchor node 350;

anchor node 350 interface configuration for this shared session, including the TNL address used by the anchor node 350 (@anchorNode) for forwarding traffic related to this shared session.

In step 375, the CN CPF 354 may then transmit a session setup instruction to the CN UPGW 352 to configure the UPGW 352 with the shared session information, including the TNL address of the selected anchor node 350 (e.g. @anchorNode), required to deliver downlink packets to members of the session group.

In this embodiment, UEs in a group may typically operate in the inactive mode to conserve power and reduce signalling traffic. The use of group-based cryptographic keying material, and the shared session identifier (e.g. groupInactiveID) allows the network to support the shared session while minimizing context information that must be maintained.

In some embodiments, the CN CPF 354 may create multiple shared sessions for a particular group according to service requirements (e.g. QoS, service function chain, external network gateway, etc). The multiple shared sessions may be distinguished from one another by use of different shared session identifiers for each session. Shared sessions may also be created on-demand by the CN CPF (e.g. in response to a network attachment request from one or more UEs) or, in some situations, may be pre-configured into network elements, for instance prior to deploying a group of one or more UEs in the field.

There are several procedures that may be used to bind a UE to at least one of a group and a shared session. For instance, a UE may be bound in response to an initial network access request transmitted by the UE. A UE may also be bound in response to an explicit service request transmitted by the UE. In some implementations, UEs may be bound through pre-configuration which may be implemented when the UEs are deployed, likely for MTC-type UEs, or through an over-the-air configuration procedure to connected UEs belonging to the group.

For UEs which are bound in response to an initial network access request, or an explicit service request transmitted by the UE, the binding procedures may employ RRC signalling to configure the UEs with shared session-related information that may be used by the UEs in at least one of subsequent uplink and downlink transmissions.

For UEs which are bound through a pre-configuration process prior to deployment, the procedure need not involve RRC signalling provided the pre-configuration of shared session information may be otherwise installed and activated in the UEs. For instance, UEs may be loaded with the pre-configured information prior to deployment in the field, or by direct communication connection to the UEs after deployment in the field. The direct communication may include, for instance, by cable or short-range wireless communications (e.g. optical, Bluetooth™, or another wireless link). In the context of a MTC-type UE such as a utility meter, for instance, a service worker may be dispatched at a deployment site to configure, or reconfigure, the UE in place using a direct connection. The direct connection may be useful for at situations including at least one of where the data transfer requirements are higher than are desired for that UE, there convenience of fault checking, and for security reasons.

Figure 4:
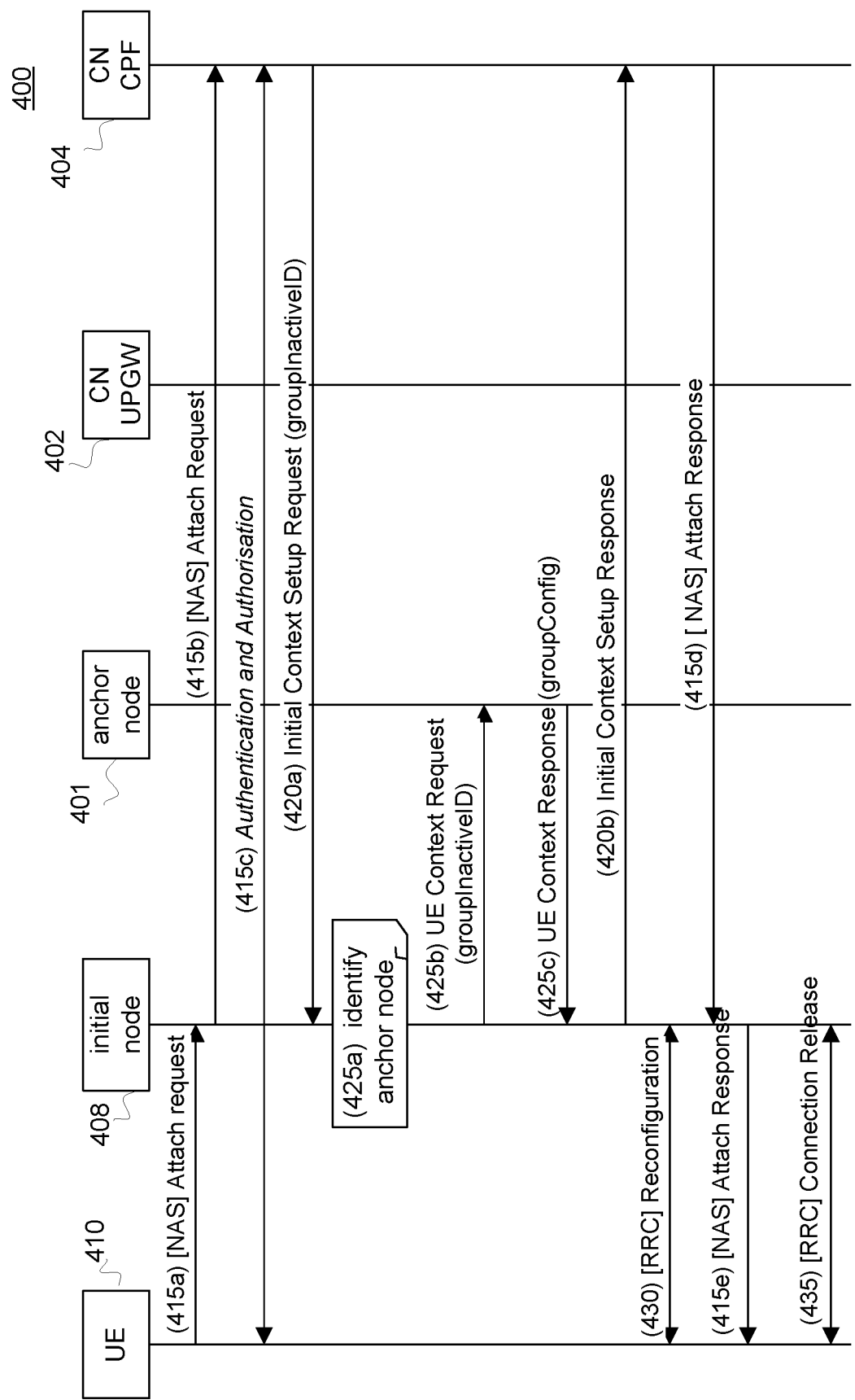
FIG. 4 is a signalling diagram illustrating an embodiment of a procedure for binding a UE to a shared session.

FIG. 4 is a signalling diagram illustrating an embodiment of a procedure 400 for dynamically binding a UE 410 to a shared session. In the embodiment of FIG. 4, the UE 410 is bound as a result of an initial network access request transmitted by the UE 410.

In step 415a, a UE 410 transmits a non-access stratum (NAS) attachment request to an initial node 408 of the network. This may be done in order to obtain service through a particular RAN or RAN node.

In step 415b the attach request is forwarded by the initial node 408 to a CN CPF 404 which is typically executed on another network node. Subsequently, in step 415c, an authentication and authorization procedure is conducted between the UE 410 and the CN CPF 404 to authenticate and authorize the UE 410 for service on the network.

During this procedure, in some embodiments, the CN CPF 404 may identify one or more shared sessions that have, based on the UE's service profile or other information available to the CN CPF 404, been authorized for use by this UE 410. If the one or more shared sessions are identified, in step 415c the UE 410 will further be configured with the cryptographic keying material associated with each of the authorised groups or shared sessions.

Following authentication and authorisation of the UE 410, in step 420a the CN CPF 404 transmits an initial context for the UE 410 to the initial node 408. For each authorised shared session, the CN CPF 404 may include the shared session identifier (e.g. groupInactiveID) provided by the designated anchor node 401 during establishment of that shared session (e.g. in step 370).

In step 425a the initial node 408 may identify the designated anchor node 401 for the shared session associated with the shared session identifier (e.g. groupInactiveID). In step 425b the initial node 408 transmits a UE context request to the anchor node 401 for the context associated with the shared session. The UE context request may include, for instance, the shared session identifier (e.g. groupInactiveID) corresponding to the shared session.

Responsive to receiving the UE context request, in step 425c the anchor node 401 transmits a UE context response to the initial node 408. The UE context response may include shared session configuration information (groupConfig) which may include, for instance, the group identifier (e.g. groupID) provided by the CN CPF 404 and the logical channel configuration for this shared session determined by the anchor node 401.

The shared session configuration information does not necessarily include group cryptographic material or CN connectivity information. In one embodiment, this security and connection information is retained by, and known only to, the anchor node 401.

Upon receiving the UE context response from the anchor node 401, in step 420b the initial node 408 may transmit an initial context setup response to the CN CPF 404 in reply to the initial context setup request transmitted by the CN CPF 404 in step 420a. The initial context setup response 420b confirms receipt of the UE context response 425c from the anchor node 401. In some embodiments the initial context response transmitted in 420b may include some or all of the shared session configuration information received from the anchor node 401.

In some embodiments, upon receipt of the initial context setup response 420b the CN CPF 404 may transmit, to the initial node 408, an attach response 415d for delivery to the UE 410 in step 415e.

In step 430, the initial node 408 may transmit radio link configuration information to the UE 410 using, for example, radio resource control (RRC) signalling. A configuration exchange may occur, as required, to provide the UE 410 with a radio link configuration as required for operations within the initial node 408. The radio link configuration, including shared session information provided by the anchor node 401, may be provided by the initial node 408 to the UE 410 during the RRC reconfiguration in step 430, or at any time before the UE 410 enters an inactive mode of operation.

In step 435, at some future point in time, the initial node 408 may perform a connection release procedure with the UE 410, prior to the UE 410 transitioning to an inactive mode of operation. In an embodiment, the connection release procedure is executed in response to the initial node 408 determining to release the RRC connection between the initial node 408 and the UE 410. In an embodiment, the connection release procedure may include an indication transmitted from the initial node 408 to the UE 410 instructing the UE 410 to transition into an inactive mode of operation.

For embodiments where a UE 410 is bound to at least one of a shared session or a group responsive to an explicit service request, the above procedure may be initiated by a session or service request transmitted by the UE 410 in place of the attach request 415a. Typically the session or service request will be transmitted after at least one of an initial attachment procedure and authentication and authorization procedure has been completed. In place of the initial context setup request 420a, the CN CPF 404 can transmit a PDU session establishment request to the initial node 408, in order to exchange the session-related information, including for instance a shared session identifier (e.g. groupInactiveID) provided by the designated anchor node 401 during establishment of that shared session (e.g. in step 370).

In some embodiments, the UE 410 may be assigned to multiple groups and may be associated with multiple shared sessions, each of which may be associated with the same, or a different, anchor node 401.

In some embodiments, the UE 410 may be migrated to different groups or to different shared sessions with different anchor nodes 401, e.g. based on UE mobility or network load balancing.

In some embodiments, a UE 410 may have multiple established PDU sessions including both shared sessions and UE-specific sessions.

Figure 5:
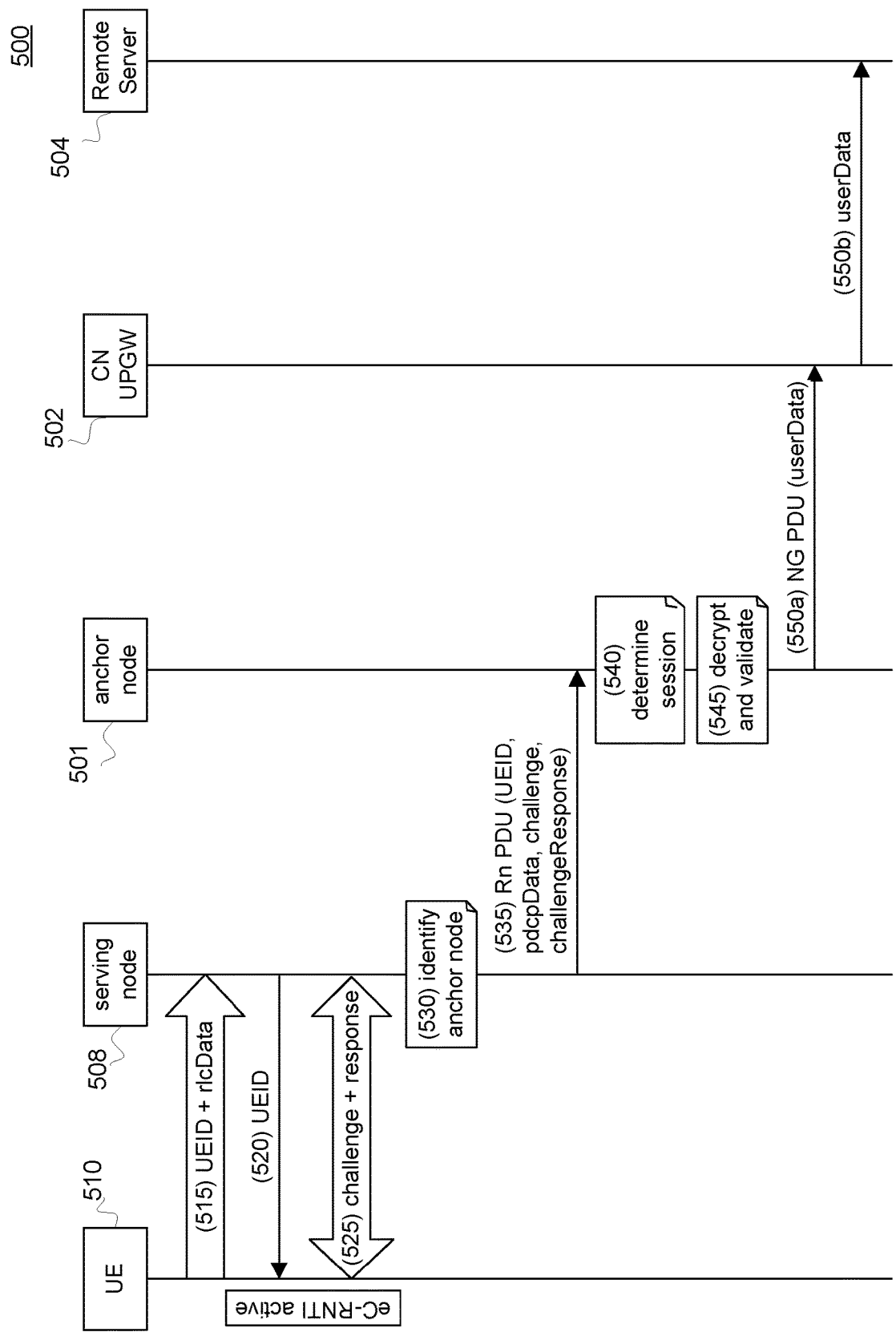
FIG. 5 is a signalling diagram illustrating an embodiment of an inactive mode uplink data transmission procedure for a shared session.

FIG. 5 is a signalling diagram illustrating an embodiment of an inactive mode uplink data transmission procedure 500 for a shared session. The embodiment of FIG. 5 includes security features for validating the UE 510, and for prevention of replay attacks.

The UE 510 may initiate a contention-based uplink transmission within its current serving cell. This is typically performed when there is an uplink PDU queued at UE 510. The contention-based transmission may be a non-orthogonal multiple access, a conventional 4-step random access procedure, an optimised 2-step random access procedure or another generally accepted access procedure.

The UE initiates the contention-based uplink transmission by, in step 515, transmitting an uplink message to the serving node 508. The serving node 508 is a RAN node from the group of available target nodes for the group RNA. The serving node 508 currently serving the UE 510 may in some circumstances be the initial node 408 if the UE 510 is still in the service area of that network node. In some circumstances, however, the UE 510 may have moved from an initial location serviced by the initial node 408, and the network node that receives a subsequent uplink message (i.e. the serving node 508) may be different from the network node that received the attachment request (i.e. the initial node 408).

The contention-based uplink transmission of step 515 may be scheduled for transmission within a contention period defined by the serving node 508, as is known in the art. The uplink message may include at least the following elements:

- a UE identifier (e.g. UEID) that includes a session identifying component (shared session identifier), to identify the shared session associated with a group of one or more UEs to be associated with this transmission within the RAN service area, and a UE identifying component to identify a specific UE 510 within the group; and,
- an uplink data PDU (e.g. rlcData) containing an application layer user data packet destined for delivery to a remote corresponding node (RCN) somewhere in the Internet-at-large.

Upon successful receipt of the uplink message, the serving node 508 is able to use the UEID associated with the uplink message to identify the UE 510 making the request, as well as the shared session that the message relates to.

If the uplink transmission is successfully decoded, the serving node 508 responds in step 520 by transmitting a downlink contention resolution message to the UE 510. This downlink contention resolution message can include at least the UEID received in the previous uplink transmission.

In some embodiments, the serving node 508 may assign an ephemeral cell radio network temporary identifier (eC-RNTI) to the UE 510 to coordinate further contention-free transmissions between the UE 510 and the serving node 508. The ephemeral C-RNTI is associated with the UE 510 for a short period of time and may be automatically released through expiration of a timer or through conclusion of the inactive mode transmission procedure.

While it is assigned, the eC-RNTI uniquely identifies the UE 510 within (the serving cell of) the serving node 508—i.e. the eC-RNTI is not shared with other UEs of the shared session that may be concurrently active within the serving node 508.

To allow validation of the UE 510 by the anchor node 501, in step 525 the serving node 508 initiates a security challenge and response procedure with the UE 510. The serving node 508 generates a security challenge that typically comprises a random number and transmits the challenge in a downlink message to the UE 510. When the UE 510 receives the challenge, it computes a UE-generated challenge response and transmits the UE-generated challenge response in an uplink message to the serving node 508. The UE-generated challenge response is computed by the UE 510 using at least the challenge provided by the serving node 508 and the group cryptographic keying material provided to the UE 510 before it entered the inactive mode. In some embodiments, the challenge response may be computed, for instance, using a cryptographically secure hashing algorithm.

In some embodiments, the serving node 508 is responsible for generating the random challenge but not for validating the UE-generated challenge response. As indicated in the embodiment illustrated in FIG. 5, the anchor node 501 may be responsible, in step 545, for validating the UE-generated challenge response based on at least one of UE context information, group configuration information, and security information. As explained above, this embodiment allows for group and shared session information to be held at the anchor node 501, rather than being distributed to all target serving nodes.

Based on the UEID received in step 515, in step 530 the serving node 508 uses information associated with, or embedded within, the shared session identifier (e.g. groupInactiveID) to identify an anchor node 501 corresponding to the shared session for the UE 510.

In step 535, the serving node 508 transmits the uplink data PDU—as received from the UE 510—to the anchor node 501. This transmission between the serving node 508 and the anchor node 501 may make use of an intra-RAN (Rn) network connection. In this example, the message sent in step 535 over the Rn connection may include the UEID, the radio link logical channel identifier (LCID) used by the UE 510 to transmit the uplink data PDU, and the uplink data PDU (e.g. pdcpData) comprising upper layer 2 (e.g. PDCP and SDAP) protocol headers and an application layer packet. The intra-RAN (Rn) message also includes the random challenge provided by the serving node 508 to the UE 510, and the UE-generated challenge response returned by the UE 510.

In step 540 the anchor node 501 determines the shared session associated with the PDU based on the shared session identifier (e.g. groupInactiveID) included in the session identifying component of the USD provided by the UE 510 for the uplink transmission. The anchor node 501 can then retrieve the associated shared context information, including group cryptographic keying material and CN connectivity information.

In step 545, the anchor node 501 computes an expected challenge response using the random challenge provided by the serving node 508 and the group cryptographic keying material. The anchor node 501 validates the UE-generated challenge response to confirm the received UE-generated challenge response matches an expected challenge response of the anchor node 501 and, if successfully validated, decrypts the received PDU using the group cryptographic keying material.

In step 550a the anchor node 501 encapsulates the application packet (e.g. userData) inside an NG-U tunnel packet and transmits the tunnel packet to the CN UPGW 502 associated with the corresponding PDU session. In step 550b the CN UPGW 502 removes the encapsulation and transmits the application layer user data packet (e.g. userData) to the remote server 504 addressed by the packet.

Figure 6:
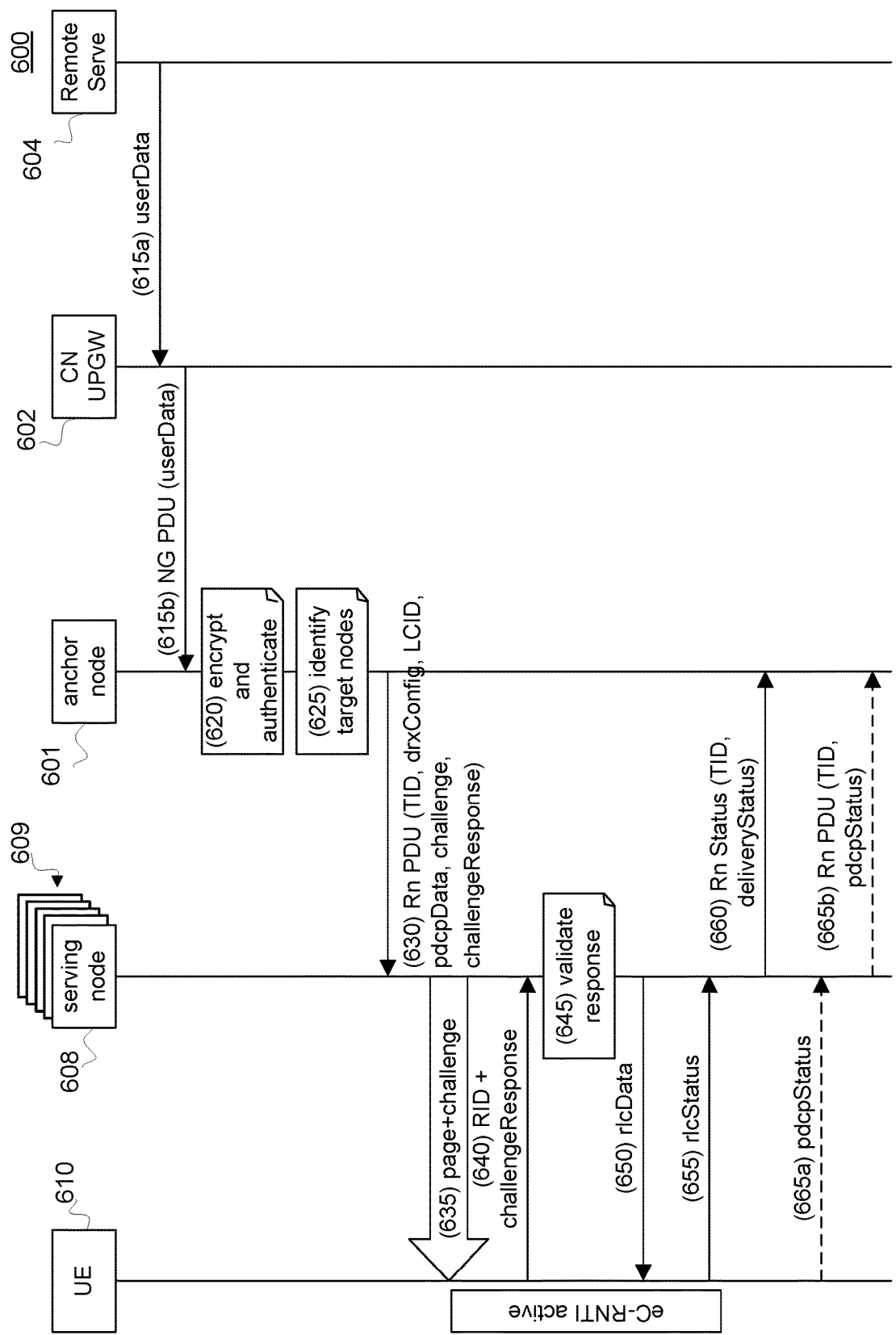
FIG. 6 is a signalling diagram illustrating an embodiment of an inactive mode downlink data transmission procedure for a shared session.

FIG. 6 is a signalling diagram illustrating an embodiment of an inactive mode downlink data transmission procedure 600 for a shared session. The embodiment of FIG. 6 includes security procedures for validating the UE 610, and for prevention of replay attacks.

In step 615a the remote server 604 transmits a downlink user data packet (e.g. userData) that is received by the CN UPGW 602 that is associated with the shared session. In some embodiments, the CN UPGW 602 may be associated with an address (e.g. an IP address or an Ethernet address) included in the user data packet that is assigned to the group of UEs or to the shared session. Responsive to receipt of the downlink user data packet, and based on shared session configuration, the CN UPGW 602 encapsulates the downlink user data packet in an NG tunnel PDU and in step 615b transmits the encapsulated downlink user data packet to the anchor node 601 that is currently serving as the anchor for the shared session.

The anchor node 601 processes the NG tunnel PDU to extract the downlink user data packet from the NG tunnel PDU and to identify the shared session. The anchor node 601 constructs a downlink PDU by, in step 620, encrypting the extracted downlink user data packet and optionally adding an authenticated message integrity check using the cryptographic keying material associated with the shared session context. The downlink PDU (e.g. pdcpData) may also include upper layer 2 (e.g. PDCP and SDAP) protocol headers.

The shared session context includes a group RAN notification area (RNA) 301 currently assigned to the UE group. From the RNA configuration, in step 625 the anchor node 601 identifies a set of target nodes 609 that may have cells encompassed by the RNA. The coverage provided by cells in the target nodes 609 selected by the anchor node 601 may be larger or smaller than the nominal coverage area of the RNA.

In step 630 the anchor node 608 transmits the downlink PDU across the intra-RAN (Rn) network to each of the target nodes 609. The downlink PDU (e.g. pdcpData) is encapsulated in an Rn PDU that may also include any or all of the following information:
- a target UE identifier (TID) to identify at least one UE 610 within the group of UEs associated with the shared session;
- the logical channel identifier (LCID) to be used for delivery of the downlink PDU over the radio link;
- a security challenge; and,
- the expected challenge response derived from at least the security challenge and cryptographic keying material associated with the shared session.

In some embodiments, the TID may comprise a list of target UE identifiers to identify a plurality of target UEs within the group targeted to receive the downlink PDU.

In some embodiments, the TID may comprise a paging identifier associated with one or more UEs (or all UEs) of the group that are targeted to receive the downlink PDU.

In some deployments, the Rn PDU may be forwarded across the intra-RAN (Rn) network as a multicast transmission. In step 635, each of the target nodes 609 attempts to locate the target UE(s) 610 in order to deliver the downlink PDU to the targeted UE(s) 610. In some embodiments, the target nodes 609 may be operative to attempt to deliver the downlink PDU by using at least one of paging and transmission occasions indicated by the anchor node 601.

At the next transmission occasion or when a target UE 610 responds to the paging notification in its current serving cell, the now-serving node 608 attempts to validate the responding UE 610 before forwarding the downlink PDU by, in step 635, transmitting to the target UE 610 the security challenge received from the anchor node 601 in step 630. The serving node 608 may further transmit an identifier of the target UE 610 (e.g. the TID) with the security challenge. In some embodiments, the target nodes 609 are operative to transmit a paging notification associated with the TID and the security challenge in a single transmission. In some embodiments, the target nodes 609 are operative to transmit a paging notification associated with the TID, and then to transmit the security challenge when a responding UE 610 acknowledges the paging notification associated with the TID.

The serving node 608 may also assign an ephemeral C-RNTI (eC-RNTI) to the target UE 610 to coordinate contention-free transmissions between the responding UE 610 and the serving node 608. The ephemeral C-RNTI is associated with the responding UE 610 for a short period of time and may be automatically released through expiration of a timer or through conclusion of the inactive mode transmission procedure.

While it is assigned, the eC-RNTI uniquely identifies the target UE 610 within (the serving cell of) the serving node 608—i.e. the eC-RNTI is not shared with other UEs of the shared session that may be concurrently active within the serving cell of the serving node 608.

Responsive to receiving the security challenge, the target UE 610 processes the security challenge to compute a UE-generated challenge response based on the security challenge provided by the serving node 608 and the group cryptographic keying material provided to the UE 610 before it entered the inactive mode. In some embodiments, for instance, the challenge response may be computed using a cryptographically secure hashing algorithm. In step 640 the target UE 610 transmits the UE-generated challenge response in an uplink message to the serving node 608.

Responsive to receiving the UE-generated challenge response from the target UE 610, in step 645 the serving node 608 validates the UE-generated challenge response by comparing the UE-generated challenge response with the expected challenge response provided by the anchor node 601 in step 630.

If the UE-generated challenge response does not match the expected challenge response provided by the anchor node 601, the serving node 608 can abandon the attempt to communicate with the target UE 610. In step 660 the serving node 608 transmits a failed delivery status report to the anchor node 601 indicating an unsuccessful delivery of the downlink PDU due to a failed challenge response validation.

If the UE-generated challenge response matches the challenge response provided by the anchor node 601 in step 630, in some embodiments the serving node 608 uses the assigned eC-RNTI to schedule a downlink transmission to the target UE 610. The downlink transmission 650 may include an RLC data PDU (e.g. rlcData) constructed by the serving node that contains the downlink PDU (e.g. pdcpData) received from the anchor node 601 in step 630.

If the target UE 610 successfully receives the downlink transmission 650, and if a reception acknowledgement was requested by the serving node 608, in step 655 the target UE 610 may transmit a positive acknowledgement to the serving node 608 (e.g. rlcStatus).

If a delivery status report was requested by the anchor node 601, in step 660 the serving node 608 may transmit an Rn delivery status message to the anchor node 601, indicating the outcome of the attempted downlink transmission to the UE(s) 610.

If a target UE 610 successfully receives the downlink transmission 650, it may decrypt and optionally authenticate the downlink PDU (e.g. pdcpData) using its stored cryptographic keying material associated with the shared session. If the downlink user data packet (e.g. userData) is successfully authenticated and reconstructed from the downlink PDU, and if an acknowledgement was explicitly requested by the anchor node 601, in step 665*a* the target UE 610 may transmit a delivery status report (e.g. pdcpStatus) acknowledging successful receipt of the downlink PDU to the serving node 608. In step 665*b* the serving node 608 transmits to the anchor node 601 an indication of the delivery status report received from the UE 610. In an embodiment, the serving node 608 forwards, to the anchor node 601, the delivery status report (e.g. pdcpStatus) indicating successful receipt of the downlink PDU as the indication.

The forwarding of the downlink PDU to the target nodes 609, along with a paging request, in step 630 is designed to:
- reduce packet delivery delay by avoiding an Rn round trip delay required to fetch the data packet after receiving a page response at the serving node 608; and,
- reduce the time that a target UE 610 must spend out of its low energy state, i.e. reduce the time spent in an active state, by minimising the time between the reception of a paging notification and the scheduling of a downlink transmission for the user data packet.

In both the uplink and the downlink data transmission procedures, a security protocol may be implemented for validating a UE 510 610, and to prevent replay attacks. In some embodiments described herein, the security protocol is based on the use of a security challenge and a corresponding challenge response in order to verify the identity of the UE 510 610. In some embodiments, for instance, the security challenge may include a random component (i.e. a random or pseudo-random number) selected by the serving node 508 for uplink transmissions and by the anchor node 601 for downlink transmissions. In some embodiments, the security challenge is the random component. In some embodiments, the security challenge comprises, at least in part, a sequence component or an identifier component. The sequence component may be used to provide additional protection from replay attacks. In some embodiments the identifier component may comprise an indication to another value known to the UE 510 610 for use in generating the challenge response.

The target UE 510 610 may generate the challenge response from the security challenge, for instance, by calculating a cryptographic hash derived from at least the security challenge and the cryptographic group keying material associated with the shared session. In some embodiments, the challenge response is derived, at least in part, from a sequence component or an identifier component. The sequence component may be used to provide additional protection from replay attacks. In some embodiments the identifier component may comprise an indication to another value known to the UE 510 610 and to the anchor node 501 601 for use in generating the challenge response.

The cryptographic hash may be calculated using a cryptographic hashing function that is-made-known-to the target UE 510 610. Depending upon the security requirements, the size of the security challenge and the computed cryptographic hash may, for instance, be 32 to 256 bits long as a trade-off between security and resource requirements (computational, signalling traffic size, etc.), though other cryptographic strengths (e.g. 512 bits, 1024 bits, etc.) may also be used in some embodiments if the security needs offset the additional resource requirements. The cryptographic hashing function, the size of the security challenge and the size of the computed cryptographic hash may be "made-known-to" the target UE 510 610 as information that may be pre-configured into a UE 510 610 (e.g. prior to deployment), or broadcast to all UEs by the network (e.g. in a System Information Block, SIB), or communicated individually to each UE 510 610 by the network (e.g. via Radio Resource Control (RRC) signalling).

In some embodiments, the security challenge may also include an indication of the group key to be used by the UE 510 610 for deriving the challenge response and for cryptographic operations in subsequent uplink and downlink transmissions associated with this shared session. In some embodiments for uplink transmissions, the group key is identified by the shared session identifier of the UEID. In some embodiments for downlink transmissions, the group key is associated with at least a target UE identifier (TID) transmitted by an anchor node to one or more target nodes associated with the shared session. In some embodiments, the group key may further be associated with a paging notification used by a target node when transmitting to the UE.

In addition to the security challenge and challenge response protocol described above, the UE 510, and the serving node 608 or anchor node 501, may be operative to incorporate a sequence number (e.g. a "COUNT" value) provided by a protocol layer, such as the Packet Data Convergence Protocol (PDCP) defined by the 3GPP standards. In shared sessions, the PDCP sequence number is not used for in-order delivery of PDCP data PDUs.

In an embodiment, the PDCP sequence number may be used as a sequence component, as described above, or it may be used as a component or input to generate a sequence component for use in the cryptographic operations. In the embodiment, the PDCP sequence number may be leveraged to manage a COUNT value as used by a group of UEs 510 610 associated with the shared session, for instance as an input to cryptographic and challenge/response operations. Since the shared session context is associated with a group of UEs, additional procedures may be required to separate or allocate ranges of possible PDCP sequence number values for each of the UEs 510 610 in the group.

In the case of uplink transmissions, in some embodiments the UE 510 may be operative to use a range of PDCP sequence numbers as a sequence component of a COUNT input variable used in its cryptographic operations. Two implementations for using PDCP sequence numbers are described for example:
- In an embodiment, a sequential allocation procedure may be used in which a UE 510 starts at the lowest value of the assigned PDCP sequence range and increments the PDCP sequence number following each uplink transmission. When an incremented sequence number exceeds the highest value of the assigned range, it is reset to the lowest value of the assigned range. Combining sequential allocation with a defined range, allows the anchor node 501 to partition the PDCP sequence number space for each UE 510 to minimise overlapping use of sequence numbers.
- In an embodiment, a random allocation procedure may be used in which a UE 510 randomly selects a number within the assigned range of PDCP sequence numbers for each uplink transmission. Random allocation allows a UE 510 to independently select the PDCP sequence number to be used for an uplink transmission and may obviate need to coordinate use of sequence number across UEs in a shared session, while still maintaining sufficient diversity.

In the case of downlink transmissions, in some embodiments, selection of a PDCP sequence number by the anchor node 601 may be based on local procedures. A UE 610 should treat the received PDCP sequence number as a random number because the anchor node 601 may not assign sequential numbers to successive transmissions to a particular UE 610.

In some embodiments, the COUNT value used for cryptographic operations in both uplink and downlink may be derived from the PDCP sequence number and an identifier assigned to a UE 510 610 by the anchor node 501. For example, the low order bits of the COUNT may be derived from the PDCP sequence number assigned to a PDCP data PDU and the high order bits of the COUNT may be derived from an identifier. The identifier may be a shared session identifier (e.g. groupInactiveID), a group identifier (e.g. groupID), a UE-specific identifier, or some other suitable identifier (e.g. UEID).

While a PDCP sequence number is transmitted in every PDCP data PDU, in some embodiments the identifier can be configured into the UE 510 610 (e.g. through RRC signalling) but not transmitted along with a PDCP data PDU.

In order to support a plurality of UEs associated with a shared session, in some embodiments a number of changes or configurations to the PDCP stack, or its equivalent, currently used for UE-centric sessions may be implemented. In other embodiments, the PDCP stack, or its equivalent may be otherwise extended to specifically incorporate shared sessions. Both embodiments are contemplated.

In the case of a standard PDCP stack for UE-centric sessions, in some embodiments, specific shared session configurations may be implemented. The shared session configuration may be applied at the UE 510 610 for each data radio bearer (DRB) established for the shared session. The shared session configuration information may be supplied to the UE 510 610, for instance, through RRC signalling, download, pre-definition, or other suitable means of configuring the UE 510 610.

In some embodiments, the Service Data Adaptation Protocol (SDAP) may be configured, for instance:
  If only one QoS flow is mapped to a DRB, then transmission of an SDAP header may be disabled.
  If reflective DRB mapping is disabled, then transmission of an SDAP header may be disabled.

In some embodiments, the PDCP may be configured, for instance:
  disable robust header compression (ROHC).
  disable in-order PDCP data PDU delivery to upper layers.
  configure PDCP sequence number generation, which may include one or more of:
    sequential PDCP sequence number selection;
    randomised PDCP sequence number selection; and,
    an assigned range of PDCP sequence numbers.
  disable check to verify that a received sequence number is within a pre-defined window.
  configure security challenge and response size.
  configure security response cryptographic hashing algorithm.

In some embodiments, the Radio Link Control (RLC) may be configured as relevant for the communication standard, for instance:
  disable PDU re-ordering if this function is defined by the communication standard.
  disable PDU concatenation if this function is defined by the communication standard.
  configure appropriate RLC mode of operation, which may include one of:
    assured mode (AM), providing segmentation, reassembly and error recovery through retransmission (ARQ);
    un-assured mode (UM), providing segmentation and reassembly but not ARQ error recovery.

Figure 7:
FIG. 7 illustrates an embodiment of a UEID.

The shared session is defined for a specified group of UEs which share a common session context. The use of a shared session context, in place of a plurality of unique UE contexts, reduces the overhead required to maintain the context information. Each UE that is a member of the group is assigned a UE identifier (UEID) for use in a shared session. The UEID may be provided to the UE by the network (e.g. through RRC signalling) at any time before the UE enters an inactive mode of operation. FIG. 7 illustrates an example embodiment of a UEID. The UEID 700 includes at least an anchor node identifier 710, identifying the anchor node for the shared session, and a shared session context reference 720, identifying the shared session context information available to the anchor node. Together, 710 and 720 may also be referred to as a shared session identifier (e.g. groupInactiveID) 750. In addition, the UEID 700 can include a UE identifying component 730 to distinguish a particular UE from other UEs within the group. The embodiment of FIG. 7 identifies field contents, but is not indicative of absolute or relative field size or order within the UEID 700.

A UE can be provided with a UEID 700 before it enters an inactive mode. When trying to obtain service related to a shared session from a new serving node, the UE can use the previously assigned UEID 700 to identify itself.

The UE identifying component 730 may be used to identify an individual UE within the group, but it only needs to be unique within the context of the shared session identifier (e.g. groupInactiveID) 750 because the UE identifying component 730 is defined in combination with the shared session identifier 750. Accordingly, the UE identifying component 730 only needs to be large enough to cover a maximum number of group members. Accordingly, the UE identifying component may be represented in a much smaller field than would be required to store a globally unique UE identifier like a Globally Unique Temporary Identity (GUTI) or an International Mobile Subscriber Identity (IMSI).

The UE identifying component 730 may be used by a serving node for contention resolution to distinguish between contemporaneous transmissions involving different UEs from the same group.

The UE identifying component 730 may be used by the anchor node to distinguish between different UEs for operational procedures (e.g. for accounting, for traffic monitoring, for alarm reporting).

The UE identifying component 730 may be either assigned by the anchor node or derived by the UE:
  If there is a need for the anchor node to explicitly identify or differentiate between individual UEs within a group, a UE identifying component 730 may be provided by the anchor node when the UE is bound to the shared session.
  If the UE is not configured with a UE identifying component by the anchor node, then the UE identifying component 730 may be derived by the UE (e.g. directly or via a hash function) from a persistent identifier that is also associated with the UE. The persistent identifier may, for example, be provided by the CN during initial attachment (e.g. Temporary Mobile Subscriber Identity, TMSI) or during device commissioning (e.g. IMSI).

Alternatively, if the UE is not configured with a UE identifying component by the anchor node, the UE may be operative to choose a random value to include as the UE identifying component 730 of the UEID 700 when transmitting the UEID 700 to a serving node. For security purposes, the UE may be operative to use a different random value for each uplink or downlink PDU transmission while operating in an inactive mode.

Uplink Transmission Operations

Uplink data transmission during a shared session in inactive mode requires processing at a serving node to receive an uplink lower layer (e.g. RLC) PDU from the UE and to acknowledge receipt of that PDU. This acknowledgement indicates only that the PDU was successfully received over the Uu interface between the UE and the serving node. Subsequent validation of at least one of the UE and its data can be performed by the anchor node using the upper layer (e.g. PDCP and SDAP) PDU received from the serving node. Accordingly, network signalling between the target serving nodes and the anchor node may be reduced because validation information does not need to be distributed to all of the target serving nodes, many of which may not communicate with a particular UE associated with a shared session.

Validation may be performed using cryptographic keying material that is known to all UEs assigned to the shared session. To prevent replay attacks, each uplink transmission is also validated using a challenge/response mechanism in which the serving node provides a random challenge variable that the UE must use to generate a response, as described above. In some cases, the challenge/response mechanism adds an additional step to the basic inactive mode uplink transmission procedure.

Embodiments of uplink transmission operations at the serving node will now be discussed, including:
4-step Random Access (RA) procedure;
2-step RA procedures; and,
2-step non-orthogonal multiple access (NOMA) grant-free procedure.

In these embodiments, the conventional procedures may incorporate the security challenge and response, assuming that the security challenge can be added to a conventional random access response (RAR) transmitted by a serving node to a UE. In some implementations the security challenge may be of a length, e.g. 32 to 256 bits, that is too long to fit into a RAR. In these implementations, the security challenge may be provided in a separate downlink transmission as an additional step to each of the procedures illustrated below.

Figure 8:
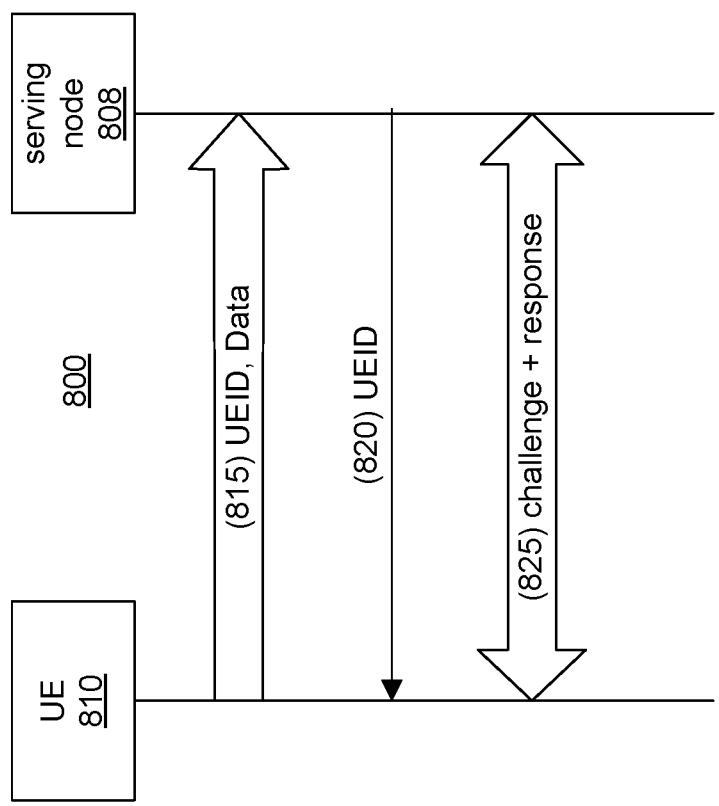
FIG. 8 is a signaling diagram illustrating an embodiment of an uplink transmission procedure between a UE and a serving node.

Referring to FIG. 8, the baseline uplink procedure 800 (with contention) includes, in step 815, a UE 810 transmits a UEID and optionally uplink data to a serving node 808. In step 820, the serving node 808 transmits a contention resolution message to the UE 810, including at least the UEID. In step 825 the security challenge and challenge response are exchanged between the UE 810 and the serving node 808. In some embodiments, the contention resolution message 820 will be transmitted after the exchange of security challenge and challenge response in step 825. Further steps are discussed above with respect to FIG. 5.

Figure 9B:
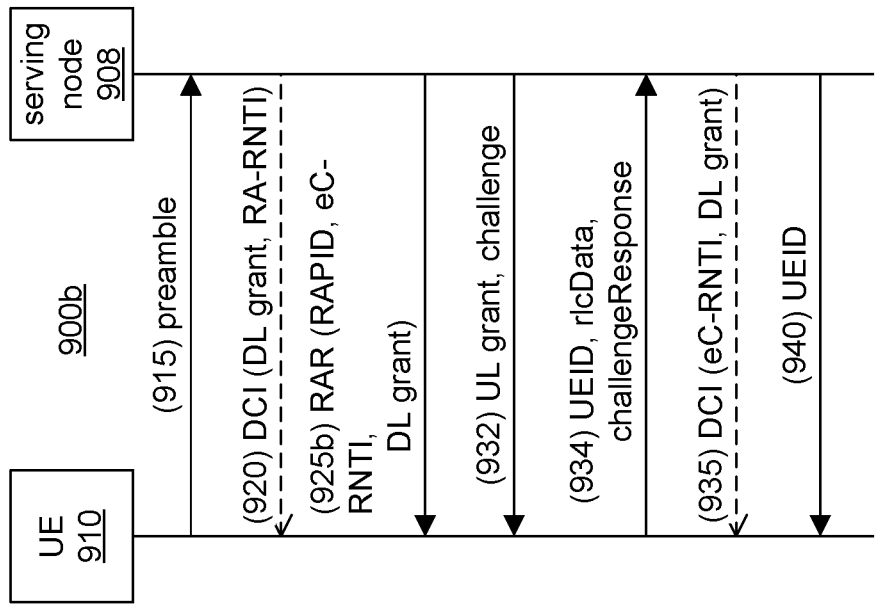
FIGS. 9A & 9B are signaling diagrams illustrating embodiments of an uplink transmission procedure between a UE and a serving node.
Figure 9A:
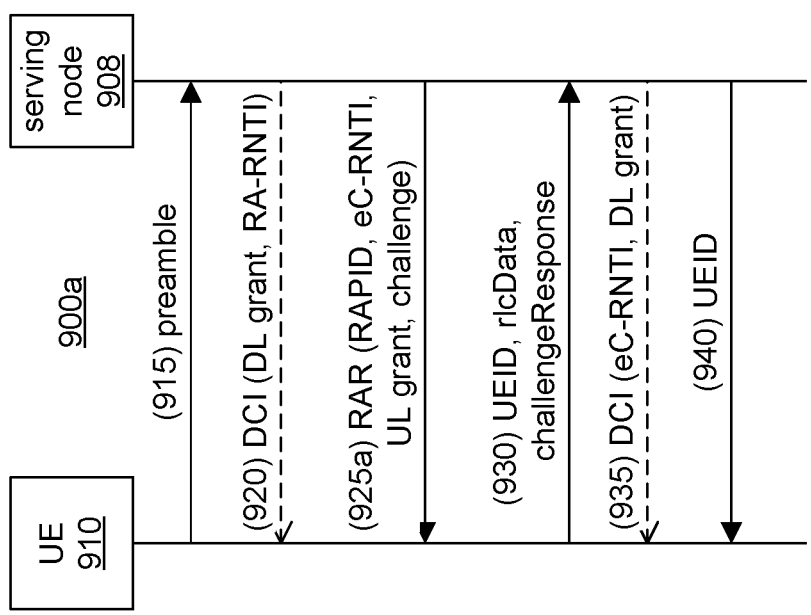

With reference to the baseline uplink procedure illustrated in FIG. 8, FIG. 9A illustrates a conventional 4-step RA procedure 900a with transmission of the security challenge in an RAR, and FIG. 9B illustrates a 5-step RA procedure 900b which provides the security challenge in a separate downlink transmission.

For an uplink procedure, in step 915 the UE 910 can select a random access preamble and transmits the random access preamble to the serving node 908 over a scheduled random access channel (e.g. physical random access channel (PRACH)). As this is a contentious procedure, other UEs associated with the shared session may be served by the serving node 908 and may have separately elected to transmit at the same time, and potentially may have independently selected the same preamble for transmission in the PRACH.

In step 920 the serving node 908 can transmit a downlink grant on a downlink control channel (e.g. physical downlink control channel (PDCCH)) using downlink control information (DCI) encoded with a predefined random access RNTI (RA-RNTI) that points to a region in the downlink scheduled channel (e.g. physical downlink scheduled channel (PDSCH)) that contains a random access response (RAR).

Referring to FIG. 9A, and procedure 900a, if the security challenge can be accommodated in the RAR, then in step 925a the serving node 908 transmits a RAR that contains a list of random access preamble identifiers (RAPIDs) corresponding to the preambles detected by the serving node in the PRACH. For each RAPID, the serving node can provide any or all of:
a temporary C-RNTI assignment that will later become the ephemeral C-RNTI (eC-RNTI) used by the UE 910;
an uplink grant that may be used by the UE 910 to transmit its uplink PDU; and,
a security challenge generated by the serving node 908.

After receiving the RAR, in step 930 the UE 910 transmits to the serving node 908 its UEID, buffered data, and a UE-generated challenge response to the security challenge such that any or all of the following formats may be used:
the UEID may be contained in a MAC control element (CE) with a CE type indicating the type and structure of the UEID;
the buffered data (e.g. rlcData) is contained in a MAC data PDU element that includes the logical channel identifier (LCID) corresponding to the data radio bearer (DRB) selected by the UE 910 to convey this information over the radio link; and,
the challenge response may be contained in a dedicated MAC control element (CE) with an appropriate CE type.

Alternatively, the UEID, the challenge response, or both may be included as fields in the RLC protocol layer header or in the PDCP protocol layer header.

If the serving node 908 successfully receives the uplink transmission (i.e. the CRC included in the received transmission block is valid), in step 935 the serving node 908 conventionally transmits a downlink grant using a DCI encoded with the eC-RNTI assigned to the UE 910. In step 940 the serving node 908 transmits downlink data including the UEID received in step 930 to the UE 910.

After receiving the downlink data transmission in step 940 that includes the UEID, the UE 910 can compare the UEID contained in the contention resolution identity MAC CE of the received message 940 against its own UEID (i.e. the UEID transmitted in step 930):
if there is a match, uplink transmission of the data is deemed successful.
if there is not a match, uplink transmission of the data is deemed unsuccessful (e.g. another UE 910 may have transmitted the same preamble in step 915) and the UE 910 terminates the procedure; the UE 910 may attempt to retransmit the data by any number of different procedures including by repeating this procedure at a later time.

Referring to FIG. 9B, and the variant procedure 900b, if the security challenge cannot be accommodated in the RAR, then in step 925b the serving node 908 transmits a RAR that contains a list of random access preamble identifiers (RAPIDs) corresponding to the preambles detected by the serving node 908 in the PRACH. For each RAPID, the serving node 908 can provide any or all of:

- a temporary C RNTI assignment that will later become the ephemeral C-RNTI (eC-RNTI) used by the UE 910; and,
- a downlink grant that will be used to transmit the security challenge. This is distinct from conventional procedures in which a conventional RAR includes an uplink grant, and not a downlink grant.

In step 932, the serving node 908 uses the radio resources indicated in the downlink grant to transmit a security challenge and an uplink grant to the UE 910.

After receiving the uplink grant, in step 934 the UE 910 transmits to the serving node 908 its UEID, buffered data (e.g. rlcData), and a UE-generated challenge response to the security challenge. Further steps are discussed above with respect to FIG. 9A.

Figure 10B:
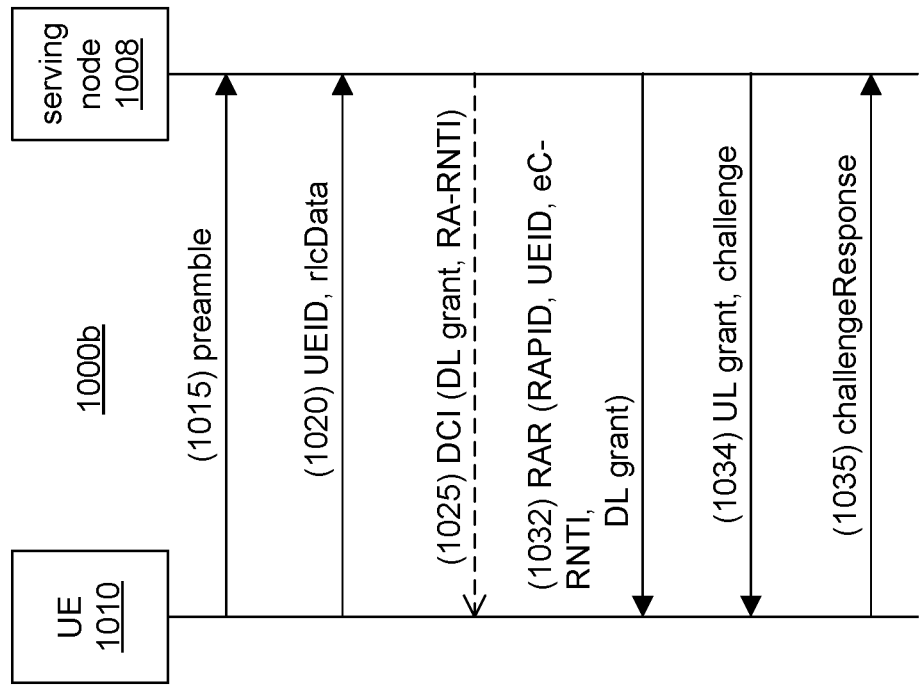
FIGS. 10A & 10B are signaling diagrams illustrating embodiments of an uplink transmission procedure between a UE and a serving node.
Figure 10A:
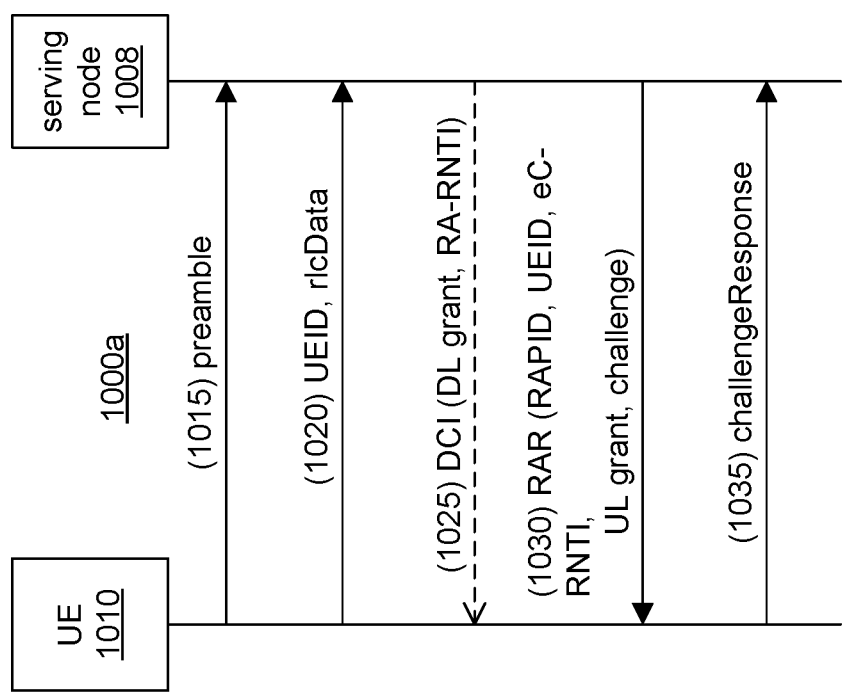

FIG. 10A illustrates a conventional 2-step RA procedure 1000a with transmission of the security challenge in an RAR, and FIG. 10B illustrates a 3-step RA procedure 1000b required to provide the security challenge in a separate downlink transmission.

For an uplink procedure, the UE 1010 can arbitrarily select a random access preamble and transmits the preamble in a scheduled random access channel (e.g. physical random access channel (PRACH)). As this is a contention-based procedure, other UEs associated with the shared session may be served by the serving node 1008 and may have separately elected to transmit at the same time, and potentially may have independently selected the same preamble for transmission in the PRACH. Using uplink resources associated with the selected preamble, in step 1020 the UE transmits its UEID and buffered data to the serving node 1008. This transmission may be formatted such that at least one of the following formats may be used:

- the UEID may be contained in a MAC control element (CE) with a CE type indicating the type and structure of the UEID; and,
- the buffered data (e.g. rlcData) may be contained in a MAC data PDU element that includes the logical channel identifier (LCID) corresponding to the data radio bearer (DRB) selected by the UE 1010 to convey this information over the radio link.

In step 1025 the serving node 1008 transmits a downlink grant using a DCI encoded with a predefined random access RNTI (RA-RNTI) that points to a region in the PDSCH that contains a random access response (RAR).

Referring to FIG. 10A, if the security challenge can be accommodated in the RAR, in step 1030 the serving node 1008 can transmit to the UE 1010 a RAR that contains a list of random access preamble identifiers (RAPIDs) corresponding to the preambles detected by the serving node in the PRACH. For each RAPID, the serving node 1008 can provide any or all of:

- a contention resolution identity containing the UEID received by the serving node 1008 in step 1020;
- a temporary C-RNTI assignment that will later become the ephemeral C-RNTI (eC-RNTI) used by the UE 1010;
- an uplink grant that may be used by the UE 1010 to subsequently transmit its challenge response; and
- a security challenge generated by the serving node 1008.

After receiving the RAR, the UE 1010 can compare the UEID contained in the contention resolution identity of step 1030 against its own UEID (i.e. the UEID transmitted in step 1020).

- if there is a match, uplink transmission of the data can be deemed successful and the UE 1010 proceeds to step 1035; and,
- if there is not a match, uplink transmission of the data can be deemed unsuccessful (e.g. another UE 1010 may have transmitted the same preamble in step 1015) and the UE 1010 can terminate the procedure; the UE 1010 may attempt to retransmit the data through any of a number of different techniques including by repeating this procedure at a later time.

Following a successful match, in step 1035, and using the uplink grant provided in step 1030, the UE 1010 can transmit the UE-generated challenge response to the serving node 1008. In some embodiments, the UE-generated challenge response may be contained in a dedicated MAC control element (CE) with an appropriate CE type.

Referring to FIG. 10B, if the security challenge cannot be accommodated in the RAR, then in step 1032 the serving node 1008 transmits a RAR that contains a list of random access preamble identifiers (RAPIDs) corresponding to the preambles detected by the serving node in the PRACH. For each RAPID, the serving node 1008 provides at least one of:

- a contention resolution identity containing the UEID received by the serving node 1008 in step 1020;
- a temporary C-RNTI assignment that will later become the ephemeral C-RNTI (eC-RNTI) used by the UE 1010; and,
- a downlink grant that will be used to transmit the security challenge to the UE 1010. This is distinct from conventional procedures in which a conventional RAR includes an uplink grant, and not a downlink grant.

Following transmission of the RAR, in step 1034 the serving node 1008, using the downlink grant indicated in the RAR, transmits to the UE 1010 at least one of:

- an uplink grant that may be used by the UE 1010 to transmit its uplink PDU; and,
- a security challenge generated by the serving node 1008.

The remaining steps in FIG. 10B performed by the UE 1010 are the same as the steps in FIG. 10A.

Figures 11A, 11B:
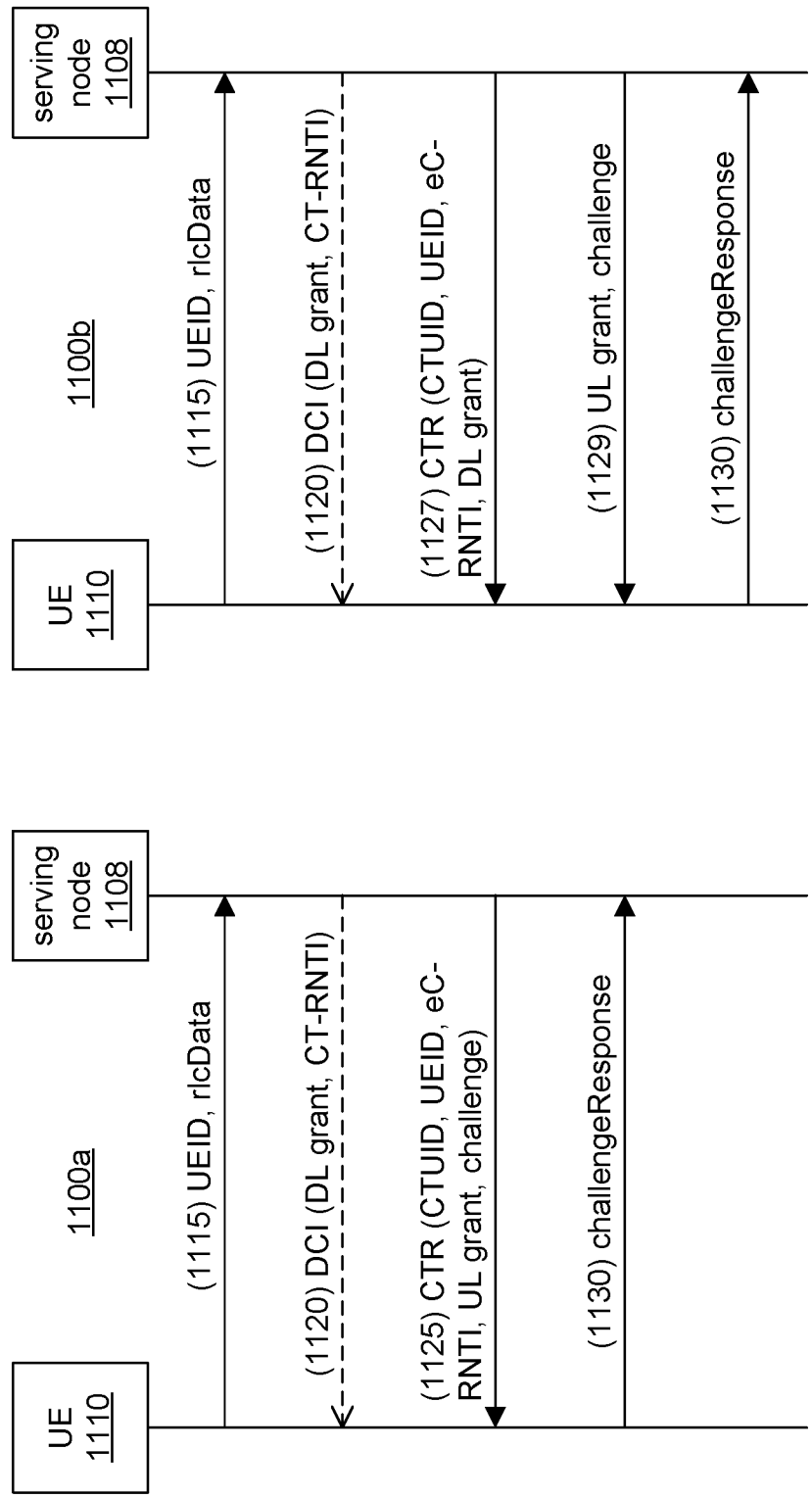
FIGS. 11A & 11B are signaling diagrams illustrating embodiments of an uplink transmission procedure between a UE and a serving node.

FIG. 11A illustrates a 2-step NOMA grant-free procedure 1100a with transmission of the security challenge in a contention transmission response (CTR), and FIG. 11B illustrates a 3-step NOMA grant-free procedure 1100b required to provide the security challenge in a separate downlink transmission.

For an uplink procedure, in step 1115 the UE 1110 uses a contention transmission unit (CTU) to transmit its UEID and buffered data (e.g. rlcData) to the serving node 1108. The CTU that is used may have been arbitrarily selected by the UE 1110, or may have been previously assigned to the UE 1110, or may have been derived algorithmically by the UE 1110. Other UEs may have independently decided to transmit on the same CTU.

If an asynchronous acknowledgement is used, in step 1120 the serving node 1108 transmits to the UE 1110 a downlink grant using a DCI encoded with a predefined contention transmission RNTI (CT-RNTI) that points to a region in the PDSCH that contains a contention transmission response (CTR). Step 1120 is not required if the CTR is a synchronous acknowledgement using a downlink resource associated with the CTU.

Referring to FIG. 11A, if the security challenge can be accommodated in a contention transmission response, the serving node 1008 can transmit a CTR to the UE 1110 that includes the security challenge. The CTR can contain a list of contention transmission unit identifiers (CTUIDs) corresponding to the CTUs where an uplink transmission was detected by the serving node. For each CTUID, the serving node provides at least one of:

- a contention resolution identity containing the UEID received by the serving node in step 1115;
- a temporary C-RNTI assignment that will later become the ephemeral C-RNTI (eC-RNTI) used by the UE 1110;
- an uplink grant that may be used by the UE 1110 to subsequently transmit its challenge response; and,
- a security challenge generated by the serving node 1108.

Referring to FIG. 11B, if the security challenge is to be provided in a separate downlink transmission, in step 1127 the serving node 1008 transmits a CTR to the UE 1110 that includes a downlink grant (DL grant) rather than the security challenge. The CTR contains a list of contention transmission unit identifiers (CTUIDs) corresponding to the CTUs where an uplink transmission was detected by the serving node 1108. For each CTUID, the serving node 1108 provides at least one of:

- a contention resolution identity containing the UEID received by the serving node 1108 in step 1115;
- a temporary C-RNTI assignment that will later become the ephemeral C-RNTI (eC-RNTI) used by the UE 1110; and,
- a downlink grant that will be used to transmit the security challenge to the UE 1110.

In step 1129, the serving node 1108, using the downlink grant indicated in the CTR, transmits to the UE 1110 at least one of:

- an uplink grant that may be used by the UE 1110 to transmit its challenge response; and,
- a security challenge generated by the serving node 1108.

Responsive to receiving the security challenge, the UE 1110 generates a challenge response and, using the uplink grant, in step 1130 the UE 1110 transmits to the serving node 1108 its computed UE-generated challenge response. In some embodiments, the UE-generated challenge response may be contained in a dedicated MAC control element (CE) with an appropriate CE type.

Figure 12:
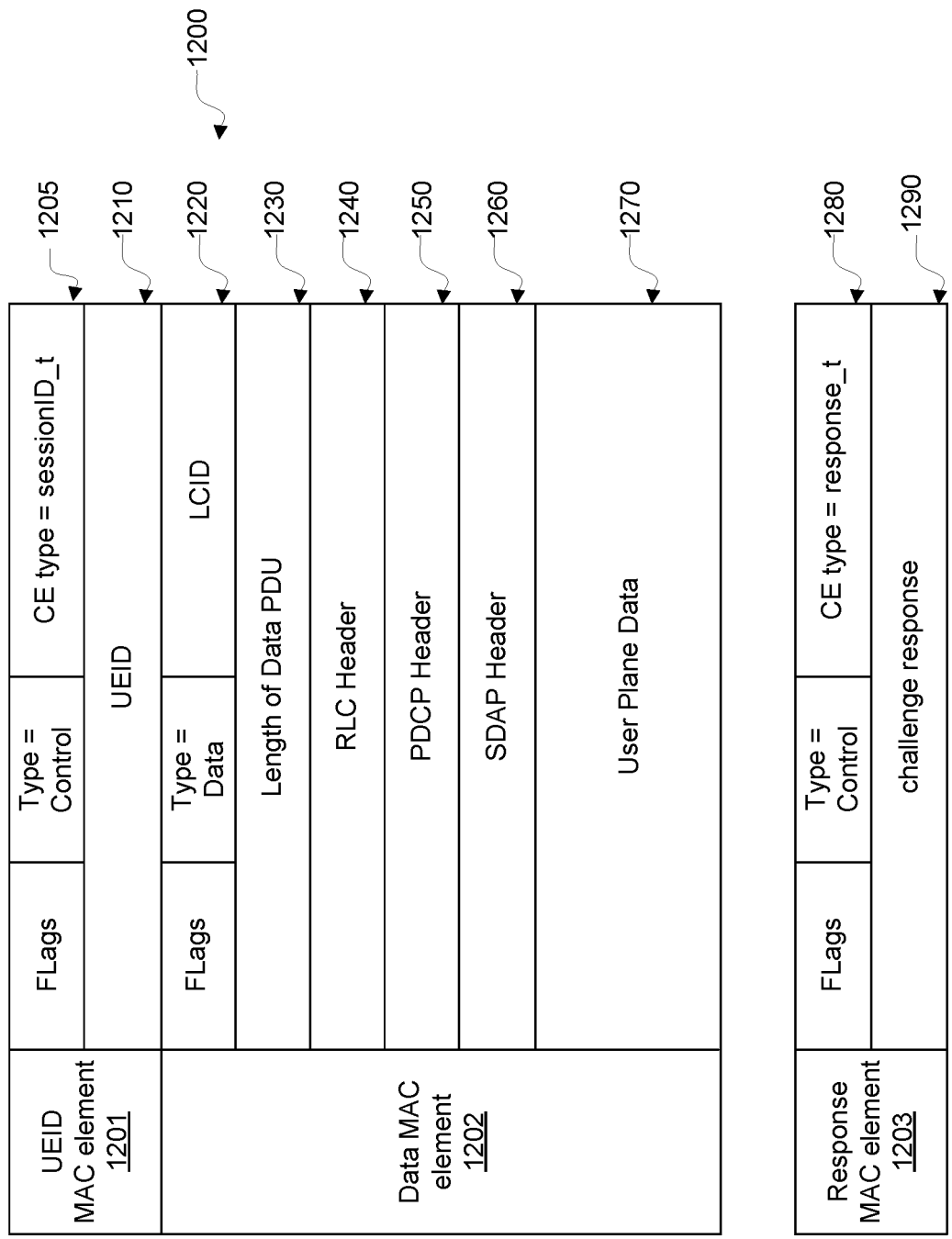
FIG. 12 is a block diagram illustrating an embodiment of an uplink protocol data unit (PDU) for transmission by a UE.

FIG. 12 is a block diagram illustrating an embodiment of an uplink PDU 1200 for transmission by a UE to a serving node.

The PDU 1200 contains at least a UEID MAC element 1201 for the UEID and a data MAC element 1202 for the data. In some embodiments, the PDU 1200 may further include a response MAC element 1203 for the challenge response.

In the embodiment of FIG. 12, the UEID MAC control element (CE) 1201 includes any or all of the following fields:

- a MAC element header 1205 indicating that it is Control element of type "sessionID_t", where "sessionID_t" is a predefined value; and,
- a UEID field 1210 storing the UEID assigned to, or derived by, the UE for use in inactive mode operations.

The inclusion of the UEID MAC CE 1201 may indicate to the serving node that the UE has initiated an uplink data transmission while in inactive mode. The type or structure of the UEID MAC CE 1201 can allow the serving node to distinguish between a dedicated UE session and a shared session. Accordingly, the UEID MAC CE 1201 identifies the uplink data transmission as a shared session communication.

The data MAC element 1202 may include one or more of the following fields:

- a MAC element header 1220 indicating that this is a Data element; this field also includes the logical channel identifier (LCID) associated with the data radio bearer (DRB) selected by the UE for conveying the user plane data over the uplink;
- a length field 1230 indicating the length of the data PDU (i.e. indicating the size of the MAC data element 1202), for instance in a number of octets;
- a Radio Link Control (RLC) header 1240;
- a Packet Data Convergence Protocol (PDCP) header 1250;
- a Service Data Adaptation Protocol (SDAP) header 1260; and,
- a user plane data field 1270, containing the data (information) destined for a remote corresponding node connected to the Internet-at-large.

The response MAC element 1203 may include one or more of the following fields:

- a MAC element header 1280 indicating that it is Control element of type "response_t", where "response_t" is a predefined value; and,
- the challenge response 1290 computed by the UE.

In a 4-step RA procedure, or a 5-step RA procedure, as described above, the response MAC CE, UEID CE and data PDU can be transmitted together in the same MAC PDU. In the 2-step RA procedure, the 3-step RA procedure, and in the NOMA grant-free procedure described above, the challenge response MAC CE can be transmitted in a separate MAC PDU. Other MAC control elements may also be included as required (e.g. buffer status report, BSR).

In some embodiments, asynchronous HARQ may be used for recovery from transmission errors following the assignment of an eC-RNTI to the UE by the serving node.

In some embodiments, RLC procedures may be used to transmit an uplink PDU that must be segmented across multiple transport blocks. These RLC procedures make use of the eC-RNTI assigned to the UE by the serving node.

Figure 13:
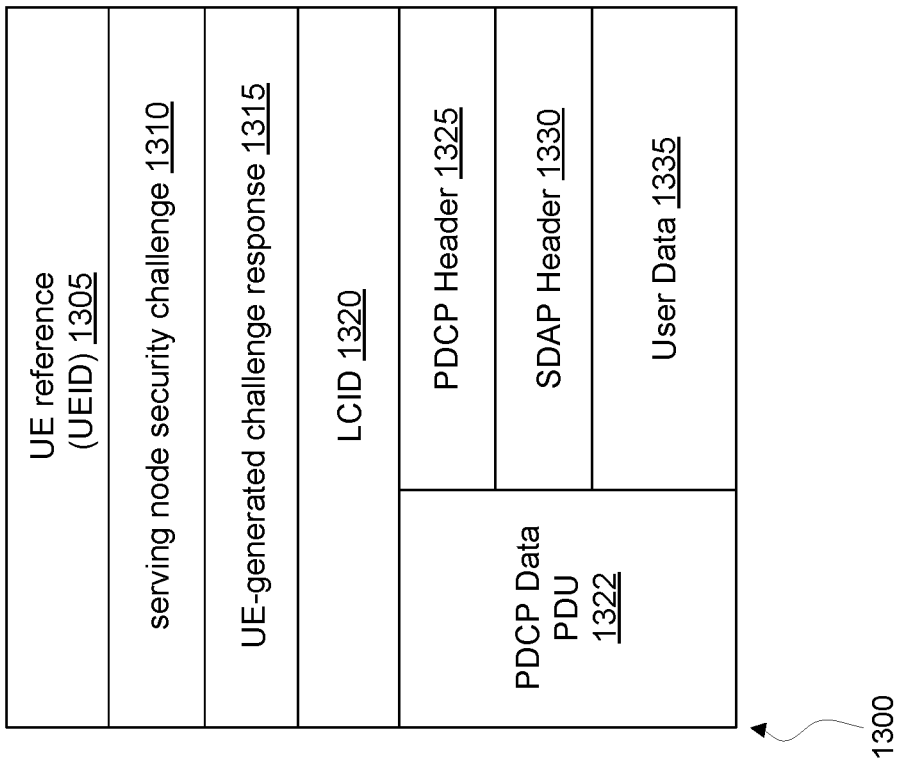
FIG. 13 is an embodiment of an uplink Rn transfer packet.

Once the serving node has successfully received a complete uplink RLC PDU, the upper layer PDU headers (at least one of PDCP and SDAP) and user data are forwarded over an intra-RAN (Rn) network to the anchor node. In some embodiments, the anchor node has been identified by the UEID associated with the transmission. Referring to FIG. 13, an embodiment of an intra-RAN (Rn) message 1300 used to transfer the PDU over the Rn interface between the serving node and the anchor node may include any or all of the following information:

- a UE reference 1305, comprising at least the UEID 700 as received from the UE;
- the serving node security challenge 1310 issued by the serving node and the UE-generated challenge response 1315 provided by the UE;
- the LCID 1320 included in the MAC data element by the UE; and,
- the upper layer data (e.g. pdcpData) 1322 received from the UE, including one or more of:
    PDCP header 1325;
    SDAP header 1330, if provided by the UE; and,
    the user data 1335 for forwarding to a remote corresponding node.

When an uplink RLC PDU is successfully received from the UE by a serving node, the user data and the upper layer (e.g. at least one of PDCP and SDAP) headers are forwarded to the anchor node along with the UEID provided by the UE. Upper layer procedures for a shared session (e.g. PDCP and SDAP procedures) are subsequently performed in the anchor node.

Figure 14A:
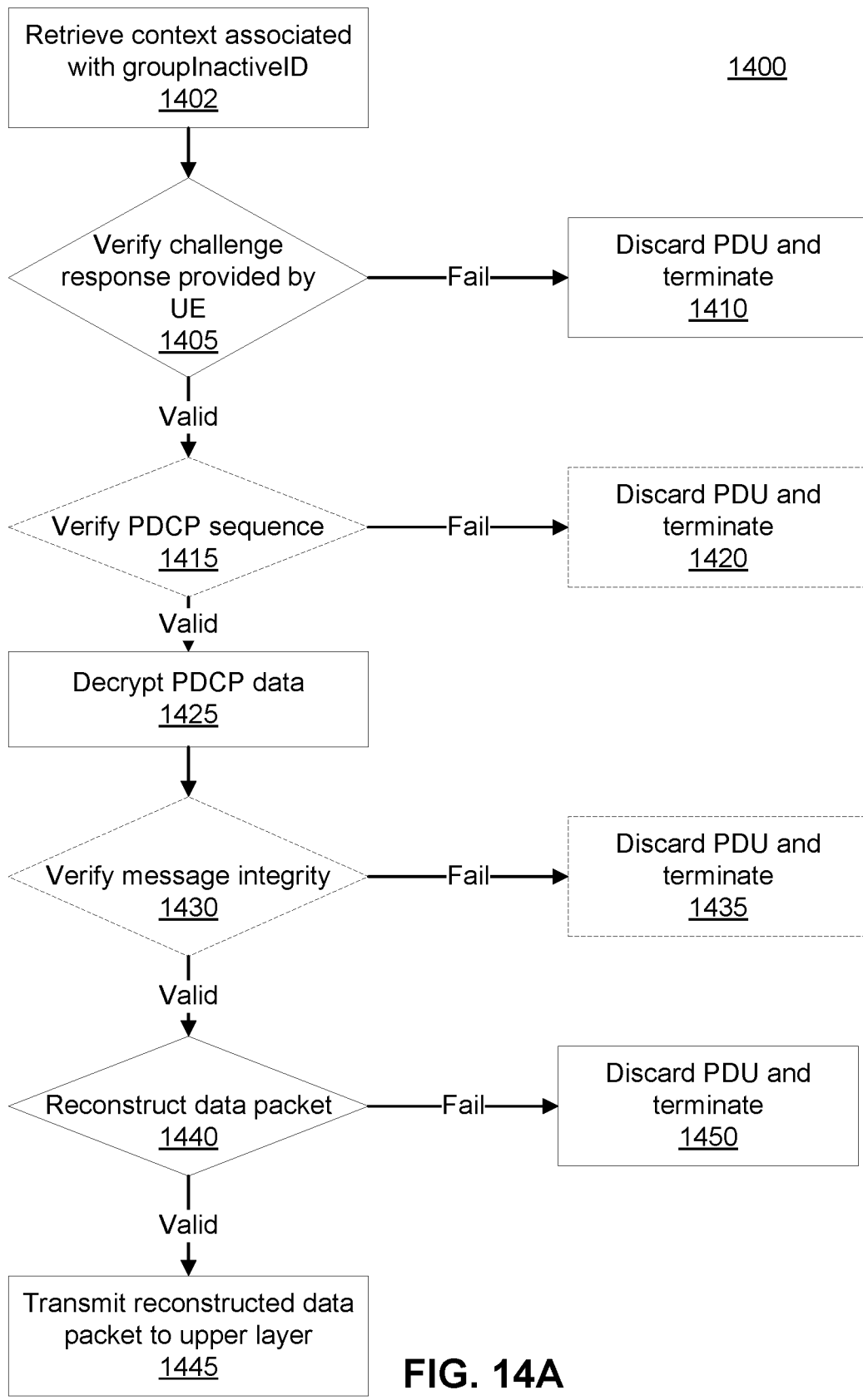
FIG. 14A illustrates an embodiment for uplink data packet reconstruction.

Referring to FIG. 14A, an embodiment of a method 1400 for uplink data packet reconstruction is presented. In some embodiments, the method may be executed by the anchor node.

In step 1402, the anchor node retrieves the context associated with shared session based on the shared session identifier (e.g. groupInactiveID) included the UEID provided by the UE. In particular, retrieving the context associated with the shared session may include the anchor node being operative to obtain at least one of:

the cryptographic parameters currently associated with the group or with the shared session (e.g. cryptographic keys and algorithms); and, RRC configuration parameters associated with the shared session.

In step 1405, the anchor node verifies, based on the security challenge provided by the serving node and the cryptographic keying material associated with the shared session, the UE-generated challenge response provided by the UE.

If the challenge response is determined to not be valid by the verification of step 1405, in step 1410 the anchor node can discard the received PDU and terminate the current procedure.

If the challenge response is determined to be valid by the verification of step 1405, and if the UE has been configured with a valid range of PDCP sequence numbers for this LCID, in step 1415 the anchor node can optionally verify that the PDCP sequence number is valid (e.g. is within the allowed range for the LCID).

If the PDCP sequence number is determined to not be valid in step 1415, in step 1420 the anchor node can discard the received PDU and terminates the current procedure.

If the PDCP sequence is verified, or if the verification of PDCP sequence is not performed, and the UE has been configured for user plane encryption (for this LCID), in step 1425 the anchor node decrypts the PDCP data (see FIG. 14B) using the configured cryptographic parameters and a COUNT computed from (or otherwise associated with) the PDCP sequence number received with the PDU.

If the UE has been configured to include a message integrity check (for this LCID), in step 1430 the anchor node (optionally) performs a verification of whether a message integrity check has been included (see FIG. 14C) and that it is valid. If the message integrity check fails, in step 1435 the anchor node can discard the received PDU and terminate the current procedure.

Subsequent to the verification of the message integrity in step 1430, or if the verification is not performed subsequent to the decryption of the PDCP data, the anchor node reconstructs the data packet in step 1440 and, if the reconstructed data packet is valid, in step 1445 the anchor node transmits the reconstructed data packet to upper layers for forwarding to a remote corresponding node via the CN (i.e. in-order delivery of PDCP PDUs is always disabled for shared session LCIDs). In some embodiments, the transmission of the reconstructed data packet may be performed immediately. If the reconstructed data packet is not valid, in step 1450 the anchor node discards the received PDU and terminates the current procedure.

FIG. 14B illustrates an example of an embodiment of a PDCP data PDU 1455 without message integrity check. FIG. 14C illustrates an example of an embodiment of a PDCP Data PDU 1460 further including a message integrity check field 1465. The PDCP sequence number field 1457 can be used to contain a sequence number that has been chosen (randomly) by the UE based, for example, on a [min, max] range previously provided by the anchor node during RRC configuration.

In some embodiments, the UE may request confirmation from the anchor node that the PDU was successfully received and processed by the network by setting a poll flag 1459 (e.g. $P_{PDCP}$) in the PDCP PDU header (FIGS. 14B & 14C). If the anchor node reconstructed a valid data packet in step 1440, and if the UE requests confirmation (e.g. $P_{PDCP}=1$), the anchor node may be operative to construct a PDCP status PDU, and to transmit the PDCP status PDU towards the UE, for instance via the serving node. The PDCP status PDU indicating which PDCP data PDUs have been successfully received and reconstructed by the anchor node.

In some embodiments, if the PDU received by the anchor node includes an SDAP data PDU header, the anchor node can use the QoS flow identifier associated with the user plane PDU for subsequent SDAP operations (e.g. for applying a QoS mark to the NG-U packet transmitted to the CN UPGW).

Downlink Transmission Operations

Embodiments of procedures for downlink data transmissions using a shared session will be discussed in more detail.

Downlink data transmission in the inactive mode requires processing at a serving node to send a paging notification to the target UE(s) and, if a page response is received, to validate the responding UE(s) before delivering the downlink data over the radio link to the validated UE(s). Construction of the upper layer downlink PDU and ciphering of the PDU data is performed by the anchor node before delivery of the downlink PDU to the serving node.

When an anchor node receives a downlink user data packet and determines that an inactive mode delivery should be attempted, the anchor node may be operative to construct a downlink data plane PDU and to transmit the downlink data plane PDU to a set of target nodes within the RAN notification area assigned to the UE session group. Similarly, if the anchor node determines that the configuration of the UE should be updated while the UE is in an inactive mode, the anchor node may be operative to construct a control plane PDU (e.g. an RRC message) and to forward the control plane PDU to the set of target nodes within the RAN notification area assigned to the UE session group. The term downlink PDU is used herein to describe both data plane PDUs and control plane PDUs. In some embodiments, the downlink PDU may include upper layer 2 (e.g. PDCP and SDAP) protocol headers.

As described above, validation of the UE is performed using group cryptographic keys that are known to all UEs assigned to the group or to the shared session. To prevent replay attacks, a target UE can be validated using a challenge/response mechanism in which the anchor node provides the serving node with both a security challenge and an expected challenge response. The security challenge is transmitted to the UE by the serving node prior to transmission of the downlink PDU to the UE. In order to receive the downlink PDU, the UE must use the security challenge to generate a challenge response, and transmit the UE-generated challenge response to the serving node. The UE-generated challenge response is then validated by the serving node by comparing the UE-generated challenge response to the expected challenge response received from the anchor node. Downlink transmission of the datat can then only be attempted by the serving node if the UE provides a valid challenge response to the security challenge. In some cases, the challenge/response mechanism may require an additional step as compared with a basic inactive mode downlink transmission procedure without challenge/response.

If requested, at least one of the target and serving nodes report their delivery status to the anchor node. If no page response is received by a target node, the target node discards the downlink PDU. If the anchor node did not request a delivery status report from the target node(s) in the event paging was unsuccessful, the target node takes no further action. If the anchor node requested a delivery status report from the target node(s) in the event paging was unsuccessful, the target node transmits a delivery status report to the anchor node indicating paging failure.

If a target UE responds to the page, but fails to provide a valid challenge response to the serving node, the serving node may be operative to transmit to the anchor node a delivery status report indicating an unsuccessful delivery attempt (and optionally indicate the failed challenge/response as the reason for delivery failure). In some embodiments the serving node may be operative to transmit the delivery status report based on an instruction received from the anchor node.

If the downlink PDU is destined for a particular UE, only one of the target nodes will normally succeed and act as a serving node to transmit the downlink PDU to the UE. Responsive to receiving confirmation of successful receipt of the downlink PDU from the UE, the serving node transmits a successful delivery acknowledgement to the anchor node.

If the downlink PDU is destined for a group of UEs, more than one of the target nodes may succeed and each will act as a serving node to transmit the downlink PDU to the UEs. Responsive to receiving confirmation of successful receipt of the downlink PDU from the UEs, each serving node may send successful delivery acknowledgement(s) to the anchor node. If the anchor node fails to receive a successful delivery acknowledgement from any of the target nodes, it may initiate a paging failure recovery procedure.

Downlink transmission from a serving node (i.e. a target node that serves a responding UE) to the UE(s) only involves lower layer radio link procedures (e.g. PHY, MAC and RLC). The upper layer procedures (e.g. PDCP, SDAP, session management) are provided by the anchor node.

The upper layer operations in the anchor node will now be discussed.

The shared session context maintained by the anchor node typically includes at least one of the following information elements:
  the cryptographic keying material currently associated with the shared session (e.g. group cryptographic keys and algorithms);
  session configuration information (e.g. QoS profiles with QoS flow identifiers, UPGW information);
  RRC configuration parameters; and,
  the PDCP sequence number configuration currently associated with each LCID.

Based on the session and RRC configuration information, the anchor node is operative to map a received downlink user data packet onto a corresponding data radio bearer (DRB). This DRB may, in turn, be used to identify a particular RRC configuration and context. Similarly, a downlink RRC message may be mapped onto a signalling radio bearer (SRB) with a particular RRC configuration and context.

After mapping the received downlink data packet to the corresponding DRB or SRB, the anchor node is operative to construct a downlink PDU (e.g. see FIGS. 14B & 14C) using a valid PDCP sequence number for the selected radio bearer (DRB or SRB).

When the target UE has been configured to expect a message integrity check (for this LCID) in the downlink PDU, the anchor node may be further operative to compute an integrity check value using the derived COUNT and the configured cryptographic parameters from the cryptographic keying material. The anchor node is then operative to append the integrity check value to the downlink PDU (e.g. see FIG. 14C).

If the UE was configured for encrypted communications (for this LCID), the anchor node encrypts the downlink PDU using the COUNT input variable derived from the PDCP sequence number and the configured cryptographic parameters from the cryptographic keying material, as described above.

In some embodiments, the anchor node may set a poll request (e.g. $P_{PDCP}=1$) if the anchor node requires acknowledgement from the UE that the downlink PDU was successfully received and authenticated.

A group RAN notification area (RNA) 301 identifies where a group of UEs associated with the shared session can receive service under the shared session. While within the group RNA, the UE may operate in an inactive mode. A UE of the group is provided with the assigned RNA before entering the inactive mode. In some embodiments, the UE may also be configured to transmit to a serving node a location report indicating its location based on a trigger. The trigger may include, for instance, expiry of a timer, or a measured location based on UE mobility information that is indicative that the UE has moved, or is likely to move, outside of its assigned RNA.

Figure 15:
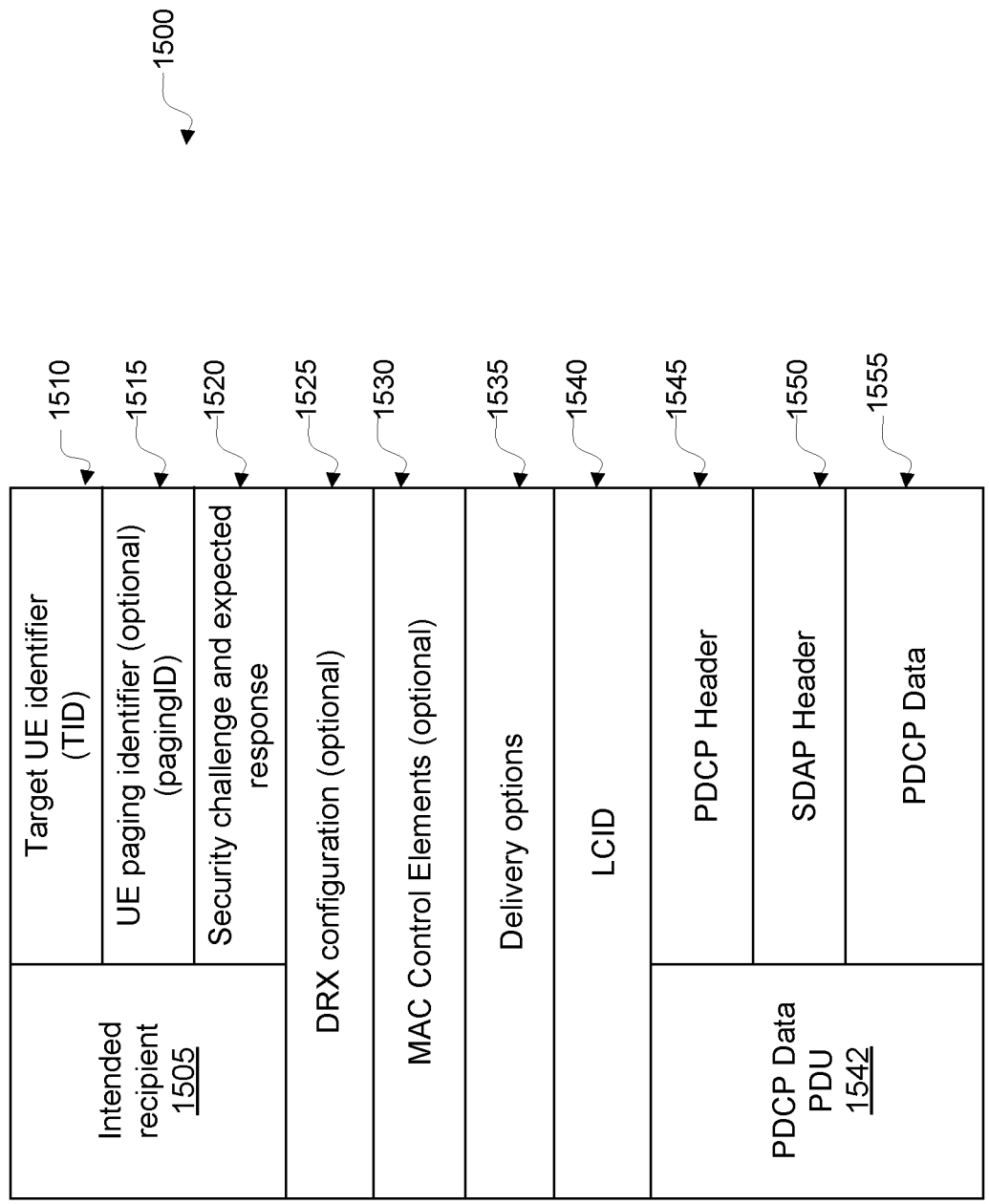
FIG. 15 illustrates an embodiment of an Rn downlink PDU.

After the anchor node has constructed a downlink PDU, the anchor node uses the RNA configuration and, optionally, available UE mobility information to determine a set of target nodes encompassing one or more cells of the RNA. The downlink PDU is encapsulated in an Rn PDU for transmission across the intra-RAN network. The anchor node transmits a copy of the Rn PDU to each target node of the set of target nodes. FIG. 15 illustrates an embodiment of an Rn PDU 1500 that may include any or all of the following information elements:
  A list of one or more intended recipients 1505 each of which may include any or all of:
    a target UE identifier (TID) 1510 to identify at least one UE within the group of UEs associated with the shared session that is to receive the downlink data;
    a RAN paging identifier (pagingID) 1515 associated with at least one UE that is to receive the downlink data, if different from the TID; and,
    a challenge/response 1520 including a security challenge generated by the anchor node and the corresponding challenge response expected from the targeted UE.
  Alternatively, in some embodiments, in place of a list of one or more intended recipients, a single intended group recipient may be provided that may include any or all of:
    A TID in the form of a group paging identifier (groupPagingID) associated with a group of targeted UEs that are to receive the downlink data. In some embodiments, a TID 1510 may be a UEID 700. In some embodiments, a TID 1510 may be another identifier associated with a UE, or group of UEs, such as a temporary mobile station identifier (TMSI).

A challenge/response including a security challenge generated by the anchor node and the corresponding challenge response expected from the each of the targeted UEs in the group.

an optional discontinuous reception (DRX) configuration parameter 1525 indicating configured opportunities for transmission to UEs within the shared session that may be used for delivery of the downlink PDU. If provided, these configured downlink transmission opportunities are used rather than default opportunities derived from the pagingID or TID.

the LCID 1540 associated with the DRB or SRB selected by the anchor node for delivery of the downlink PDU.

a set of delivery options 1535 that may include one or more of the following:
   the identity of cells within the target node that comprise (part of) the RNA associated with the shared session;
   the RLC mode configured for the designated LCID (e.g. assured mode or un-assured mode); and,
   an indication of whether the target node should provide a delivery status report to the anchor node for at least one of a successful and an unsuccessful delivery attempt.

the upper layer data comprising a PDCP data PDU 1542 for delivery to the UE including, for instance:
   PDCP header 1545;
   SDAP header 1550 (if required); and,
   PDCP data 1555 comprising at least one of the encrypted and authenticated upper layer packet.

optional MAC control elements 1530 which may include, for example, a new UEID to be used with subsequent inactive mode procedures.

The downlink operations at the serving node will now be described.

When the downlink Rn data PDU is received by a target node, the target node determines the next paging opportunity, either obtained directly from the DRX configuration if provided by the anchor node, or derived from a paging identifier or target UE identifier (TID) received from the anchor node. In either case, at the scheduled opportunity, the target node is operative to construct and broadcast a paging notification that may be addressed to the UE(s) identified by the paging identifier or TID supplied by the anchor node. If a group paging identifier was provided by the anchor node, the serving node broadcasts a single paging notification. If a list of intended UE recipients was provided by the anchor node, the serving node broadcasts a paging notification at the scheduled paging opportunity for each of the target UEs. In some embodiments, the paging notification may comprise the TID. In some embodiments the paging notification may be broadcast with a security challenge. In some embodiments, the security challenge may be transmitted in response to receiving a reply to the paging notification from one or more responding UE(s).

In embodiments where the security challenge is transmitted in response to receiving a reply to the paging notification, when a page response is received from a responding UE that includes a responding UE identifier (RID) that corresponds to one of the intended recipients provided by the anchor node, the now-serving node (i.e. a target node that receives a response to its paging notification) initiates validation of the responding UE by transmitting the security challenge received from the anchor node to the responding UE. The responding UE will then transmit a challenge response in a subsequent uplink transmission.

In embodiments, where the security challenge is transmitted with the paging notification, a responding UE will include a responding UE identifier (RID) and a challenge response when responding to the paging notification.

In these embodiments the serving node may evaluate the received RID to confirm that it corresponds to a TID or paging identifier of an intended recipient identified by the anchor node. The evaluation may, for instance, confirm that the RID is correctly associated with the TID or paging identifier. The association may for instance, comprise a lookup by the serving node to confirm correspondence between the RID received form the responding UE and the TID received from the anchor node. In other implementations, the evaluation may confirm that the RID matches the TID or paging identifier.

Upon to receiving a UE-generated challenge response from the responding UE, the serving node evaluates the received challenge response to confirm a match with the expected challenge response provided by the anchor node. If the received UE-generated challenge response matches the expected challenge response, the responding UE is deemed to have been validated by the serving node. The serving node is operative to transmit the downlink PDU to the validated UE and, if requested, report the delivery status to the anchor node.

If the received UE-generated challenge response does not match the expected challenge response provided by the anchor node, the target node abandons the delivery attempt and, in some embodiments provides an unsuccessful delivery status report to the anchor node.

If no page response is received, the target node discards the downlink PDU. Depending upon configuration by the anchor node, if the anchor node did not request a delivery status for unsuccessful paging no paging status report is provided by the target node to the anchor node. Alternatively, if the anchor node requested a delivery status for unsuccessful paging, a delivery status report is provided by the target node to the anchor node indicating a failed paging.

Variations of inactive mode downlink transmission procedures may be provided, several examples follow.

Figure 16A:
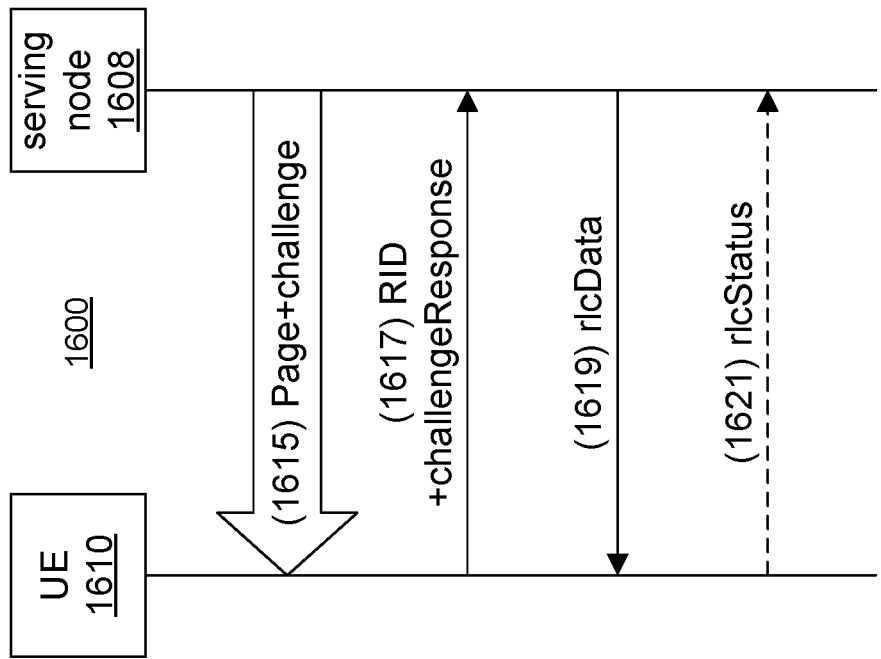
FIG. 16A is a signaling diagram illustrating an embodiment of a downlink transmission procedure between a serving node and a UE.

When a UE responds to a paging notification from one of the target nodes, that target node is then deemed to be a serving node. FIG. 16A is a signaling diagram illustrating an embodiment of a downlink transmission procedure between a serving node 1608 and a UE 1610. FIG. 16A illustrates a "baseline" procedure 1600, generally characterized by three (or optionally four) exchanges between the serving node 1608 and the UE 1610.

In step 1615 the serving RAN 1608 transmits a paging notification to at least one target UE in its coverage area. In some embodiments, the transmission of the paging notification may take the form of a broadcast transmission. The paging notification broadly includes a security challenge originally received from the anchor node as described above.

When a UE 1610 determines that it is identified in a received paging notification, the UE 1610 computes a challenge response using the received security challenge. In step 1617 the UE 1610 responds to the paging message and security challenge by transmitting to the serving node 1608 an identifier (RID) associated with the responding UE 1610 and the UE-generated challenge response.

The serving node verifies the RID and the UE-generated challenge response and, if valid, in step 1619 transmits to the UE 1610 a downlink PDU (i.e. in some embodiments the PDCP data PDU and, optionally, MAC control elements provided by the anchor node). The downlink PDU (e.g. rlcData) may be transmitted, for instance, using the RLC and MAC procedures of the serving node 1608. In some embodiments, HARQ may be used for recovery from transmission errors at the serving node 1608.

In an optional fourth stage, in step 1621 the UE 1610 transmits to the serving node 1608 an RLC status message (e.g. rlcStatus) in the form of a delivery status report that confirms successful receipt of the downlink PDU by the UE 1610. The execution of the optional fourth stage may be performed when the UE 1610 has been configured to provide the delivery status report. The UE 1610 may be configured, for instance, by the serving node 1608, or the anchor node, transmitting to the UE 1610 a request for acknowledgement, pre-configuration parameters in the UE 1610, a radio bearer RLC configuration set for assured mode operation, or other configuration means.

In some embodiments, the downlink transmission procedure employed by the serving node 1608 for delivery of the downlink PDU depends on UE configuration signaled to the serving node 1608 by the anchor node. The different downlink transmission procedures modify the manner in which the UE 1610 receives the downlink transmission as described above with reference to FIG. 16A. For instance, in some embodiments the procedure may include any or all of:
- downlink transmission with paging and a conventional 4-step RA procedure. This procedure may be used if a security challenge can be accommodated within a conventional random access response (RAR) transmitted by the serving node 1608.
- downlink transmission with paging and a 5-step RA procedure. This procedure may be used if a security challenge cannot be accommodated within a random access response and must be provided in a separate downlink transmission by the serving node 1608.
- downlink transmission with paging and contention-free 4-step RA procedure. This procedure may be used, along with a contention-free RA procedure, to provide a security challenge in a separate downlink transmission by the serving node 1608.

Figure 16B:
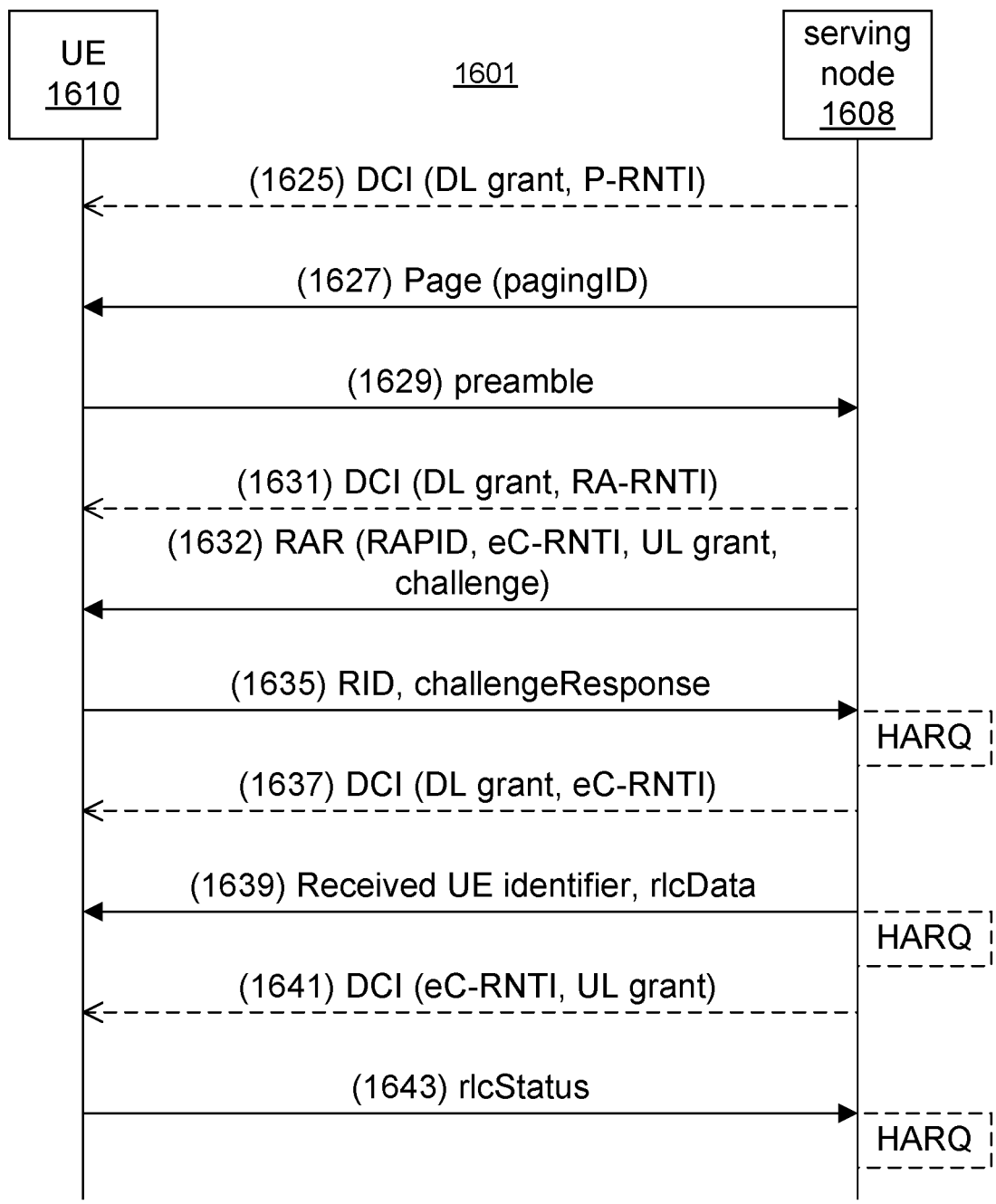
FIG. 16B is a signaling diagram illustrating an embodiment of a contention-based 4-step RA procedure.

FIG. 16B is a signaling diagram illustrating an embodiment of a contention-based 4-step RA procedure 1601.

In optional step 1625 the serving node 1608 is operative to transmit to the UE 1610 a downlink grant to initiate paging using a DCI encoded with the pre-defined paging RNTI (P-RNTI). The timing of the downlink grant transmission may depend on a paging opportunity derived, for example, from the TID associated with the target UE 1610 or may be explicitly provided by the anchor node based on a pre-configured DRX cycle.

In step 1627 the serving node 1608 transmits to the UE 1610 a paging notification using the radio resources indicated in the downlink grant 1625. The paging notification may be a paging message or other indication of the UE 1610 (or group of UEs) being paged. For example, a paging message may contain a list of paging records each of which identifies one of the UEs 1610 or group of UEs being sought. In some implementations, using the paging notification procedure may require a new PagingUE-Identity to be configured to incorporate inactive mode target UE identifiers or other RNA-based paging identifiers. For instance:

```
PagingUE-Identity ::= CHOICE {
    s-TMSI              S-TMSI,
    imsi                IMSI,
```

```
    inactiveID          InactiveIdentity,
    pagingID            RNA-PagingIdentity,
    pagingGroupID       PagingGroupIdentity,
    ...
}
InactiveIdentity ::= BIT STRING (SIZE(pagingIdentitySize))
RNA-PagingIdentity ::= BIT STRING (SIZE(pagingIdentitySize))
PagingGroupIdentity ::= BIT STRING (SIZE(pagingIdentitySize))
```

Responsive to the paging notification transmitted in 1627, if a recipient UE 1610 determines that the identifying component in the paging notification corresponds to one of the identifiers assigned to that UE (i.e. a TID or paging identifier), the UE 1610 conventionally initiates a random access procedure by selecting a random access preamble (in some embodiments the selection may be arbitrary) and in step 1629 transmits the preamble to the serving node 1608 in a scheduled physical random access channel (PRACH). Other UEs in the group may have independently selected the same preamble for transmission in the PRACH.

In optional step 1631 the serving node 1608 transmits, to the UE 1610, a downlink grant using a DCI encoded with a predefined random access RNTI (RA-RNTI) that points to (or otherwise indicates) a region in the PDSCH that contains a random access response (RAR).

In step 1632, based on the downlink grant, the serving node 1608 transmits a RAR to the UE 1610. The RAR contains a list of random access preamble identifiers (RAP-IDs) corresponding to the preambles detected by the serving node 1608 in the PRACH. For each RAPID, the serving node 1608 is operative to provide any or all of:
- a temporary C-RNTI assignment that can be used by the UE 1610 as the ephemeral C-RNTI (eC-RNTI);
- a security challenge, as received by the serving node 1608 from the anchor node; and,
- an uplink grant that may be used by the UE 1610 to transmit to the serving node 1608 the UE's identifier and a challenge response to the security challenge.

After receiving the security challenge, the UE 1610 can compute a UE-generated challenge response using the received security challenge, as described above.

In step 1635, using the received uplink grant, the UE 1610 transmits to the serving node 1608 a responding UE identifier (RID) associated with the PagingUE-Identity in one MAC control element and the UE-generated challenge response in a second MAC control element. In some embodiments, no other information (e.g. an RRC message) is required in this uplink transmission which may be beneficial from the perspective of minimizing signaling.

If the serving node 1608 successfully receives the uplink transmission 1635 from the UE 1610 (i.e. the CRC included in the received transmission block is valid), the serving node 1608 may be operative to confirm either or both of:
- the RID indicated in step 1635 corresponds to a TID associated with an intended recipient previously received from the anchor node; and,
- the UE-generated challenge response received in step 1635 matches the expected challenge response previously received from the anchor node.

If both the RID and challenge response are valid, in optional step 1637 the serving node 1608 transmits a downlink grant to the UE 1610. This transmission of the downlink grant may be performed using a DCI encoded with the eC-RNTI assigned to the UE 1610 in step 1632.

If the serving node 1608 does not receive a response from the target UE (e.g. the UE may not be within the coverage area of the node), serving node 1608 may repeat the paging procedure or abandon the delivery attempt. As explained above, the serving node 1608 (which may be referred to as a target node because a failed delivery attempt results in the target node never actually serving the UE) may abandon the delivery attempt. Depending on configuration and implementation, the abandonment of the delivery attempt may be done either with or without reporting a failed attempt back to the anchor node.

Following transmission of the downlink grant in optional step 1637, in step 1639 the serving node 1608 transmits to the UE 1610 a downlink transmission based on the downlink grant. The downlink transmission can include a received UE identifier, such as the RID received by the serving node 1608 in step 1635, and the downlink PDU encapsulated with an RLC header (e.g. rlcData).

After receiving the downlink transmission corresponding to the downlink grant received in step 1637, the UE 1610 can compare the received UE identifier contained in the contention resolution identity MAC CE of the received downlink transmission 1639 against its own identifier (i.e. the RID that the UE 1610 transmitted in step 1635). In response to the comparison of the received identifier with the UE's own identifier:

If the received UE identifier corresponds to the UE's RID, downlink reception of the downlink PDU is deemed successful.

If the received UE identifier does not match the UE's RID, downlink reception of the downlink PDU is deemed unsuccessful (for instance, another UE may have transmitted the same preamble in step 1629 and the serving node 1608 did not receive the RID from UE 1610). Depending upon configuration, the UE 1610 may attempt to respond to the paging notification by repeating this procedure, starting at step 1629, at a later time.

In embodiments where the serving node 1608 requested an RLC acknowledgement in step 1639, or if the radio bearer RLC is configured for assured mode operation, in optional step 1641 the serving node 1608 transmits to the UE 1610 a DCI containing an uplink grant encoded with the eC-RNTI assigned to the UE 1610

After receiving the DCI (and possibly in response to the receipt of the DCI), and using the uplink grant received in step 1641, in step 1643 the UE 1610 transmits a status report (e.g. rlcStatus) to the serving node 1608. The transmitted status report may confirm successful downlink reception of the RLC data PDU. In some embodiments, the UE 1610 may further be operative to use the uplink grant received in step 1641 to transmit a status report indicating downlink reception failure.

Figure 16C:
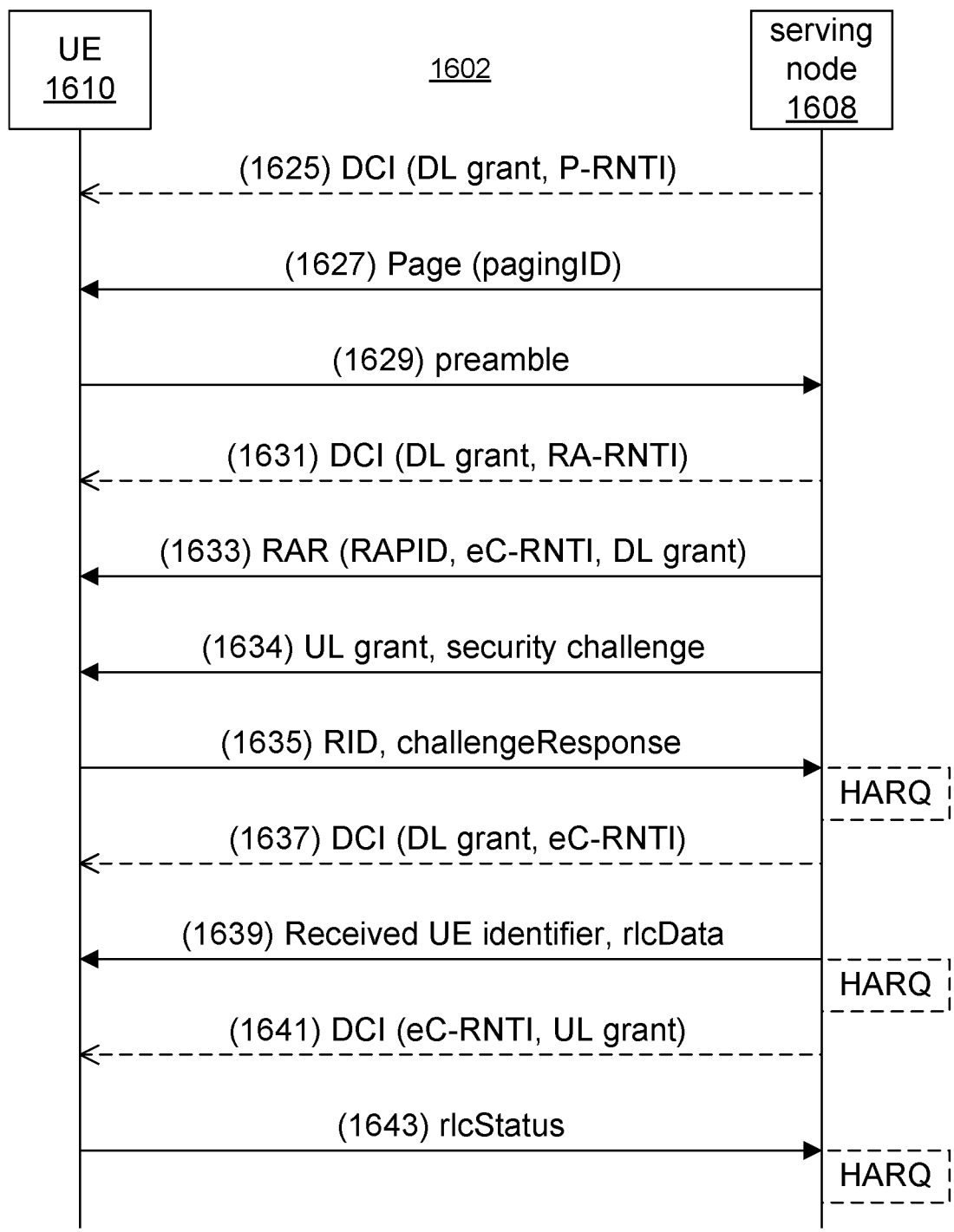
FIG. 16C is a signaling diagram illustrating an embodiment of a contention-based 5-step RA procedure.

FIG. 16C is a signaling diagram illustrating an embodiment of a contention-based 5-step RA procedure 1602. The 5-step RA procedure may be used in a variety of situations including where a security challenge cannot be accommodated within a RAR and must be provided in a separate downlink transmission.

The 5-step RA procedure 1602 of FIG. 16C generally follows the above steps described for the 4-step RA procedure 1601 of FIG. 16B, with the exception that step 1632 is replaced with steps 1633 and 1634. In place of the RAR transmitted in step 1632, in step 1633 the serving node 1608 transmits a RAR that contains a list of random access preamble identifiers (RAPIDs) corresponding to the preambles detected by the serving node in the PRACH. For each RAPID, the serving node provides at least one of:

a temporary C-RNTI assignment that will be used by the UE as the ephemeral C-RNTI (eC-RNTI); and, a downlink grant that can be used by the serving node 1608 to transmit the security challenge. This differs from the 4-step RA procedure RAR that includes an uplink grant and the security challenge, and not a downlink grant.

In step 1634, using the downlink grant transmitted in step 1633, the serving node 1608 transmits to the UE 1610 a downlink message. The downlink message may be transmitted in the downlink grant of step 1633. In some embodiments, the downlink grant can include at least one of:

the security challenge received from the anchor node; and, an uplink grant that may be used by the UE 1610 to transmit its identity and a response to the security challenge.

Figure 16D:
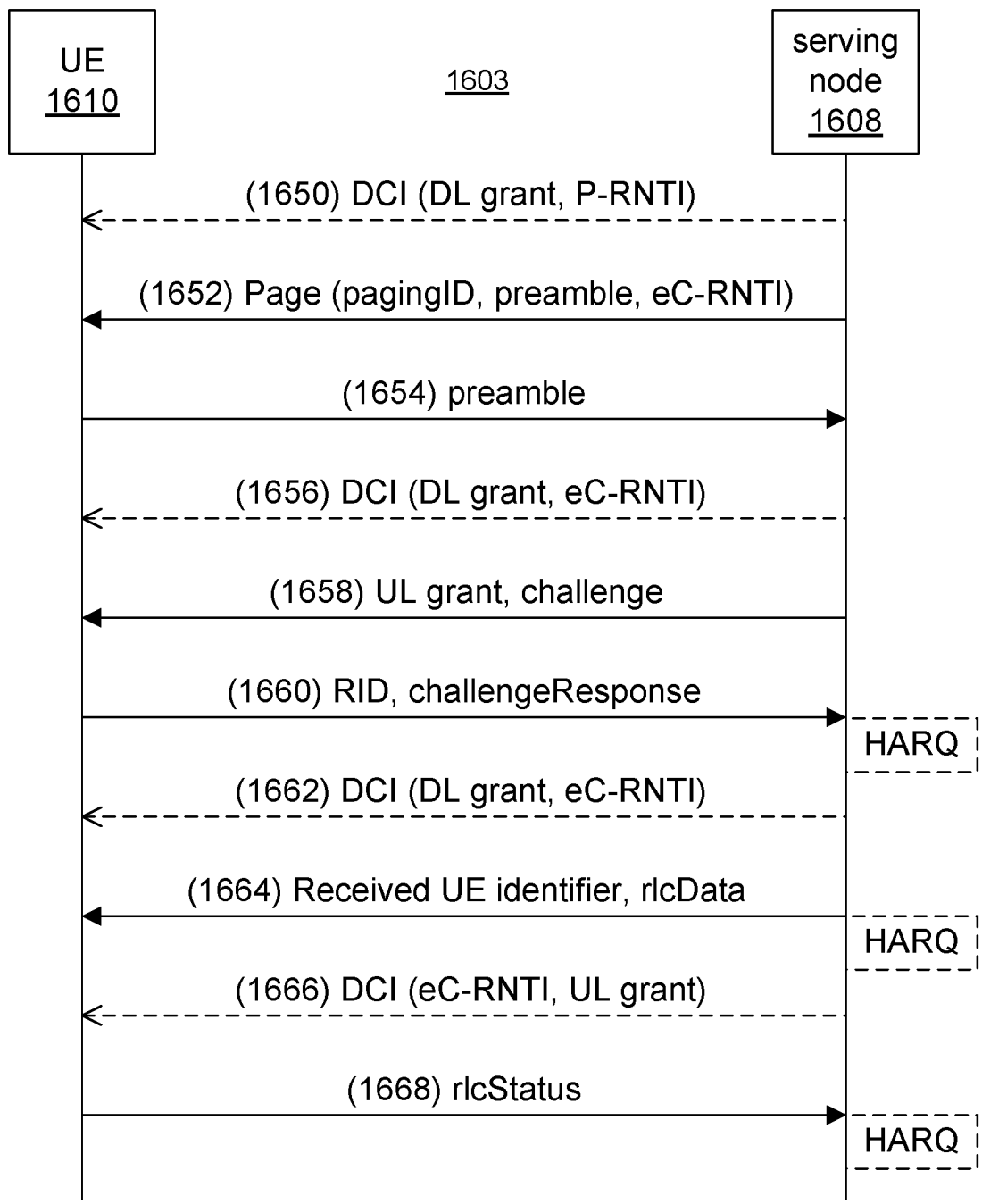
FIG. 16D is a signaling diagram illustrating an embodiment of a contention-free 4-step RA procedure.

FIG. 16D is a signaling diagram illustrating an embodiment of a contention-free 4-step RA procedure 1603.

In optional step 1650 the serving node 1608 transmits to the UE 1610 a downlink grant to initiate paging using a DCI encoded with the pre-defined paging RNTI (P-RNTI). The timing of the downlink grant may depend on a paging opportunity derived, for example, from the TID associated with the target UE, or may be explicitly provided by the anchor node based on a pre-configured DRX cycle.

In step 1652 the serving node 1608, using the radio resources indicated in the downlink grant 1650, transmits to the UE 1610 a paging notification, such as a paging message or other indication of the UE 1610 being paged. For example, a paging message may contain a list of paging records each of which identifies one of the UEs being paged. In some implementations, using the paging notification procedure may require a new PagingUE-Identity to be configured to incorporate inactive mode target UE identifiers or other RNA-based paging identifiers. For instance:

```
PagingUE-Identity ::= CHOICE {
    s-TMSI              S-TMSI,
    imsi                IMSI,
    inactiveID          InactiveIdentity,
    pagingID            RNA-PagingIdentity,
    ...
}
InactiveIdentity ::= BIT STRING (SIZE(pagingIdentitySize))
RNA-PagingIdentity ::= BIT STRING (SIZE(pagingIdentitySize))
```

The paging record can include a dedicated preamble to be used by the UE in a subsequent random access transmission and may contain an ephemeral C-RNTI (eC-RNTI) that may be subsequently used to schedule transmissions between the UE and serving node, for instance:

```
PagingRecord ::=            SEQUENCE {
    ue-Identity         PagingUE-Identity,
    cfPreamble          RACH-ConfigDedicated OPTIONAL,
    ecRNTI       C-RNTI        OPTIONAL,
    ...
}
```

Each paging record identifies an individual UE 1610. Accordingly, a group paging identifier, as used above for contention RA procedures, cannot be used with the contention-free RA procedure.

Responsive to a UE 1610 determining that the indication in the paging notification corresponds to an identifier assigned to the UE 1610 (e.g. a TID or paging identifier), in step 1654 the UE 1610 transmits the dedicated preamble to acknowledge receipt of the paging notification and to initiate a conventional contention-free RA procedure. This contention-free RA procedure can be based on the preamble defined in the dedicated RACH configuration (e.g. RACH-ConfigDedicated) of the matched paging notification.

Responsive to receiving the dedicated preamble sent by the UE 1610 in step 1654, in optional step 1656 the serving node 1608 transmits to the UE 1610 a downlink grant using a downlink DCI encoded with the eC-RNTI assigned to the UE 1610 in the matched paging record.

If the serving node 1608 does not receive a response 1654 from the target UE 1610 (for any of a number of reasons including that the UE 1610 may be outside the coverage area of the serving node 1608 when the page is transmitted), in some implementations the serving node 1680 may repeat the paging procedure. In some embodiments, the serving node 1608 may abandon the delivery attempt (either with or without reporting to the anchor node) after a number of attempts.

In step 1658, based on the downlink grant 1656, the serving node 1608 transmits a downlink message to the UE 1610. The downlink message may include at least one of:
- a security challenge as received by the serving node 1608 from the anchor node; and,
- an uplink grant that may be used by the UE 1610 to transmit to the serving node 1608 the UE's identifier and a challenge response to the security challenge.

After receiving the security challenge, the UE 1610 computes a UE-generated challenge response using the received security challenge as described above.

In step 1660, using the uplink grant received in 1658, the UE 1610 transmits a responding UE identifier (RID) to the serving node 1608. The transmitted RID is typically associated with the PagingUE-Identity in one MAC control element and the UE-generated challenge response in a second MAC control element. In some embodiments, no other information (e.g. an RRC message) is required in this uplink transmission which may provide a benefit from the perspective of reduced signaling.

Upon successful reception of the uplink transmission 1660 from the UE 1610 (i.e. the CRC included in the received transmission block is valid), the serving node 1608 may be operative to confirm at least one of:
- the RID indicated in step 1660 corresponds to a TID associated with an intended recipient previously received from the anchor node; and,
- the UE-generated challenge response received in step 1660 matches the expected challenge response previously received from the anchor node.

If both the RID and challenge response are valid, in optional step 1662 the serving node 1608 transmits to the UE 1610 a downlink grant using a DCI encoded with the eC-RNTI assigned to the UE 1610 in step 1652.

If the serving node 1608 does not receive a response 1660 from the target UE (e.g. the UE may not be within the coverage area of the serving node), it may repeat the paging procedure or abandon the delivery attempt. As explained above, the serving node 1608 (which may be referred to as a target node since it failed the delivery attempt) may abandon the delivery attempt either with or without reporting a failed attempt back to the anchor node, depending upon the implementation.

Following transmission of the downlink grant in step 1662, in step 1664 the serving node 1608 transmits to the UE 1610 a downlink transmission based on the downlink grant. The downlink transmission including a received UE identifier, such as the RID received in step 1660, and the downlink PDU encapsulated with an RLC header (e.g. rlcData).

Responsive to receiving the downlink transmission corresponding to the downlink grant received in step 1662, the UE 1610 compares the received UE identifier contained in the contention resolution identity MAC CE of the received downlink transmission 1664 against its own UE identifier (i.e. the RID transmitted in step 1660):
- If the received UE identifier corresponds to the UE's RID, downlink reception of the RLC data PDU is deemed successful.
- If the received UE identifier does not match the UE's RID, downlink reception of the RLC data PDU is deemed unsuccessful. Depending upon configuration, the UE 1610 may attempt to respond to the paging notification by repeating this procedure, starting at step 1654, at a later time.

In embodiments where the serving node 1608 requested an RLC acknowledgement in step 1664, or if the radio bearer RLC is configured for assured mode operation, in optional step 1666 the serving node 1608 transmits to the UE 1610 a DCI containing an uplink grant encoded with the eC-RNTI assigned to the UE 1610

Responsive to receiving the DCI, and using the uplink grant received in step 1666, in step 1668 the UE 1610 transmits to the serving node 1608 a status report (e.g. rlcStatus) confirming successful downlink reception of the RLC data PDU. In some embodiments, the UE 1610 may further be operative to use the uplink grant received in step 1666 to transmit a status report indicating downlink reception failure.

Figure 17:
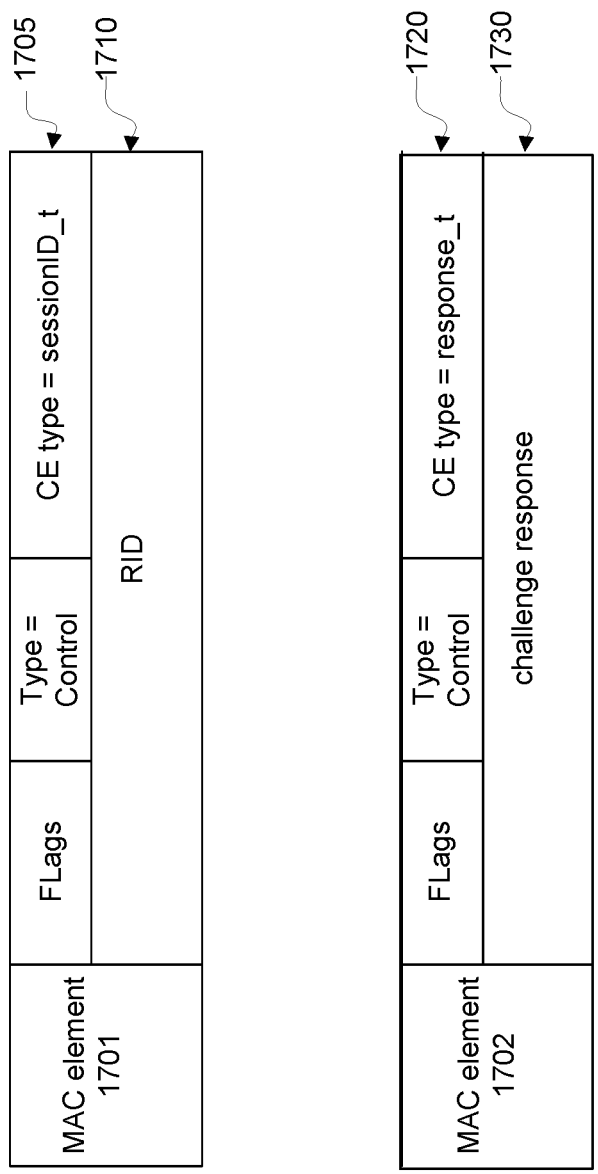
FIG. 17 illustrates an embodiment of a challenge response PDU.

The challenge response transmitted by the UE 1610 in step 1617 of FIG. 16A may comprise a MAC control element containing a RID and a MAC control element containing the challenge response, such as the embodiment as shown in FIG. 17. In other embodiments, one or more of the RID and challenge response may be included as information elements in another Uu protocol such as RLC, PDCP or RRC.

In the embodiment of FIG. 17, the MAC control element (CE) 1701 includes at least the following fields:
- a MAC element header 1705 indicating that it is a Control Element (CE) of type "sessionID_t", where "sessionID_t" is a predefined value; and,
- a RID 1710 assigned to a UE 1610; this may be a UEID as described in FIG. 7 for example or some other identifier associated with the UE 1610.

When a serving node is transmitting a paging notification at a group of UEs (e.g. by including a PagingGroupIdentity in the paging notification), the RID can be an identifier associated with an individual target UE 1610 from the group. In other cases, the RID can be the same identifier included in the paging notification. It may, however be a different identifier associated with the UE 1610 and the shared session and provided to both the UE 1610 and the serving node 1608 by the anchor node.

The MAC CE 1702 includes at least the following fields:
- a MAC element header 1720 indicating that it is Control element of type "response_t", where "response_t" is a predefined value; and,
- the UE-generated challenge response 1730 computed by the UE 1610.

Figure 18:
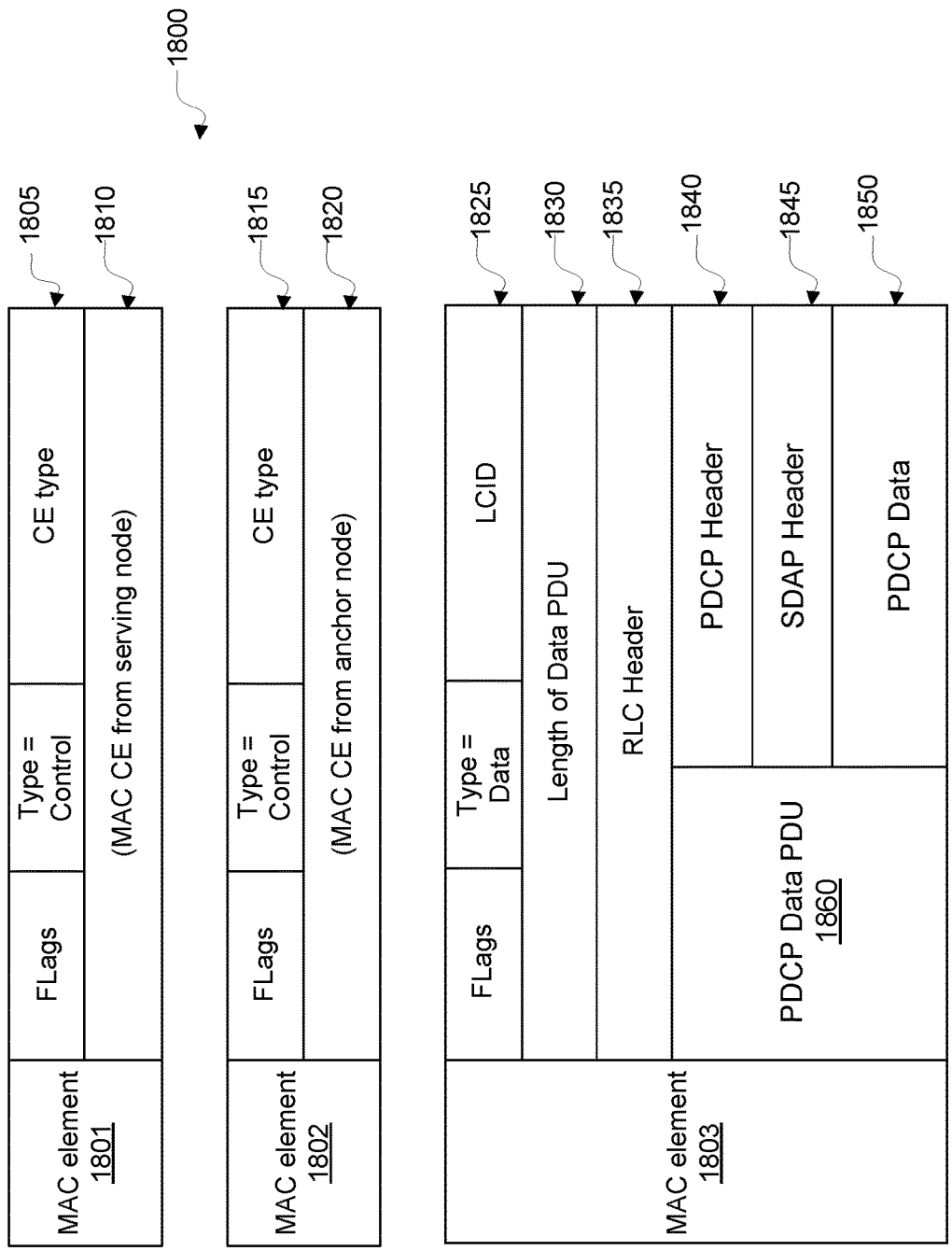
FIG. 18 illustrates an embodiment of a downlink PDU.

FIG. 18 illustrates an embodiment of a downlink MAC PDU for transmission by a serving node to a UE. The downlink MAC PDU 1800 includes a MAC data element 1803 containing the downlink PDCP PDU, and in some embodiments may include one or more serving node MAC control element 1801 and zero or more anchor node MAC control CEs 1802.

The serving node 1608 may also provide one or more serving node MAC control elements 1801. Each MAC CE 1801 including a serving node header 1805 and serving node MAC CE contents 1810.

In an embodiment, the downlink MAC PDU 1800 includes a serving node MAC control element 1801 comprising a contention resolution MAC CE. The contention resolution MAC CE contents 1810 will typically contain at least the RID provided by the UE 1601 in step 1617.

In some embodiments, additional serving node MAC control elements 1801 may be provided as required for UE operation at the serving node 1608 (e.g. for assignment of a new eC-RNTI, for timing advancement, for power control, etc).

In some embodiments, the downlink MAC PDU 1800 may include zero or more anchor node MAC control CEs 1802 each made up of a control header 1815 and control MAC CE contents 1820. Inclusion of the anchor node MAC control CEs 1802 being dependent on whether such were provided by the anchor node to the serving node in the downlink Rn PDU. These MAC CEs (e.g. containing a new UEID 700 for use as an inactive mode identifier) may also be included by the serving node 1608 in the downlink MAC PDU 1800.

The downlink data is contained in a MAC data element 1803 that may include one or more of the following fields:
- a MAC element header 1825 indicating that this is a Data element; this field also includes the logical channel identifier (LCID) provided by the anchor node;
- a length field 1830 indicating the size of the MAC data element (e.g. the number of octets);
- a Radio Link Control (RLC) header 1835 constructed by the serving node; and
- the Packet Data Convergence Protocol (PDCP) PDU 1860 provided by the anchor node.

Asynchronous HARQ may be used for recovery from transmission errors following the assignment of an eC-RNTI to the UE 1610 by the serving node 1608.

RLC procedures may be used to transmit a downlink PDCP PDU that must be segmented across multiple transport blocks. These RLC procedures make use of the eC-RNTI assigned to the UE 1610 by the serving node 1608 for uplink and downlink transmission grants.

In some embodiments the anchor node may include a delivery status option in the Rn PDU indicating whether the target node should provide a delivery status report to the anchor node. In some embodiments, a delivery status report may be requested by the anchor node to indicate between a variety of outcomes including one or more of the following:
- successful delivery, indicating that the PDCP PDU was successfully delivered by the serving node to the UE using an assured mode (AM) procedure. Note, however, in this embodiment this delivery status report does not indicate successful processing of the received PDCP PDU by the UE. Successful processing of the received PDCP PDU by the UE may be indicated by a separate PDCP status report from the UE.
- unsuccessful delivery (no page response received), indicating that the UE did not respond to a paging notification initiated by the target node. This may be used, for example, by the anchor node to ensure delivery of, and attempted action on, a paging request transmitted to a target node.
- unsuccessful delivery (page response received), indicating that the UE did respond to a paging notification initiated by the target node but a subsequent assured mode (AM) attempt to transmit the downlink PDU to the UE failed. This may be used, for example, by the anchor node to determine the reachability of a UE even if the UE is moving or is operating in a region with poor coverage.
- delivery attempted (page response received), indicating that the UE did respond to a paging notification initiated by the target node and that a subsequent un-assured mode (UM) attempt to transmit the downlink PDU to the UE was completed. This may be used, for example, by the anchor node to determine the reachability of a UE when delivering UM data.
- unsuccessful delivery (invalid challenge response), indicating that a UE did respond to a paging notification initiated by the target node but the UE either failed to provide a challenge response to the security challenge or provided an invalid challenge response to the security challenge.

If the delivery status outcome report requested by the anchor node matches the delivery results at the target node, the target node constructs a delivery status PDU and transmits it to the anchor node in an Rn PDU.

Figure 19:
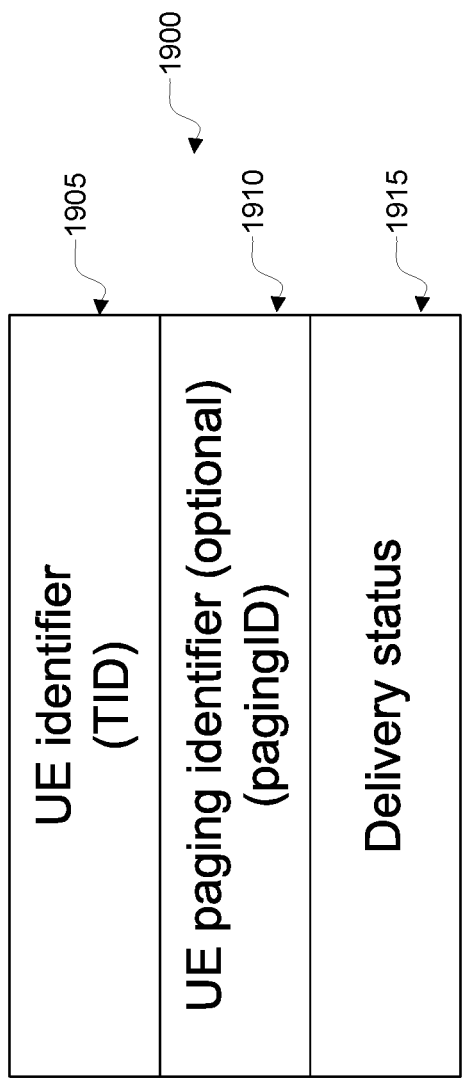
FIG. 19 illustrates an embodiment of a delivery status.

FIG. 19 illustrates an embodiment of an Rn delivery status PDU 1900. The illustrated delivery status PDU 1900 includes at least a UE identifier (e.g. TID) 1905, an indication of the delivery status outcome 1915, and optionally a UE paging identifier (e.g. pagingID or groupPagingID) 1910.

In some embodiments, the anchor node may be embodied as an anchor NF. The anchor node NF may be a dedicated network element that provides anchor node functionality, or a virtualized entity representing a slice of such an element. In other embodiments, the anchor node NF may be a VNF created by the execution of software within a data center or other such computing environment. In general, in this embodiment operations performed by the anchor node described above are performed by the group anchor NF in the CN-based anchor node model. Serving nodes perform similar operations in both the RAN- and CN-based anchor node models, some differences are described below.

Figure 20:
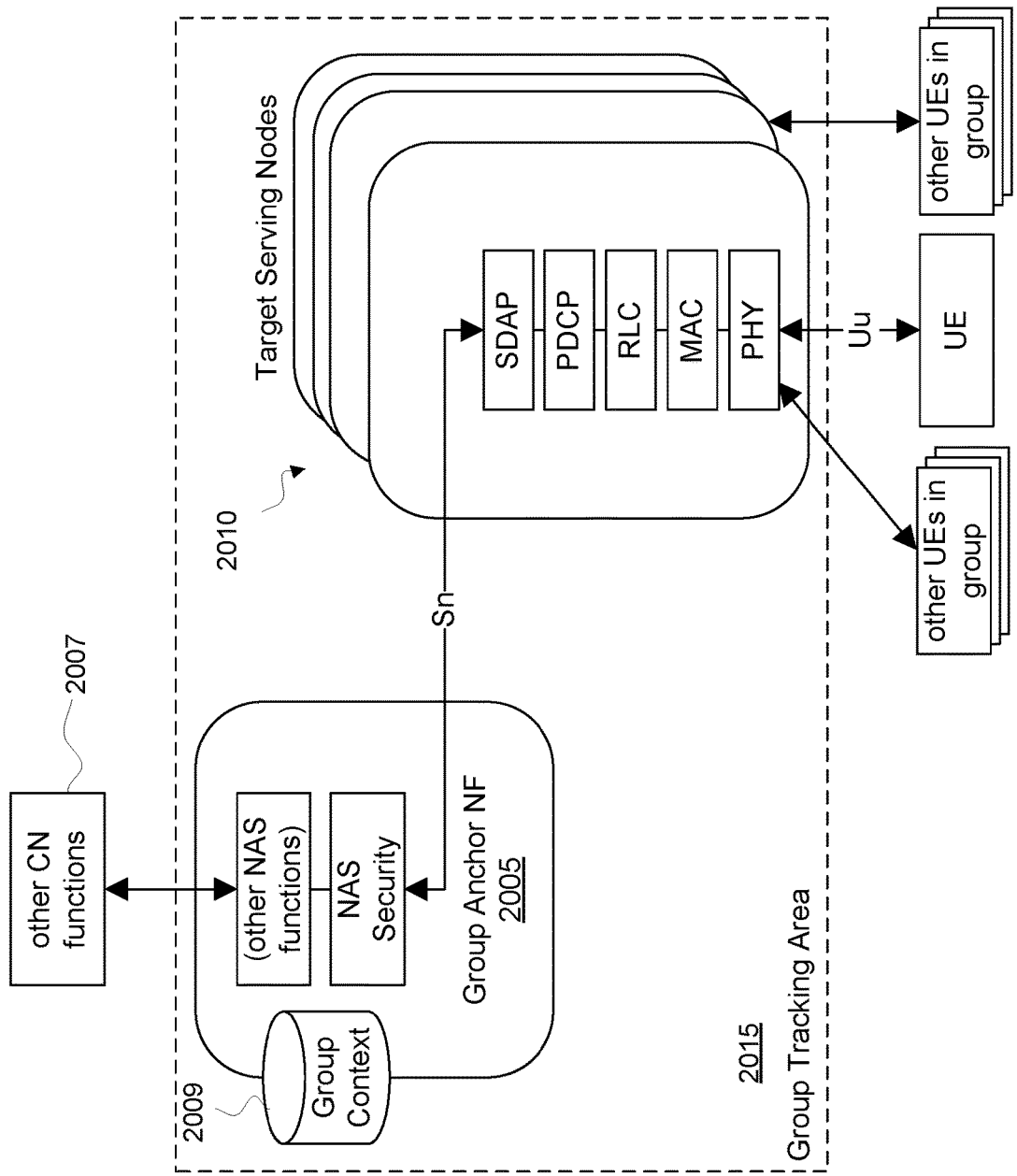
FIG. 20 illustrates an embodiment of a CN-based anchor node model.

Referring to FIG. 20, a group anchor NF 2005 maintains the connections to other core network functions 2007 for the shared session. The group anchor NF 2005 also maintains, or has access to, the current configuration and other context information 2009 associated with the shared session. The group anchor NF 2005 performs equivalent functions to the group anchor node 302 described above. In some embodiments, the group anchor NF 2005 may be incorporated into, or co-located with, the CN UPGW associated with the shared session. The main differences between the group anchor NF 2005 and the anchor node described above is in the protocol stack, and in some embodiments the encryption procedure.

A group tracking area (GTA) 2015 denotes (the cells of) the target serving nodes 2010 where UEs within the shared session can receive service while roaming within the public land mobile network (PLMN). The scope of the GTA 2015 may be as small as a single cell or as large as the entire PLMN. A UE that roams outside the designated GTA 2015, is operative to notify the group anchor NF 2005 of its departure from the GTA 2015 and may be assigned to at least one of a different shared session and a different group anchor NF 2005. The GTA 2015 is equivalent to a group RAN notification area 301 described above.

The group anchor NF 2005 may be connected via an intra-PLMN backhaul network to the one or more target serving nodes 2010 within the PLMN. Each of the one or more target serving nodes 2010 may control one or more cells associated with the GTA 2015 of the shared session. The interface between the group anchor NF 2005 and the one or more target serving nodes 2010, dubbed Sn in FIG. 20, may be similar to an NG interface, an S1 interface, an X2 interface, an Xn interface, a CU-DU interface, or other suitable interface.

In general, operations performed by the group anchor node 302 are performed by the group anchor NF 2005 in the CN-based anchor node model. Target nodes 2010 perform similar operations in both the RAN- and CN-based anchor node models. Some particular differences are described below.

In a CN-based anchor node model, the network side of the Uu protocol stack (including PDCP and SDAP) is completely contained within a serving node 2010. The PDCP procedures in the target serving nodes 2010, however, may be disabled for the shared session—e.g. PDCP user plane encryption and integrity protection may be explicitly disabled or a NULL cryptographic algorithm may be selected. In some embodiments, in place of the PDCP user plane security, non-access stratum (NAS) security procedures are provided by the group anchor NF 2005 using NAS encryption and integrity protection keys and algorithms. Similarly, within the UE, PDCP procedures are effectively disabled and NAS cryptographic keys and algorithms may be used for user plane data protection. It should be understood that from the perspective of the anchor function, there is no difference between an implementation in which the protocol stack shown in the target serving nodes 2010 is split or if it is handled in a single node.

For uplink traffic, once a serving node 2010 has successfully received a complete uplink PDCP PDU, the enclosed NAS user plane PDU is forwarded to the group anchor NF 2005 identified by the anchor node 710 in the UEID 700. The packet used to transfer the PDU over the Sn interface between the serving node 2010 and group anchor NF 2005 may include any or all of the following:

- a UE reference, comprising at least the RID 1710 as received from the UE;
- the security challenge issued by the serving node 2010 and the UE-generated challenge response provided by the UE; and,
- the cryptographically-protected NAS user plane PDU received from the UE, including the user data for forwarding to a remote corresponding node.

For downlink traffic, when the group anchor NF 2005 has constructed a cryptographically-protected NAS user plane PDU, it can use the GTA configuration and, optionally, available UE mobility information to determine a set of target nodes from the group target serving nodes 2010 encompassing one or more cells of the GTA 2015 and then sends a copy of the NAS user plane PDU to each of the target nodes. The NAS user plane PDU is encapsulated in an Sn PDU that may include at least one of the following information elements:

- A list of one or more intended recipients each of which may include:
  - a target UE identifier (TID) associated with a UE that is to receive the downlink data;
  - a paging identifier (pagingID) associated with a UE that is to receive the downlink data, if different from the TID; and,
  - a security challenge generated by the group anchor NF 2005 and the corresponding challenge response expected from the targeted UE.
- Alternatively, a single intended recipient may be provided that includes a groupPagingID associated with a group of targeted UEs.
- An optional DRX configuration indicating configured opportunities for transmission to UEs within the shared session that may be used for delivery of the downlink PDU. If provided, these configured downlink transmission opportunities are used rather the default opportunities derived from the pagingID or TID.
- A set of delivery options that may include one or more of the following:
  - the identity of cells or RAN notification areas within the target node that comprise (part of) the GTA 2015 associated with the UE session group; and,
  - an indication of whether a target node should provide a delivery status report to the group anchor NF for at least one of a successful and an unsuccessful delivery attempt.
- The NAS user plane PDU for delivery to the UE, including at least one of the encrypted upper layer packet and integrity protected upper layer packet.

Figure 21A:
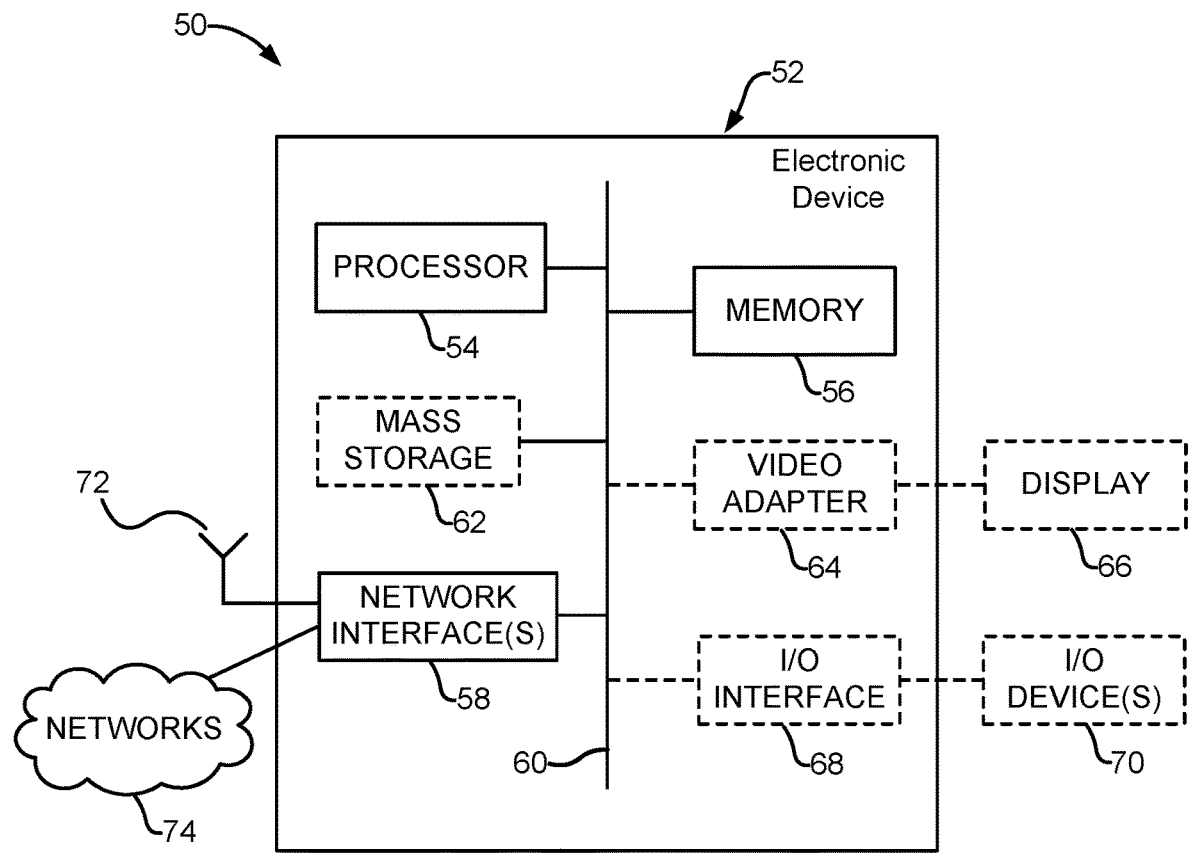
FIG. 21A is a block diagram of an electronic device within a computing and communications environment that may be used for implementing devices and methods in accordance with representative embodiments of the present invention; and, FIG. 21B is a diagram illustrating a cloud-based implementation of a Core Network and Radio Access Network using virtualized functions.

FIG. 21A is a block diagram of an electronic device (ED) 52 illustrated within a computing and communications environment 50 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), or various other nodes or functions within a radio access and core network. In other embodiments, the electronic device may be a device that connects to network infrastructure over a radio interface, such as a mobile phone, smart phone or other such device that may be classified as a User Equipment (UE). In some embodiments, ED 52 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 52 typically includes a processor 54, such as a Central Processing Unit (CPU), and may further include specialized processors such as a Graphics Processing Unit (GPU) or a Digital Signal Processor (DSP) or other such processor, a memory 56, a network interface 58 and a bus 60 to connect the components of ED 52. ED 52 may optionally also include components such as a mass storage device 62, a video adapter 64, and an I/O interface 68 (shown in dashed lines).

The memory 56 may comprise any type of non-transitory system memory, readable by the processor 54, such as static random access memory (SRAM), dynamic random access memory (DRAM), synchronous DRAM (SDRAM), read-only memory (ROM), or a combination thereof. In an embodiment, the memory 56 may include more than one type of memory, such as ROM for use at boot-up, and DRAM for program and data storage for use while executing programs. The bus 60 may be one or more of any type of several bus architectures including a memory bus or memory controller, a peripheral bus, or a video bus.

The electronic device 52 may also include one or more network interfaces 58, which may include at least one of a wired network interface and a wireless network interface. As illustrated in FIG. 1A, network interface 58 may include a wired network interface to connect to a network 74, and also may include a radio access network interface 72 for connecting to other devices over a radio link. When ED 52 is network infrastructure, the radio access network interface 72 may be omitted for nodes or functions acting as elements of the Core Network (CN) other than those at the radio edge (e.g. an eNB or gNB). When ED 52 is infrastructure at the radio edge of a network, both wired and wireless network interfaces may be included. When ED 52 is a wirelessly connected device, such as a User Equipment, radio access network interface 72 may be present and it may be supplemented by other wireless interfaces such as WiFi network interfaces. The network interfaces 58 allow the electronic device 52 to communicate with remote entities such as those connected to network 74.

The mass storage 62 may comprise any type of non-transitory storage device configured to store data, programs, and other information and to make the data, programs, and other information accessible via the bus 60. The mass storage 62 may comprise, for example, one or more of a solid state drive, hard disk drive, a magnetic disk drive, or an optical disk drive. In some embodiments, mass storage 62 may be remote to the electronic device 52 and accessible through use of a network interface such as interface 58. In the illustrated embodiment, mass storage 62 is distinct from memory 56 where it is included, and may generally perform storage tasks compatible with higher latency, but may generally provide lesser or no volatility. In some embodiments, mass storage 62 may be integrated with a heterogeneous memory 56.

The optional video adapter 64 and the I/O interface 68 (shown in dashed lines) provide interfaces to couple the electronic device 52 to external input and output devices. Examples of input and output devices include a display 66 coupled to the video adapter 64 and an I/O device 70 such as a touch-screen coupled to the I/O interface 68. Other devices may be coupled to the electronic device 52, and additional or fewer interfaces may be utilized. For example, a serial interface such as Universal Serial Bus (USB) (not shown) may be used to provide an interface for an external device. Those skilled in the art will appreciate that in embodiments in which ED 52 is part of a data center, I/O interface 68 and Video Adapter 64 may be virtualized and provided through network interface 58.

In some embodiments, electronic device 52 may be a standalone device, while in other embodiments electronic device 52 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 21B:
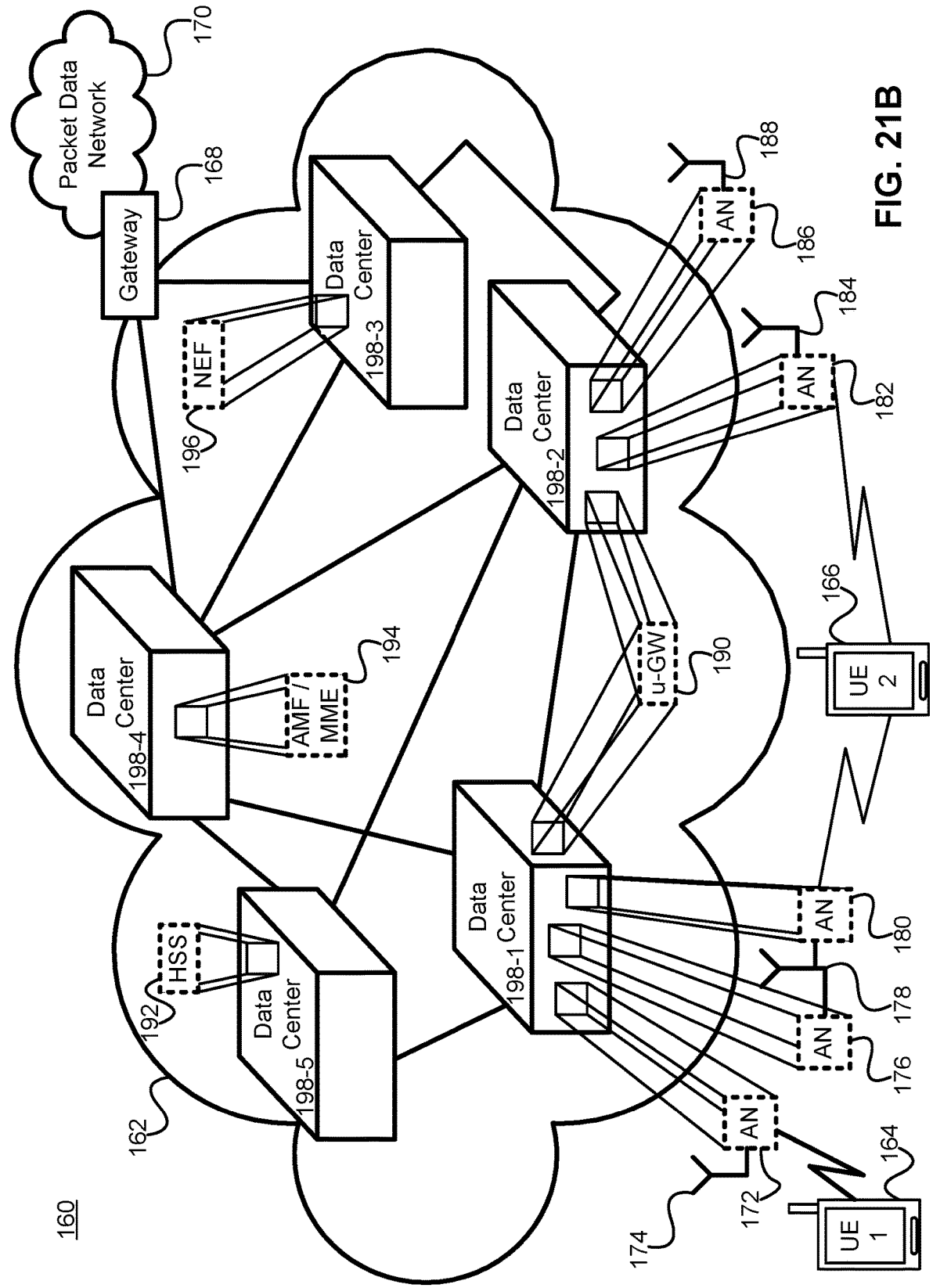

FIG. 21B illustrates a system 160 in which a core/RAN network 162 provides radio access and core network services to electronic devices such as UE1 164 and UE2 166. In FIG. 1B, network functions are instantiated upon the underlying resources of a data center. The functions are shown as being exploded out of the pool of resources upon which they are instantiated. This is done to indicate that the functions act as independent entities and from a logical perspective they are indistinguishable from a physical node carrying out the same function. It should also be understood that in a sliced network where data centers provide the underlying resources upon which the slices are created, it is possible for a single network to have slices that support different versions of networks, so for example, in addition to having a virtualized network to support 5G traffic, a separate network slice can be created to support 4G networks. Traffic from electronic devices can be routed through network functions, to a gateway 168 that provides access to a packet data network 170 such as the Internet. Radio access services are typically provided by a RAN, which in the embodiment illustrated in FIG. 1B is provided as a Cloud-RAN (C-RAN). Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in the illustrated embodiment of a C-RAN Access Nodes, such as a gNodeB, are connected to antenna (or to a remote radio head (RRH)) through a front haul connection, but are functions that are instantiated upon compute resources in network 162. If a gNodeB is divided into a Central Unit and a plurality of Distributed Units, the virtualized Distributed Units may in some embodiments be instantiated at or near the location of the antenna or RRH, while a Centralized Unit may be instantiated at a data center to connect and serve a plurality of geographically dispersed Distributed Units. For example, UE1 164 is connected to the network through AN 172, which can provide radio access services through antenna 174. AN 172 is instantiated upon the compute and storage resources provided by a data center, in this case data center 198-1. Similarly, AN 176 and AN 180, which are connected to the same set of antennae 178, are also instantiated upon the resources of data center 198-1. AN 180 provides radio access services to UE 2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the AN functions may be co-located with CN functions. As such, Data Center 198-1 also serves as a location at which a user-specific gateway function (u-GW) 190 is instantiated. This function is also instantiated in data center 198-2. Having a function instantiated at more than one data center may be part of a function migration process in which the function is moved through the network, or one of the instantiations may be an intentionally redundant instantiation. Both functions can be instantiated and configured, with only one of them active at a time, or they may both be active, but only one of them may be transmitting data to the UE. In other embodiments, such as those focussed on Ultra-Reliable connections, such as Ultra-Reliable Low Latency Communications (URLLC), both functions may be active and transmitting data to (or receiving data from) an ED such as UE2 166. Network functions such as a Home Subscriber Server (HSS) 192, an Access and Mobility Management Function (AMF) 194 or its predecessor Mobility Management Entity (MME), and a Network Exposure Function (NEF) 196 are shown as being instantiated on the resources of Data Center 198-5, 198-4 and 198-3 respectively.

The virtualization of the network functions allows a function to be located in the network at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed at different levels in the hierarchy.

In some embodiments, systems, apparatus and methods are provided for handling uplink communications between a group of one or more User Equipment (UEs) and network nodes of a communication network as part of a shared session.

In some embodiments, a method is provided for execution by an anchor node of a communication network. The method including the anchor node: receiving, from another network node, a shared session establishment request; establishing a shared session context for a group of one or more UEs; and transmitting, to the other network node, a shared session identifier corresponding to the shared session context.

In some embodiments, a network function is provided. The network function executing on a network node of a communication network to act as an anchor node, and the network node including: a network interface for receiving data from and transmitting data to network functions connected to a network; a processor; and a non-transient memory for storing instructions that when executed by the processor cause the network function to be configured to: receive, from another network node, a shared session establishment request; establish a shared session context for a group of one or more UEs; and, transmit, to the other network node, a shared session identifier corresponding to the shared session context.

In some embodiments, a network function is provided. The network function executing on a network node of a communication network to act as a serving node, and the network node including: a network interface for receiving data from and transmitting data to network functions connected to a network; a processor; and a non-transient memory for storing instructions that when executed by the processor cause the network function to be configured to: receive, from a user equipment (UE), a UE identifier (UEID) comprising a shared session identifier for a group of one or more UEs and a UE identifying component that identifies the UE within the shared session; transmit, to the UE, a security challenge; receive, from the UE, a challenge response derived from at least the security challenge and cryptographic keying material associated with the shared session; and, transmit, to an anchor node associated with the shared session based on the shared session identifier, the UEID, the security challenge, and the challenge response.

In some embodiments, a method is provided. The method including a serving node of a communication network: receiving, from a user equipment (UE), a UE identifier (UEID) comprising a shared session identifier for a group of one or more UEs and a UE identifying component that identifies the UE within the shared session; transmitting a security challenge to the UE; receiving, from the UE, a challenge response derived from at least the security challenge and cryptographic keying material associated with the shared session; and, transmitting, to, an anchor node associated with the shared session the anchor node based on the shared session identifier, the UEID, the security challenge, and the challenge response.

In some implementations of the method, the serving node: receiving, from the UE, uplink data; and transmitting, to the anchor node, the uplink data.

In some implementations of the method, before the receiving the UEID, the method further includes the serving node: receiving, from the UE, a network attachment request; forwarding, to another network node of the communication network, the network attachment request; receiving, from the other network node, a shared session identifier; transmitting, to the anchor node identified from the shared session identifier, the shared session identifier and a request for the shared session context; receiving, from the anchor node, the shared session context and a UEID comprising the shared session identifier; and transmitting, to the UE, the UEID.

In some implementations of the method, the other network node comprises a control plane function executing on a network node of a radio access network or a core network of the communication network.

In some implementations of the method, the receiving the challenge response further comprises receiving, from the UE, uplink data.

In some implementations of the method, the transmitting the security challenge comprises transmitting, to the UE, an uplink grant and the security challenge.

In some implementations of the method, wherein the transmitting the uplink grant and the security challenge comprises: transmitting, to the UE using radio resources based on a downlink grant, a random access response, the security challenge, and an uplink grant for receiving the challenge response.

In some implementations of the method, the transmitting the uplink grant and the security challenge comprises: transmitting, to the UE radio resources based on a downlink grant, a random access response and a second downlink grant; and, transmitting, to the UE, and based on the second downlink grant, the security challenge and an uplink grant for receiving the challenge response.

In some implementations of the method, the UEID and the uplink data are received with the challenge response.

In some implementations of the method, the UEID and the uplink data are received before the transmitting the security challenge.

In some implementations of the method, the serving node comprises a network function executing on a network node of the communication network.

In some implementations of the method, the serving node comprises a radio access network (RAN) node of the communication network.

In some embodiments, a method is provided for execution by a user equipment (UE) connected to a communication network. The method including the UE: transmitting, to a serving node, an uplink message including a UE identifier (UEID) comprising a shared session identifier for a group of one or more UEs and a UE identifying component that identifies the UE within the shared session; receiving, from the serving node, a security challenge; and, transmitting, to the serving node, a challenge response derived from at least the security challenge and cryptographic keying material associated with the shared session.

In some implementations of the method, the method further includes the UE transmitting, to the serving node, uplink data.

In some implementations of the method, before the transmitting the UEID, the message further includes: transmitting, to an initial node, a network attachment request.

In some implementations of the method, the method further includes the UE receiving, from the initial node, radio link configuration information including the UEID.

In some implementations of the method, the initial node comprises the serving node.

In some implementations of the method, the initial node comprises as different network node from the serving node.

In some implementations of the method, the transmitting the uplink message further includes transmitting uplink data.

In some implementations of the method, the transmitting the challenge response further includes transmitting uplink data.

In some implementations of the method, the receiving the security challenge includes the UE receiving, from the serving node, an uplink grant and the security challenge.

In some implementations of the method, the receiving the uplink grant and the security challenge further includes the UE receiving, from the serving node using radio resources based on a downlink grant, a random access response, the security challenge, and an uplink grant for transmitting the challenge response.

In some implementations of the method, the receiving the uplink grant and the security challenge further includes the UE: receiving, from the serving node using radio resources based on a downlink grant, a random access response and a second downlink grant; and, receiving, from the serving node, and based on the second downlink grant, the security challenge and an uplink grant for transmitting the challenge response.

In some implementations of the method, the method further includes the UE transmitting the challenge response based on the uplink grant.

In some embodiments, a method is provided for execution by an anchor node of a communication network. The method including the anchor node: receiving, from a serving node: a UE identifier (UEID) comprising a shared session identifier for a group of one or more UEs and a UE identifying component that identifies the UE within the shared session; an uplink data PDU destined for delivery on the communication network; and, a security challenge and a challenge response; deriving, from at least the security challenge and cryptographic keying material associated with the shared session, an expected challenge response; and, if the challenge response matches the expected challenge response, transmitting, to another network node associated with the shared session, the uplink data PDU.

In some embodiments, a network function is provided. The network function executing on a network node of a communication network to act as an anchor node, and the network node including: a network interface for receiving data from and transmitting data to network functions connected to a network; a processor; and a non-transient memory for storing instructions that when executed by the processor cause the network function to be configured to: receive, from a serving node: a UE identifier (UEID) comprising a shared session identifier for a group of one or more UEs and a UE identifying component that identifies the UE within the shared session; an uplink data PDU destined for delivery on the communication network; and, a security challenge and a challenge response; derive, from at least the security challenge and cryptographic keying material associated with the shared session, an expected challenge response; and, if the challenge response matches the expected challenge response, transmit, to another network node associated with the shared session, the uplink data PDU.

In some implementations, the uplink data PDU is transmitted to a user plane function executing on the other network node.

In some implementations, the anchor node comprises a network function executing on a network node of the communication network.

In some implementations, the anchor node comprises a radio access network (RAN) node of the communication network.

In some embodiments, a method is provided for a serving node of a communication network. The method including the serving node: receiving, from an anchor node: a shared session identifier that identifies a shared session for a group of one or more UEs, a target UE identifier (TID) that identifies one or more UEs from the group of UEs that comprise the shared session, downlink data, a security challenge, and an expected challenge response derived from at least the security challenge and cryptographic keying material associated with the shared session; transmitting the security challenge and a paging notification associated with the TID; receiving, from a responding UE, a challenge response and a responding UE identifier (RID); and, if the challenge response matches the expected challenge response, and if the RID received from the responding UE corresponds to the TID received from the anchor node, transmitting, to the responding UE, the downlink data.

In some implementations of the method, the serving node comprises a core network function (CNF) executing on a network node of the communication network.

In some implementations of the method, the serving node comprises a radio access network (RAN) node of the communication network.

In some implementations of the method, if the challenge response matches the expected challenge response the method further includes the anchor node transmitting, to the anchor node, a delivery status report indicating the UE has been validated and the downlink data has been transmitted to the UE.

In some implementations of the method, before the transmitting the delivery status report, the method may further include the serving node receiving, from the anchor node, a request to provide the delivery status report.

In some implementations of the method, if the challenge response matches the expected challenge response the method further includes the serving node: receiving, from the UE, a UE status report indicating successful receipt of the downlink data by the UE; and, transmitting, to the anchor node, an indication of the UE status report.

In some implementations of the method, before the transmitting the UE status report, the method further includes the serving node receiving, from the anchor node, a request to provide the UE status report.

In some implementations of the method, if the challenge response does not match the expected challenge response the method further includes the serving node transmitting, to the anchor node, a delivery status report indicating the UE was not validated.

In some implementations of the method, before the delivery status report is transmitted, the method further includes the serving node receiving, from the anchor node, a request to provide the delivery status report.

In some implementations of the method, if the serving node does not receive the challenge response, the method further includes the serving node transmitting, to the anchor node, a delivery status report indicating a failure to deliver the downlink data.

In some implementations of the method, the transmitting the security challenge and the paging notification further includes the serving node transmitting, to the UE, an uplink grant for receiving the challenge response.

In some implementations of the method, before the transmitting the uplink grant and the security challenge, the method further includes the serving node transmitting, to the UE, a downlink grant for receiving the security challenge.

In some implementations of the method, the transmitting the uplink grant and the security challenge further includes the serving node transmitting, to the UE and based on the downlink grant, a random access response, the security challenge, and the uplink grant.

In some implementations of the method, the transmitting the uplink grant and the security challenge includes the serving node: transmitting, to the UE and based on the downlink grant, a random access response and a second downlink grant; and, transmitting, to the UE and based on the second downlink grant, the security challenge and an uplink grant for receiving the challenge response.

In some implementations of the method, the transmitting the security challenge and the paging notification includes the serving node transmitting a paging message including the security challenge.

In some implementations of the method, the transmitting the security challenge includes the serving node transmitting a random access response including the security challenge.

In some embodiments, a method is provided for a user equipment (UE) of a communication network. The method including the UE: receiving, from a serving node, a paging notification that identifies one or more UEs from a group of UEs that comprise a shared session and a security challenge; transmitting, to the serving node, a responding UE identifier (RID), and a challenge response based at least on the security challenge, and cryptographic keying material associated with the shared session; and, receiving, from the serving node, downlink data.

In some embodiments, a network function is provided. The network function executing on a network node of a communication network to act as a serving node, and the network node including: a network interface for receiving data from and transmitting data to network functions connected to a network; a processor; and a non-transient memory for storing instructions that when executed by the processor cause the network function to be configured to: receive, from an anchor node: a shared session identifier that identifies a shared session for a group of one or more UEs; a target UE identifier (TID) that identifies one or more UEs from the group of UEs that comprise the shared session; downlink data, a security challenge, and an expected challenge response derived from at least the security challenge and cryptographic keying material associated with the shared session; transmit the security challenge and a paging notification associated with the TID; receive, from a responding UE, a challenge response and a responding UE identifier (RID); and, if the challenge response matches the expected challenge response, and if the RID received from the responding UE corresponds to the TID received from the anchor node, transmit, to the responding UE, the downlink data.

In some embodiments, a user equipment (UE) is provided. The UE comprising a processor and non-transient memory including instructions that, when executed by the processor, render the UE operative to: receive, from a serving node, a paging notification that identifies one or more UEs from a group of UEs that comprise a shared session and a security challenge; transmit, to the serving node, a responding UE identifier (RID) a challenge response based at least on the security challenge and cryptographic keying material associated with the shared session; and, receive, from the serving node, downlink data.

In some implementations of the method, the method further includes the UE transmitting, to the serving node, a delivery status report confirming receipt of the downlink data.

In some implementations of the method, the receiving the security challenge includes the UE receiving, from the serving node, the security challenge, and an uplink grant for transmitting the challenge response.

In some implementations of the method, before the receiving the uplink grant and the security challenge, the method further includes the UE receiving, from the serving node, a downlink grant for receiving the security challenge.

In some implementations of the method, the receiving the uplink grant and the security challenge further includes the UE receiving, from the serving node using radio resources based on a downlink grant, a random access response, the security challenge, and the uplink grant.

In some implementations of the method, the receiving the uplink grant and the security challenge further includes the UE: receiving, from the serving node using radio resources based on a downlink grant, a random access response and a second downlink grant; and, receiving, from the serving node and based on the second downlink grant, the security challenge and an uplink grant for transmitting the challenge response.

In some embodiments, a method is provided for an anchor node of a communication network. The method including the anchor node: receiving, from another network node associated with a shared session for a group of one or more User Equipment (UEs), a downlink user data packet; and, transmitting, to a set of target network nodes associated with the shared session, a downlink PDU based on the downlink user data packet, wherein the downlink PDU is cryptographically protected using cryptographic keying material associated with the shared session; an intended recipient that includes: a target UE identifier (TID) that identifies one or more UEs from the group of UEs that comprise the shared session, a security challenge, and an expected challenge response derived from at least the security challenge and cryptographic keying material associated with the shared session.

In some embodiments, a network function is provided. The network function executing on a network node of a communication network to act as an anchor node, and the network node including: a network interface for receiving data from and transmitting data to network functions connected to a network; a processor; and a non-transient memory for storing instructions that when executed by the processor cause the network function to be configured to: receive, from another network node associated with a shared session for a group of one or more User Equipment (UEs), a downlink user data packet; transmit, to a set of target network nodes associated with the shared session: a downlink PDU based on the downlink user data packet, wherein the downlink PDU is cryptographically protected using cryptographic keying material associated with the shared session; an intended recipient that includes: a target UE identifier (TID) that identifies one or more UEs from the group of UEs that comprise the shared session; a security challenge, and an expected challenge response derived from at least the security challenge and cryptographic keying material associated with the shared session.

In some implementations of the method, wherein the intended recipient comprises a list of TIDs to identify a plurality of UEs from the group.

In some implementations of the method, the intended recipient comprises a paging identifier associated with one or more UEs of the group.

In some implementations of the method, the method further includes the anchor node receiving, from a network node from the set of target network nodes, a delivery status report indicating an outcome of attempted delivery of the downlink PDU.

In some implementations of the method, the method further includes the anchor node receiving, from a network node from the set of target network nodes, a delivery status message indicating successful delivery of the downlink PDU to the UE.

It will be understood that some embodiments of the present invention provide for a network function having a processor and memory storing instructions that when executed by the processor cause the network function to carry out the steps of the above described embodiments, implementations and methods described above. In further embodiments there are provided network functions composed of functional processing elements to carry out the steps of the above described methods.

It will be further understood that implementations are described above in association with a particular embodiment. These implementations should be understood to be combinable with other implementations, and in some instances may be applicable with an embodiment other than the one that they are described in conjunction with. There may be some cases in which implementations cannot be combined because they are mutually exclusive, but these scenarios will be readily understood and identified by those skilled in the art.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for execution by a serving node of a radio access network (RAN), the method comprising:

receiving, from an anchor node, a downlink RAN protocol data unit (PDU), the downlink RAN PDU including:
  a shared session identifier that identifies a shared session for a group of one or more UEs;
  an indication of one or more downlink transmission occasions;
  an intended recipient comprising:
    a target User Equipment (UE) identifier (TID) that identifies one or more UEs from the group of UEs that comprise the shared session,
    a security challenge, and
    an expected challenge response derived by the anchor node from at least the security challenge and cryptographic keying material associated with the shared session; and,
  downlink user plane data including a packet forwarded from a core network (CN) node;
transmitting, to at least one UE of the group of one or more UEs during a downlink transmission occasion of the one or more downlink transmission occasions, the security challenge and a paging notification associated with the TID, wherein transmitting includes:
  transmitting, to the at least one UE of the group of one or more UEs using radio resources based on a downlink grant, a random access response and a second downlink grant; and
  transmitting, to the at least one UE of the group of one or more UEs using radio resources based on the second downlink grant, the security challenge and an uplink grant for receiving a challenge response;
receiving, from a responding UE, the challenge response and a responding UE identifier (RID); and,
transmitting, to the responding UE, the downlink user plane data, after determining that the challenge response matches the expected challenge response, and that the RID received from the responding UE corresponds to the TID received from the anchor node;
wherein, when the challenge response matches the expected challenge response, receiving, from the UE, a UE status report indicating successful receipt of the downlink user plane data by the UE and transmitting, to the anchor node, an indication of the UE status report.

2. The method of claim 1, wherein when the challenge response matches the expected challenge response the method further comprises transmitting, to the anchor node, a delivery status report indicating the UE has been validated according to the expected challenge response and the downlink user plane data has been transmitted to the UE.

3. The method of claim 2, wherein the downlink RAN PDU further comprises a request to provide the delivery status report.

4. The method of claim 1, wherein, before the transmitting the uplink grant and the security challenge, the method further comprises transmitting, to the UE, a downlink grant for transmitting the security challenge.

5. The method of claim 1, wherein the transmitting the security challenge comprises at least one of:
  transmitting a paging message including the security challenge;
  transmitting, to the UE, a random access response including the security challenge;
  transmitting to the UE, using radio resources determined in accordance with the downlink grant, a random access response, the security challenge, and the uplink grant.

6. A serving node of a radio access node (RAN), the serving node comprising:
a network interface for receiving data and transmitting data;
a processor; and
a non-transitory memory for storing instructions that when executed by the processor cause the serving node to be configured to be operable to:
receive, through the network interface, from an anchor node, a downlink RAN protocol data unit (PDU), the downlink RAN PDU including:
a shared session identifier that identifies a shared session for a group of one or more user equipment (UE);
an indication of one or more downlink transmission occasions;
an intended recipient comprising:
a target UE identifier (TID) that identifies one or more UEs from the group of UEs that comprise the shared session,
a security challenge, and
an expected challenge response derived by the anchor node from at least the security challenge and cryptographic keying material associated with the shared session; and,
downlink user plane data including a packet forwarded from a core network (CN) node;
transmit, through the network interface to at least one UE of the group of one or more UEs during a downlink transmission occasion of the one or more downlink transmission occasions, the security challenge and a paging notification associated with the TID, wherein the transmitting includes:
transmitting, to the at least one UE of the group of one or more UEs using radio resources based on a downlink grant, a random access response and a second downlink grant; and
transmitting, to the at least one UE of the group of one or more UEs using radio resources based on the second downlink grant, the security challenge and an uplink grant for receiving a challenge response;
receive, through the network interface from a responding UE, the challenge response and a responding UE identifier (RID); and,
transmit, through the network interface to the responding UE, the downlink user plane data, after determining that the challenge response matches the expected challenge response, and that the RID received from the responding UE corresponds to the TID received from the anchor node;
wherein, when the challenge response matches the expected challenge response, the instructions when executed by the processor further cause the serving node to be configured to be operable to receive through the network interface from the responding UE, a UE status report indicating successful receipt of the downlink user plane data by the responding UE and transmit to the anchor node an indication of the UE status report.

7. The serving node of claim 6, wherein when the challenge response matches the expected challenge response the method further comprises transmitting, to the anchor node, a delivery status report indicating the UE has been validated according to the expected challenge response and the downlink user plane data has been transmitted to the UE.

8. A method for execution by user equipment (UE) of a radio access network (RAN), the method comprising:
receiving, from a serving node, wherein the serving node received a downlink RAN protocol data unit (PDU) that included:
a shared session identifier that identifies a shared session for a group of one or more UEs;
an indication of one or more downlink transmission occasions; and
an intended recipient that included:
a target UE identifier (TID) that identifies one or more UEs from the group of UEs of the shared session,
a security challenge, and
an expected challenge response derived by an anchor node from at least the security challenge and cryptographic keying material associated with the shared session, the security challenge and a paging notification that identifies one or more UEs from a group of UEs of the shared session, the receiving including:
receiving, from the serving node using radio resources based on a downlink grant, a random access response and a second downlink grant; and
receiving, from the serving node using radio resources based on the second downlink grant, the security challenge and an uplink grant for transmitting a challenge response;
transmitting, to the serving node, a responding UE identifier (RID) associated with the UE, and the challenge response based at least on the security challenge, and cryptographic keying material associated with the shared session;
receiving, from the serving node, downlink user plane data; and
wherein, when the challenge response matches the expected challenge response, transmitting, to the serving node, a delivery status report indicating successful receipt of the downlink user plane data.

9. A User Equipment (UE) comprising:
a radio interface for receiving data from and transmitting data to a radio access network (RAN);
a processor; and
a non-transitory memory for storing instructions that when executed by the processor cause the UE to be configured to be operable to:
receive, from a serving node, wherein the serving node received a downlink RAN protocol data unit (PDU) that included:
a shared session identifier that identifies a shared session for a group of one or more UEs;
an indication of one or more downlink transmission occasions; and
an intended recipient that included:
a target UE identifier (TID) that identifies one or more UEs from the group of UEs of the shared session,
a security challenge, and
an expected challenge response derived by an anchor node from at least the security challenge and cryptographic keying material associated with the shared session, the security challenge and a paging notification that identifies one or more UEs from a group of UEs of the shared session, wherein the receiving includes:
receiving, from the serving node using radio resources based on a downlink grant, a random access response and a second downlink grant; and receiving, from the serving node using radio resources based on the second downlink grant, the security challenge and an uplink grant for transmitting a challenge response;

transmit, to the serving node, a responding UE identifier (RID), and the challenge response based at least on the security challenge, and cryptographic keying material associated with the shared session;

receive, from the serving node, downlink user plane data; and wherein, when the challenge response matches the expected challenge response, transmit, to the serving node, a delivery status report indicating successful receipt of the downlink user plane data.

10. A non-transitory computer readable medium storing instructions executable in one or more processors, the instructions when executed in the one or more processors causing operations comprising:

receiving, at a serving node from an anchor node, a downlink radio access network (RAN) protocol data unit (PDU), the downlink RAN PDU including:
  a shared session identifier that identifies a shared session for a group of one or more UEs;
  an indication of one or more downlink transmission occasions;
  an intended recipient comprising:
    a target User Equipment (UE) identifier (TID) that identifies one or more UEs from the group of UEs that comprise the shared session,
    a security challenge, and
    an expected challenge response derived by the anchor node from at least the security challenge and cryptographic keying material associated with the shared session; and,
  downlink user plane data including a packet forwarded from a core network (CN) node;

transmitting, to at least one UE of the group of one or more UEs during a downlink transmission occasion of the one or more downlink transmission occasions, the security challenge and a paging notification associated with the TID, wherein transmitting includes:
  transmitting, to the at least one UE of the group of one or more UEs using radio resources based on a downlink grant, a random access response and a second downlink grant; and
  transmitting, to the at least one UE of the group of one or more UEs using radio resources based on the second downlink grant, the security challenge and an uplink grant for receiving a challenge response;

receiving, from a responding UE, the challenge response and a responding UE identifier (RID); and, transmitting, to the responding UE, the downlink user plane data, after determining that the challenge response matches the expected challenge response, and that the RID received from the responding UE corresponds to the TID received from the anchor node;

wherein, when the challenge response matches the expected challenge response, receiving, from the UE, a UE status report indicating successful receipt of the downlink user plane data by the UE and transmitting, to the anchor node, an indication of the UE status report.

11. The computer readable medium of claim 10, wherein the instructions when executed in the one or more processors causing operations wherein when the challenge response matches the expected challenge response the method further comprises transmitting, to the anchor node, a delivery status report indicating the UE has been validated according to the expected challenge response and the downlink user plane data has been transmitted to the UE.

12. The computer readable medium of claim 11, wherein the instructions when executed in the one or more processors causing operations, wherein the downlink RAN PDU further comprises a request to provide the delivery status report.

13. The computer readable medium of claim 10, wherein the transmitting the security challenge comprises at least one of:
  transmitting a paging message including the security challenge;
  transmitting, to the UE, a random access response including the security challenge;
  transmitting to the UE, using radio resources determined in accordance with the downlink grant, a random access response, the security challenge, and the uplink grant.

* * * * *

UNITED STATES PATENT AND TRADEMARK OFFICE
CERTIFICATE OF CORRECTION

PATENT NO. : 10,778,449 B2  
APPLICATION NO. : 15/881113  
DATED : September 15, 2020  
INVENTOR(S) : William Anthony Gage Page 1 of 1

It is certified that error appears in the above-identified patent and that said Letters Patent is hereby corrected as shown below:

In the Specification

Column 7, Lines 13 and 14:
"signalling radio bearer (SRB) 208 to a 210 through a primary macro cell 212. The 210 may use a data radio bearer (DRB)"

Should read:
--signalling radio bearer (SRB) 208 to a UE 210 through a primary macro cell 212. The UE 210 may use a data radio bearer (DRB)--

Column 14, Line 45:
"identifying component of the USD provided by the UE 510"

Should read:
--"identifying component of the UEID provided by the UE 510--

Signed and Sealed this  
Fourth Day of May, 2021

Drew Hirshfeld  
*Performing the Functions and Duties of the*  
*Under Secretary of Commerce for Intellectual Property and*  
*Director of the United States Patent and Trademark Office*